US010721747B2

(12) United States Patent
Adachi et al.

(10) Patent No.: US 10,721,747 B2
(45) Date of Patent: Jul. 21, 2020

(54) WIRELESS COMMUNICATION DEVICE AND WIRELESS COMMUNICATION TERMINAL

(71) Applicant: KABUSHIKI KAISHA TOSHIBA, Minato-ku, Tokyo (JP)

(72) Inventors: Tomoko Adachi, Kawasaki Kanagawa (JP); Ryoko Matsuo, Shinagawa Tokyo (JP); Tomoya Tandai, Ota Tokyo (JP); Hiroki Mori, Kawasaki Kanagawa (JP); Kentaro Taniguchi, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 99 days.

(21) Appl. No.: 15/705,228

(22) Filed: Sep. 14, 2017

(65) Prior Publication Data

US 2018/0007701 A1     Jan. 4, 2018

Related U.S. Application Data

(63) Continuation of application No. PCT/JP2016/063508, filed on Apr. 28, 2016.

(30) Foreign Application Priority Data

Apr. 30, 2015  (JP) ................. 2015-093442

(51) Int. Cl.
*H04W 74/08*    (2009.01)
*H04W 72/12*    (2009.01)
(Continued)

(52) U.S. Cl.
CPC .............. *H04W 72/12* (2013.01); *H04B 1/16* (2013.01); *H04B 1/40* (2013.01); *H04W 48/08* (2013.01);
(Continued)

(58) Field of Classification Search
CPC . H04W 84/12; H04W 74/0816; H04W 74/02; H04W 72/04; H04W 72/0446;
(Continued)

(56) References Cited

U.S. PATENT DOCUMENTS 7,496,076 B2    2/2009  Takagi et al.
8,014,818 B2    9/2011  Grandhi et al.
(Continued)

FOREIGN PATENT DOCUMENTS

JP    2005-198214 A    7/2005
JP    2007-519358 A    7/2007
(Continued)

OTHER PUBLICATIONS

Gong et al.: "DL MU MIMO Error Handling and Simulation Results", IEEE 802.11-10/0324r1, Intel, Mar. 2010, pp. 1-23.
(Continued)

*Primary Examiner* — Faruk Hamza
*Assistant Examiner* — Aixa A Guadalupe Cruz
(74) *Attorney, Agent, or Firm* — Foley & Lardner LLP

(57) ABSTRACT

According to one embodiment, a wireless communication device includes a transmitter configured to transmit a first field containing information to identify a plurality of wireless communication terminals, and configured to multiplex and transmit a plurality of second fields in each of which a first frame containing an address of any of the wireless communication terminals is set; and a controller configured to determine, for the first frames, values pertaining to lengths of durations to suppress access to a wireless medium to the wireless communication terminal having an address different from the address contained in each of the first frames. The transmitter is configured to set the values in the first frames, the second fields, or the first field. The controller
(Continued)

is configured to determine the values so that the durations have an end at an identical time.

18 Claims, 29 Drawing Sheets

(51) Int. Cl.
*H04W 84/12* (2009.01)
*H04B 1/40* (2015.01)
*H04B 1/16* (2006.01)
*H04W 74/00* (2009.01)
*H04W 74/04* (2009.01)
*H04W 48/08* (2009.01)

(52) U.S. Cl.
CPC ......... *H04W 74/002* (2013.01); *H04W 74/04* (2013.01); *H04W 74/0808* (2013.01); *H04W 84/12* (2013.01)

(58) Field of Classification Search
CPC . H04W 74/04; H04W 74/08; H04W 74/0808; H04W 74/00
See application file for complete search history.

(56) References Cited

U.S. PATENT DOCUMENTS

| | | | |
|---|---|---|---|
| 8,411,631 | B2 | 4/2013 | Gong et al. |
| 8,675,597 | B2 | 3/2014 | Lee et al. |
| 8,774,088 | B2 | 7/2014 | Gong et al. |
| 8,923,172 | B2 | 12/2014 | Wentink et al. |
| 8,989,213 | B2 | 3/2015 | Wentink |
| 9,332,571 | B2 | 5/2016 | Zhu et al. |
| 9,673,943 | B2 | 6/2017 | Seok |
| 9,717,086 | B2 | 7/2017 | Zhang et al. |
| 9,853,791 | B2 | 12/2017 | Chu et al. |
| 10,014,992 | B2 | 7/2018 | Sun et al. |
| 10,263,738 | B2 | 4/2019 | Sun et al. |
| 2005/0163150 | A1 | 7/2005 | Yang et al. |
| 2011/0002219 | A1 | 1/2011 | Kim et al. |
| 2012/0281545 | A1 | 11/2012 | Fujiwara et al. |
| 2013/0286959 | A1 | 10/2013 | Lou et al. |
| 2014/0307612 | A1 | 10/2014 | Vermani et al. |
| 2015/0131517 | A1 | 5/2015 | Chu et al. |
| 2017/0127451 | A1* | 5/2017 | Chun ................... H04W 84/12 |
| 2018/0007561 | A1 | 1/2018 | Adachi et al. |
| 2018/0007701 | A1 | 1/2018 | Adachi |

FOREIGN PATENT DOCUMENTS

| | | |
|---|---|---|
| JP | 2012-235453 A | 11/2012 |
| JP | 2013-502886 A | 1/2013 |
| JP | 2013-504248 A | 2/2013 |
| JP | 2013-165505 A | 8/2013 |
| JP | 2013-531404 A | 8/2013 |
| JP | 2013-542643 A | 11/2013 |
| JP | 2013-243693 A | 12/2013 |
| WO | WO-2016/175329 A1 | 11/2016 |

OTHER PUBLICATIONS

IEEE Standards Association/IEEE Computer Society: "Part 11: Wireless LAN Medium Access Control (MAC) and Physical Layer (PHY) Specifications", IEEE Std 802.11™-2012, The Institute of Electrical and Electronics Engineers, Inc., Mar. 2012, pp. 1-2793.
IEEE Standards Association/IEEE Computer Society: "Part 11: Wireless LAN Medium Access Control (MAC) and Physical Layer (PHY) Specifications; Amendment 4: Enhancements for Very High Throughput for Operation in Bands Below 6 GHz", IEEE Std 802.11ac™-2013, The Institute of Electrical and Electronics Engineers, Inc., Dec. 2013, pp. 1-425.
Inoue et al.: "Beyond 802.11ac—A Very High Capacity WLAN", IEEE 11-13/0287r3, NTT, Mar. 2013, pp. 1-12.
Jang et al.: "Samsung MAC Proposal Technical Specification", IEEE 802.11-03/0918r2, Samsung Electronics, et al., Aug. 2004, pp. 1-34.
Stacey, Robert: "Specification Framework for TGax", IEEE 802.11-15/0132r15, Intel, Jan. 2016, pp. 1-43.
English International Preliminary Report on Patentability dated Nov. 9, 2017 in corresponding application No. PCT/JP2016/063507.
Fall ah et al, Hybrid OFDMA/CSMA Based Medium Access Control for Next-Generation Wireless LANs, IEEE, 7 pages, 2008.
IEEE 802.11n-2009—IEEE Standard for Information technology—Local and metropolitan area networks—Specific requirements—Part 11: Wireless LAN Medium Access Control (MAC)and Physical Layer (PHY) Specifications Amendment 5: Enhancements for Higher Throughput.
Non-Final Office Action on U.S. Appl. No. 15/706,572 dated Jan. 29, 2019.
Notice of Allowance on U.S. Appl. No. 15/706,572 dated Nov. 4, 2019.
Final Office Action on U.S. Appl. No. 15/706,572 dated Jul. 1, 2019.

* cited by examiner

FIG. 30A
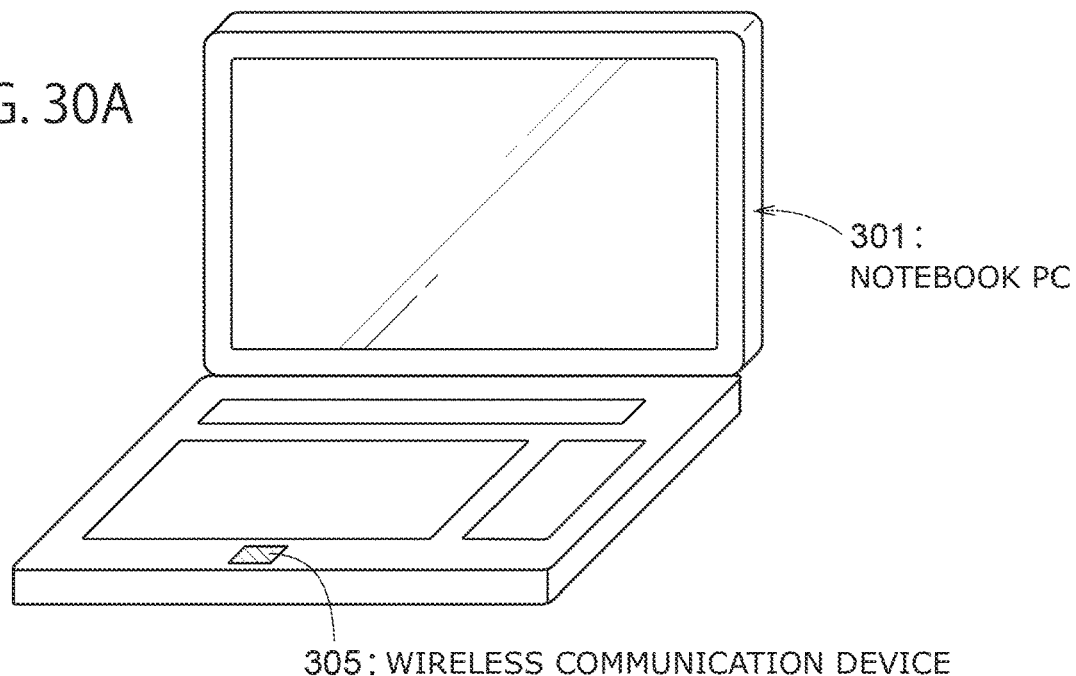
305: WIRELESS COMMUNICATION DEVICE
301: NOTEBOOK PC
FIG. 30B
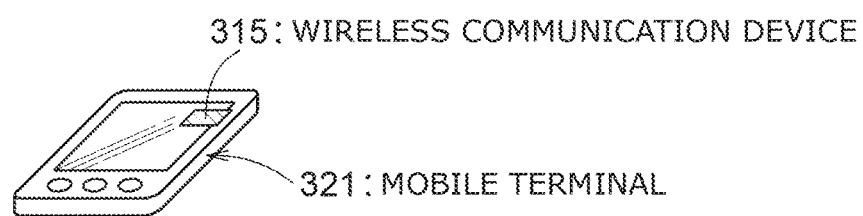
315: WIRELESS COMMUNICATION DEVICE
321: MOBILE TERMINAL
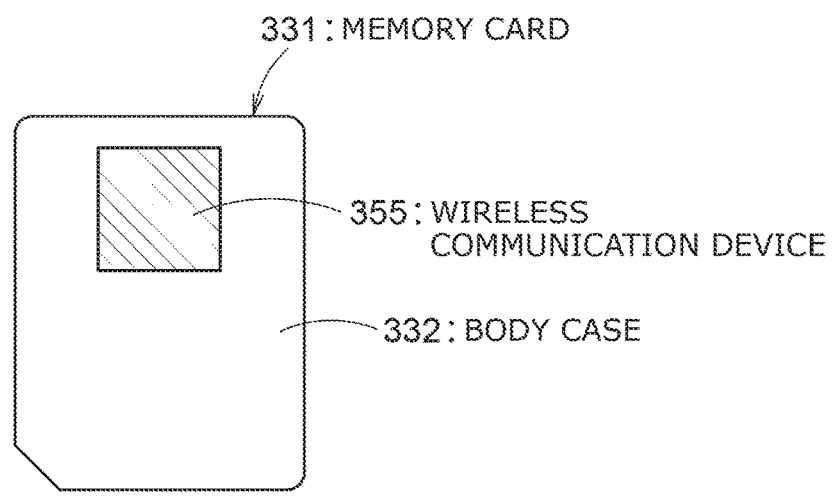
331: MEMORY CARD
355: WIRELESS COMMUNICATION DEVICE
332: BODY CASE
FIG. 31

WIRELESS COMMUNICATION DEVICE AND WIRELESS COMMUNICATION TERMINAL

CROSS REFERENCE TO RELATED APPLICATIONS

This application is a Continuation of International Application No. PCT/JP2016/063508, filed on Apr. 28, 2016, the entire contents of which is hereby incorporated by reference.

FIELD

Embodiments of the present invention relate to a wireless communication device and a wireless communication terminal.

BACKGROUND

A communication scheme that simultaneously performs transmission destined for multiple wireless communication terminals (hereinafter, terminals) or reception from the multiple terminals and is called OFDMA (Orthogonal Frequency Division Multiple Access) has been known. OFDMA that allocates one or more subcarriers as a resource block to a terminal and simultaneously performs transmission to multiple terminals or reception from the multiple terminals on a resource block basis is specifically called a resource-block-based OFDMA in some cases. Simultaneous transmission from a base station to multiple terminals correspond to downlink OFDMA transmission. Simultaneous transmission from the multiple terminals to the base station corresponds to uplink OFDMA transmission.

In a case where communication is executed through resource-block-based OFDMA in a wireless LAN system in conformity with IEEE 802.11 standard using CSMA/CA (Carrier Sense Multiple Access with Collision Avoidance), presence of terminals that are not targets of OFDMA in the system is required to be considered. The terminals that are not OFDMA targets are terminals that do not serve as the targets of OFDMA executed in this case.

When OFDMA communication is performed in an environment where a terminal not serving as an OFDMA target (non-target terminal) resides, the non-target terminal does not successfully receive frames (more specifically, physical packets including frames) that are exchanged in OFDMA. Consequently, an error is detected in the physical layer or MAC layer. Accordingly, in the next access to a wireless medium, an EIFS (Extended Interframe Space) period is set as a fixed period of time to perform carrier sensing on the MAC layer. The EIFS period is longer than DIFS/AIFS [AC] which is a fixed period of time used in carrier sensing performed in normal medium access. Consequently, unfairness occurs between non-target terminals and the other terminals (e.g., terminals and a base station that execute OFDMA communication) in access right obtaining opportunities.

BRIEF DESCRIPTION OF THE DRAWINGS

FIGS. 30A and 30B each is a perspective view of a wireless communication terminal according to a seventh embodiment;

FIG. 31 is a diagram showing a memory card according to the seventh embodiment.

DETAILED DESCRIPTION

According to one embodiment, a wireless communication device includes a transmitter configured to transmit a first field containing information to identify a plurality of wireless communication terminals, and configured to multiplex and transmit a plurality of second fields in each of which a first frame containing an address of any of the wireless communication terminals is set; and a controller configured to determine, for the first frames, values corresponding to lengths of durations to suppress access to a wireless medium to the wireless communication terminal having an address different from the address contained in each of the first frames. The transmitter is configured to set the values in the first frames, the second fields, or the first field. The controller is configured to determine the values so that the durations have an end at an identical time.

Hereinafter, embodiments of the present invention will be described with reference to the drawings. The entire contents of IEEE Std 802.11-2012 and IEEE Std 802.11ac-2013, known as the wireless LAN standard and IEEE 802.11-15/ 0132r15 which is Specification Framework Document directed to IEEE Std 802.11ax as a next generation wireless LAN standard are herein incorporated by reference in the present specification.

First Embodiment

Figure 1:
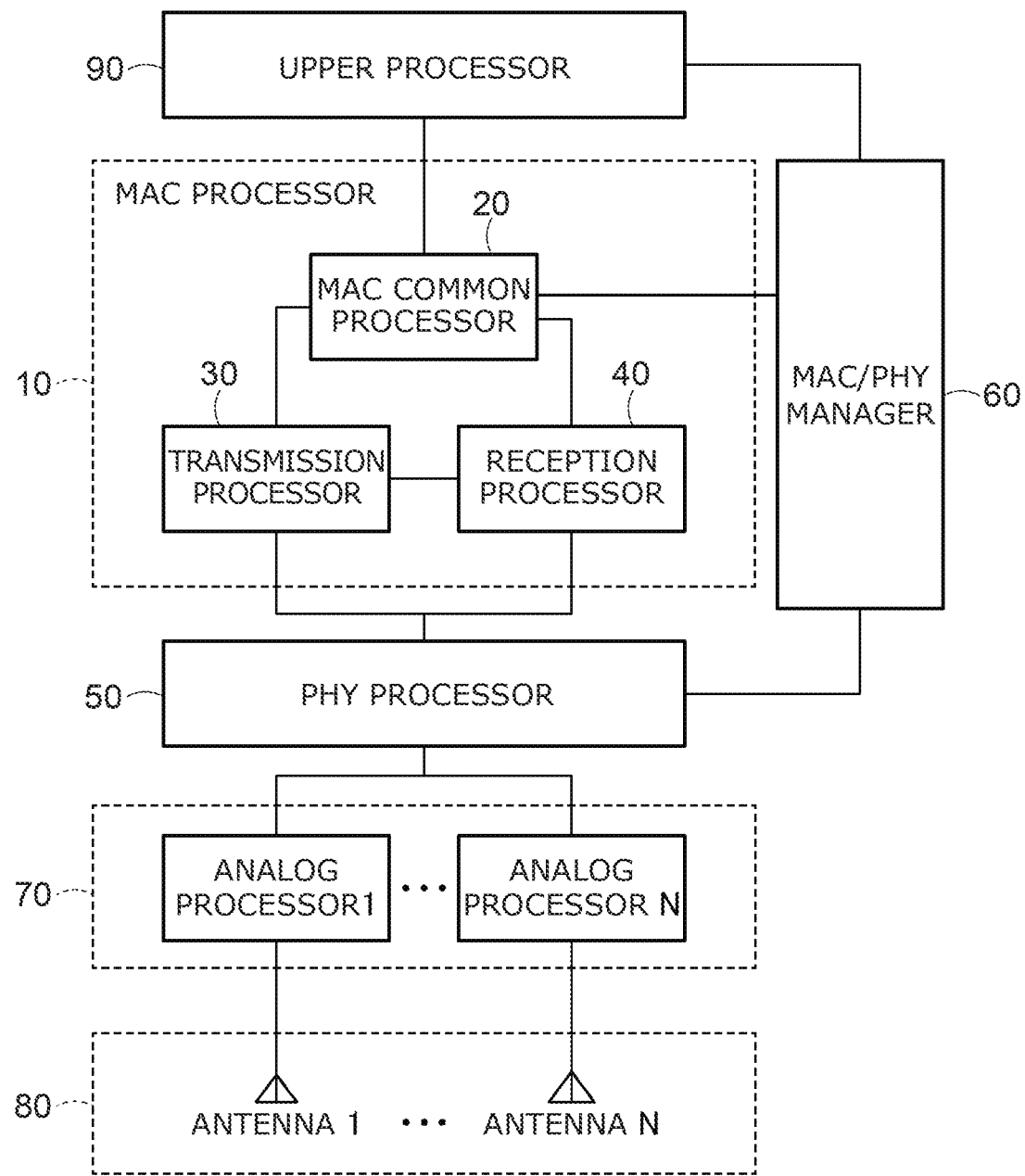
FIG. 1 is a functional block diagram of a wireless communication device according to an embodiment of the present invention.

FIG. 1 shows a functional block diagram of a wireless communication device according to a first embodiment. The wireless communication device can be implemented in a wireless communication base station (hereinafter, a base station), or a wireless communication terminal (hereinafter, a terminal) that communicates with the wireless communication base station. The base station is different from the terminal in that the base station has a relay function but, in other points, has communication functions basically analogous to those of the terminal. Consequently, the base station can be regarded as one mode of the terminal. When a wireless communication terminal or a terminal is mentioned in the following explanations, it may also refer to a base station as long as the terminal and the base station need not to be particularly discriminated from each other.

This embodiment assumes that the base station performs resource-block-based OFDMA (Orthogonal Frequency Division Multiple Access) communication that allocates, to the terminals, resource blocks (which may also be called subchannels, resource units or frequency blocks) each including one or more continuous subcarriers in a continuous frequency domain, and performs simultaneous transmission destined for the multiple terminals or simultaneous reception from the multiple terminals. The transmission from the base station to the multiple terminals is corresponded to downlink OFDMA transmission. The transmission from the multiple terminals to the base station is corresponded to uplink OFDMA transmission.

Figure 2:
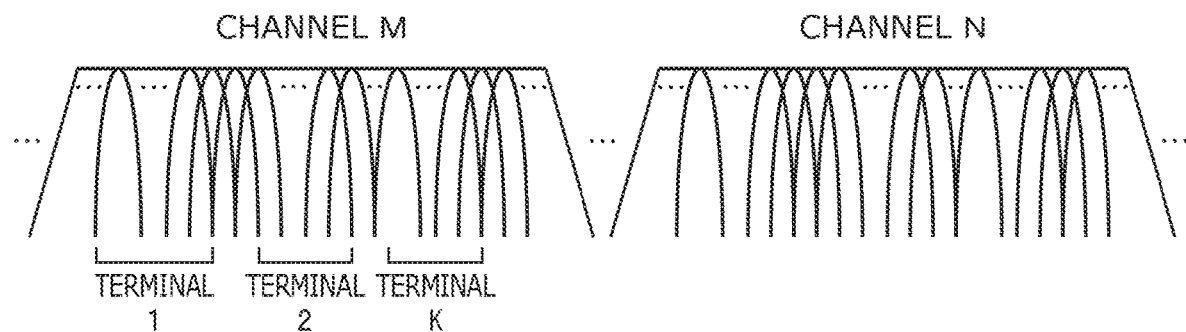
FIG. 2 is a diagram for illustrating OFDMA communication and resource block allocation.

FIG. 2 shows situations where multiple channels are arranged in a frequency domain. A guard band is provided between channels. The bandwidth of one channel is, for example, 20 MHz. It is assumed that the continuous band of one channel (here, channel M) thereamong is used for OFDMA communication. In the continuous band of channel M (e.g., 20 MHz width band), multiple (e.g., 52 in a case of 20 MHz band) subcarriers orthogonal to each other are arranged. On the basis of these subcarriers, the resource blocks that adopt one or more continuous subcarriers as a unit are allocated to terminal 1, terminal 2, . . . , terminal K (K is an integer of two or larger). The resource blocks have the same bandwidth (or the same number of subcarriers) with respect to each other. Alternatively, the individual resource blocks may be allowed to have bandwidths (or the numbers of subcarriers) different from each other. The number of resource blocks allocated to each terminal is configured such that one resource block is for one terminal in the example of FIG. 2. Alternatively, multiple resource blocks may be allocated to one terminal. The number of allocated resource blocks may be different among individual terminals. In a case where the resource block includes multiple subcarriers, the arrangement of the subcarriers included in the resource block may be continuous or discontinuous. Discontinuously arranged multiple subcarriers may be allocated as a resource block to one wireless terminal.

In the example in FIG. 2, at least one subcarrier is arranged as a guard subcarrier between the resource blocks allocated to the respective terminals. The number of guard subcarriers arranged between the resource blocks may be defined in a system or a specification or in any manner. The arrangement of the guard subcarrier between the resource blocks is not necessary. Alternatively, arrangement with no guard subcarrier between the resource blocks may be allowed.

The number of channels used for OFDMA communication is not limited to one. Alternatively, OFDMA communication can be performed using two or more channels. In this case, the resource blocks may be allocated in each channel independently in a channel-by-channel basis. In this case, multiple resource blocks belonging to different channels may be allowed to be allocated to one terminal. The resource blocks are not necessarily allocated in the independent manner for each channel. Alternatively, a continuous frequency domain made up of channels coupled to each other may be defined, the resource blocks may be allocated in the combined frequency domain. For example, two channels adjacent to each other in view of frequency may be coupled to define a 40-MHz frequency domain, and the resource blocks may be allocated on the basis of subcarriers orthogonal to each other in the 40-MHz frequency domain. Likewise, four 20 MHz width channels may be combined to define an 80-MHz frequency domain, or eight channels may be combined to define 160-MHz frequency domain. In this case, the resource blocks may be allocated on the basis of the subcarriers orthogonal to each other in each frequency domain.

A terminal according to this embodiment is successful in carrying out reception and decoding (including decoding of error correcting code and demodulation, etc.) of a physical packet of at least the reference channel width (20 MHz channel width if IEEE 802.11a/b/g/n/ac standard compliant terminal is regarded as a legacy terminal) at the legacy terminal that is to be backward compatible. In this case, with regard to the carrier sensing, it is carried out in a unit of a channel. It may encompass both physical carrier sensing associated with busy/idle of CCA (Clear Channel Assessment) and virtual carrier sensing based on medium reservation time indicated in the received frame. As in the case of the latter, a scheme for virtually determining that a medium is in the busy state, or the term during which the medium is virtually regarded as being in the busy state is called a Network Allocation Vector (NAV). The carrier sense information based on CCA or a NAV carried out in a unit of a channel may be universally applied to all the resource blocks within the channel. For example, to resource blocks belonging to a channel that has carrier sense information indicating an idle state, the carrier sense information on the channel may be commonly applied, and the resource blocks may be regarded as an idle state and thus be processed. The terminal according to this embodiment is not limited to the mode of performing carrier sensing in units of channels. Alternatively, if a terminal is implemented with a scheme where the terminal performs carrier sensing in units of resource blocks, the carrier sensing in units of resource blocks (in both physical and virtual manners) may be allowed.

This embodiment assumes that resource-block-based OFDMA communication is performed between the base station and the multiple terminals, as described before. The scheme is not limited to the resource-block based one. Alternatively, channel-based OFDMA communication may be allowed. In particular, OFDMA in this case is sometimes called channel-based OFDMA or MU-MC (Multi-User Multi-Channel). In MU-MC, the base station allocates multiple channels to multiple terminals, and performs simultaneous transmission destined for the multiple terminals or simultaneous reception from the multiple terminals simultaneously using the multiple channels. The following description of the embodiment on resource-block-based OFDMA may be read with required replacement in conformity with channel-based OFDMA, for example, in a manner where the resource block is replaced with the channel, thereby enabling an embodiment of channel-based OFDMA to be achieved.

In the following description, a terminal that has a capability of executing resource-block-based OFDMA communication is called an OFDMA compatible terminal, and a terminal that does not have this capability is called a legacy terminal, in some cases. In a case where the capability of executing OFDMA communication is switchable between an enabled state (Enable) and a disabled state (Disable), a terminal where the capability is switched to the enabled state may be regarded as an OFDMA compatible terminal. The terminal designated as the base station for OFDMA communication this time among the OFDMA compatible terminals corresponds to an OFDMA target terminal. The terminals that are not designated as the base station for OFDMA communication this time are sometimes called OFDMA non-target terminals.

As illustrated in FIG. 1, a wireless communication device incorporated in a terminal (which may be either a terminal of non-base station or the base station) includes upper layer processor 90, MAC processor 10, physical (PHY) processor 50, MAC/PHY manager 60, analog processor 70 (analog processors 1 to N), and antenna 80 (antennas 1 to N), where N represents an integer equal to or larger than 1. In the figure, the N analog processors and the N antennas are connected in pairs with each other, but the configuration is not limited to the illustrated one. For example, one analog processor and two or more antennas may be connected to this analog processor in a shared manner.

MAC processor 10, MAC/PHY manager 60 and PHY processor 50 each corresponds to one mode of a communication processing device or a baseband integrated circuit that performs a process pertaining to communication with another terminal (including the base station). Analog processor 70 corresponds, for example, to a wireless communicator or a radio frequency (RF) integrated circuit that transmits and receives signals via antenna 80. The integrated circuit for wireless communication in accordance with this embodiment may include at least the former of the baseband integrated circuit (communication processing device) and the RF integrated circuit. The functions of the communication processing device or the baseband integrated circuit may be performed by software (programs) that runs on a processor such as a CPU or may be performed by hardware, or may be performed by both of the software and the hardware. The software may be stored in a storage medium such as a memory including a ROM, a RAM, etc., a hard disk, or an SSD and read therefrom to be executed. The memory may be a volatile memory such as a DRAM, or a non-volatile memory such as a NAND or an MRAM.

Upper layer processor 90 is configured to carry out processing for the Medium Access Control (MAC) layer associated with the upper layer or layers. Upper layer processor 90 can exchange signals with MAC processor 10. As the upper layer, TCP/IP, UDP/IP, and the application layer upper than these two protocols may be mentioned as typical examples but this embodiment is not limited to them. Upper layer processor 90 may include a buffer for exchanging data between the MAC layer and the upper layer or layers. It may also be considered that it may be connectable to a wired infrastructure via upper layer processor 90. The buffer may be a memory, an SSD, a hard disk or the like. In the case where the buffer is a memory, the memory may be a volatile memory, such as DRAM, or a nonvolatile memory, such as NAND or MRAM.

MAC processor 10 is configured to carry out processing for the MAC layer. As described before, MAC processor 10 can exchange signals with upper layer processor 90. Further, MAC processor 10 can exchange signals with PHY processor 50. MAC processor 10 includes MAC common processor 20, transmission processor 30, and reception processor 40.

MAC common processor 20 is configured to carry out common processing for transmission and reception in the MAC layer. MAC common processor 20 is connected to and exchanges signals with upper layer processor 90, transmission processor 30, reception processor 40, and MAC/PHY manager 60.

Transmission processor 30 and reception processor 40 are connected to each other. Also, transmission processor 30 and reception processor 40 are each connected to MAC common processor 20 and PHY processor 50. Transmission processor 30 is configured to carry out transmission processing in the MAC layer. Reception processor 40 is configured to carry out reception processing in the MAC layer.

PHY processor 50 is configured to carry out processing for a physical layer (PHY layer). As described before, PHY processor 50 can exchange signals with MAC processor 10. PHY processor 50 is connected via analog processor 70 to antenna 80.

MAC/PHY manager 60 is connected to upper layer processor 90, MAC processor 10 (more specifically, MAC common processor 20), and PHY processor 50. MAC/PHY manager 60 is configured to manage MAC operation and PHY operation in the wireless communication device.

Analog processor 70 includes an analog-to-digital and digital-to-analog (AD/DA) converter and a radio frequency (RF) circuit. Analog processor 70 is configured to convert a digital signal from PHY processor 50 into an analog signal having a desired frequency and transmit it from antenna 80, or convert a high-frequency analog signal received from antenna 80 into a digital signal. It is considered here that although AD/DA conversion is carried out by analog processor 70, another configuration is also possible according to which PHY processor 50 has the AD/DA conversion function.

The wireless communication device in accordance with this embodiment has its constituent element (i.e., incorporates) antenna 80 in one single chip and thereby makes it possible to reduce the mounting area of antenna 80. Further, in the wireless communication device in accordance with this embodiment, as illustrated in FIG. 1, transmission processor 30 and reception processor 40 shares N antennas 80. By virtue of sharing N antennas 80 by transmission processor 30 and reception processor 40, it is made possible to reduce the size of the wireless communication device of FIG. 1. It is considered here that the wireless communication device in accordance with this embodiment may have a configuration different than the one depicted by way of example in FIG. 1.

In reception of a signal from a wireless medium, analog processor 70 converts an analog signal received by antenna 80 into a baseband signal that can be processed by PHY processor 50, and further converts the baseband signal into a digital signal. PHY processor 50 is configured to receive a digital received signal from analog processor 70 and detect its reception level. The detected reception level is compared with the carrier sense level (threshold). When the reception level is equal to or larger than the carrier sense level, PHY processor 50 outputs a signal indicative of the determination result that the medium (CCA: Clear Channel Assessment) is in the busy state to MAC processor 10 (reception processor 40 to be more precise). When the reception level is less than the carrier sense level, PHY processor 50 outputs a signal indicative of the determination result that the medium (CCA) is in the idle state to MAC processor 10 (reception processor 40 to be more precise).

PHY processor 50 applies a decoding (including decoding, demodulating and the like of an error correction code) process and a process of removing the preamble and the PHY header to the received signal, and extracts the payload. According to IEEE 802.11 standard, this payload is called physical layer convergence procedure (PLCP) service data unit (PSDU) on the PHY side. PHY processor 50 delivers the extracted payload to reception processor 40, and reception processor 40 handles it as a MAC frame. According to IEEE 802.11 standard, this MAC frame is called medium access control (MAC) protocol data unit (MPDU). In addition, PHY processor 50, when it started to receive the reception signal, notifies the fact of having started reception of the reception frame to reception processor 40, and, when it completed the reception of the reception signal, notifies the fact of having completed the reception to reception processor 40. Also, PHY processor 50, when the reception signal has been decoded successfully as the physical packet (PHY packet) (when it does not detect an error), notifies the completion of the reception of the reception signal and delivers a signal indicative of the fact that the medium is in the idle state to reception processor 40. PHY processor 50, when it detected an error in the reception signal, notifies the fact that the error has been detected with an appropriate error code in accordance with the error type to reception processor 40. Also, PHY processor 50, at the timing at which the medium has been determined to enter the idle state, notifies a signal indicative of the fact that the medium is in the idle state to reception processor 40.

MAC common processor 20 performs intermediary processing for delivery of transmission data from upper layer processor 90 to transmission processor 30 and for delivery of reception data from reception processor 40 to upper layer processor 90. According to IEEE 802.11 standard, the data in this MAC data frame is called medium access control (MAC) service data unit (MSDU). Also, MAC common processor 20 receives instructions from MAC/PHY manager 60 and then converts the instruction into ones appropriate for each form of instructions for transmission processor 30 and reception processor 40 and outputs the converted instructions to these units.

MAC/PHY manager 60 corresponds, for example, to station management entity (SME) in IEEE 802.11 standard. In that case, the interface between MAC/PHY manager 60 and MAC common processor 20 corresponds to MAC subLayer management entity service access point (MLME SAP) in IEEE 802.11 standard, and the interface between MAC/PHY manager 60 and PHY processor 50 corresponds to physical layer management entity service access point (PLME SAP) in IEEE 802.11 wireless local area network (LAN).

It is considered here that although MAC/PHY manager 60 in FIG. 1 is illustrated on the assumption that the functional unit for the MAC management and the functional unit for the PHY management are configured to be integral with each other, these units may be separately implemented.

MAC/PHY manager 60 holds a management information base (MIB). The MIB holds various pieces of information, such as the capabilities of the own terminal, and the validities of various functions. For example, information on whether the own terminal is the OFDMA compatible terminal or not and on/off information of the capability of executing OFDMA in a case of the OFDMA compatible terminal may also be held. A memory for holding and managing the MIB may be included in MAC/PHY manager 60, or separately provided without being included in MAC/PHY manager 60. In a case where the memory for holding and managing the MIB is separately provided besides MAC/PHY manager 60, MAC/PHY manager 60 can refer to the other memory and rewrite rewritable parameters in the memory. The memory may be a volatile memory, such as DRAM, or a nonvolatile memory, such as NAND or MRAM. Instead of the memory, a storage device, such as an SSD or a hard disk, may be adopted. The base station can receive such information at other non-base station terminals, by means of notification from the terminals which are non-base stations. In this case, MAC/PHY manager 60 can refer to and rewrite information pertaining to other terminals. A memory for storing information pertaining to the other terminals may be held and managed separately from the MIB. In this case, it is configured so that MAC/PHY manager 60 or MAC common processor 20 can refer to or rewrite the other memory. For OFDMA communication, MAC/PHY manager 60 of the base station may also have a grouping function that selects terminals to which resource blocks for OFDMA communication are to be simultaneously allocated (i.e., selects terminals serving as targets of OFDMA at this time) on the basis of various pieces of information pertaining to the terminals serving as non-base stations or a request issued by the terminal. MAC/PHY manager 60 or MAC processor 10 may manage the transmission rate to be applied to the MAC frame and physical header to be transmitted. MAC/PHY manager 60 of the base station may define a supported rate set that is a rate set supported by the base station. The supported rate set may include a rate necessarily supported by the terminals connected to the own station, and optional rates.

MAC processor 10 is configured to handle three types of MAC frames, i.e., a data frame, a control frame, and a management frame, and carry out various processing procedures defined in the MAC layer. Here, the three types of MAC frames are described.

The management frame is for use in management of communication link with another terminal. As the management frame, for example, a Beacon frame may be mentioned. The Beacon frame notifies attribute and synchronization information of a group to form a wireless communication group which is a Basic Service Set (BSS) in IEEE 802.11 standard. Also, a frame exchanged for authentication or establishing the communication link may also be mentioned. It is considered here that a state where a certain terminal completed exchange of information necessary for establishing a wireless communication with another terminal is expressed here as (the state where) the communication link is established. Required information exchange includes, for example, notification on a function supported by the own terminal (e.g., OFDMA scheme supported, and various capabilities described later, etc.), negotiations pertaining to scheme setting and the like. The management frame is generated on the basis of the instruction received by transmission processor 30 from MAC/PHY manager 60 via MAC common processor 20.

With regard to the management frame, transmission processor 30 includes a notifier which notifies various pieces of information to other terminals by the management frame. A terminal that is not a base station may notify information on the terminal itself to the base station by putting in the management frame information regarding such as whether it is an OFDMA-compliant a terminal, IEEE802.11n compliant terminal or IEEE802.11ac compliant terminal. As for this management frame, for example, Association Request frame used in the association process or Reassociation Request frame used in the reassociation process may be mentioned. The association process and the reassociation process are kinds of steps taken for authentication between the terminal and the base station. The notifier of the base station may notify information on OFDMA supportability to the non-base station through the management frame. The management frame used for this may be, for example, a beacon frame, or a probe response frame that is a response to a probe request frame transmitted from the non-base station terminal. The base station may have the function of grouping the terminals connected to the own station and the notifier of the base station may notify the assigned group IDs to the terminals through the management frames. The management frame may be, for example, a group ID management fame. The group ID may be a group ID defined in IEEE Std 802.11ac-2013. In OFDMA communication in the unit of the group, the base station may notify information required for identifying the resource blocks used by the terminals belonging to the group, through any management frame.

Reception processor 40 has a receiver that receives various types of information via the management frame from other terminals. For example, the receiver of the base station may receive information on whether OFDMA communication is supported or not from the terminal serving as the non-base station. The terminal may also receive information on a channel width supported by each terminal (an available largest channel width) in a case of a legacy terminal (IEEE 802.11n compliant terminal or IEEE 802.11ac compliant terminal). The receiver of the terminal may receive information on whether the base station supports OFDMA communication or not.

The examples of the information to be transmitted and received via the management frame as described before are merely examples and various other types of information can be transmitted and received via the management frame between terminals (including the base station). For example, the OFDMA compatible terminal may select the resource block or the channel or both of them that this terminal wishes to use for OFDMA communication, from among the non-interfering channels or non-interfering resource blocks in carrier sensing or both of them. The terminal may notify information pertaining to the selected resource block or channel or both of them to the base station. In this case, the base station may allocate the resource block for OFDMA communication to each OFDMA compatible terminal on the basis of this information. The channel(s) used for OFDMA communication may be all the channels usable for wireless communication system or some (one or multiple) channel(s).

The data frame is for use in transmission of data to another terminal in a state where the communication link is established with the other terminal. For example, data is generated in the terminal by an operation of an application by a user, and the data is carried by the data frame. More specifically, the generated data is passed from upper layer processor 90 to transmission processor 30 via MAC common processor 20. Transmission processor 30 stores the data into a frame body field, and adds a MAC header to generate a data frame. PHY processor 50 then adds a physical header to the data frame to generate a physical packet. The physical packet is transmitted through analog processor 70 and antenna 80. Upon receipt of the physical packet, PHY processor 50 performs a process on the physical layer on the basis of the physical header to extract the MAC frame (here, the data frame), and passes the data frame to reception processor 40. When reception processor 40 receives the data frame (grasps that the received MAC frame is the data frame), this processor extracts the information on the frame body field as data, and passes the extracted data to upper processor 90 via MAC common processor 20. As a result, operations occur on applications such as writing, reproduction, and the like of the data.

The control frame is utilized to control in transmission and reception (exchange) of the management frame and the data frame to/from (with) the other wireless communication device. As the control frame, for example, an RTS (Request to Send) frame, a CTS (Clear to Send) frame may be mentioned which are exchanged with the other wireless communication device to make a reservation of the wireless medium prior to starting exchange of the management frame and the data frame. Other control frames include acknowledgement response frames for acknowledgement of received management frames and data frames. Examples of the acknowledgement response frames include an ACK (Acknowledgement) frame and a BA (BlockACK) frame. A CTS frame can be regarded as a frame that indicates an acknowledgement response because the CTS frame is transmitted as a response to an RTS frame. A CF-End frame is also one of the control frames. The CF-End frame is a frame that announces the end of CFP (Contention Free Period), that is, a frame for permitting access to the wireless medium. These control frames are generated by transmission processor 30. As for the control frame (the CTS frame, the ACK frame, the BA frame or the like) transmitted as a response to the received MAC frame, reception processor 40 determines the necessity of transmission of the response frame (control frame), and outputs information (the information to be set for the type, the RA field etc. of the control frame) required to generate the frame, together with a transmission instruction, to transmission processor 30. Transmission processor 30 generates an appropriate control frame on the basis of the information necessary for generation of the frame and the transmission instruction.

When a MAC frame is transmitted on the basis of CSMA/CA (Carrier Sense Multiple Access with Collision Avoidance), MAC processor 10 needs to acquire the access right (transmission right) on the wireless medium. Transmission processor 30, on the basis of carrier sense information from reception processor 40, measures transmission timing. Transmission processor 30, in accordance with the transmission timing, gives the transmission instruction to PHY processor 50, and further delivers the MAC frame thereto. In addition to the transmission instruction, transmission processor 30 may instruct a modulation scheme and a coding scheme to be used in the transmission. In addition to them, transmission processor 30 may provide an instruction regarding the transmission power. When MAC processor 10, after having acquired the access right (transmission right), obtained the period of time during which the medium can be occupied (Transmission Opportunity; TXOP), then MAC processor 10 is allowed to continuously exchange the MAC frames with other wireless communication devices although there is some limitation based on such as the QoS (Quality of Service) attribute. The TXOP is acquired, for example, when the wireless communication device transmits a predetermined frame (for example, an RTS frame) on the basis of CSMA/CA (Carrier Sense Multiple Access with Collision Avoidance) and successfully receives a response frame (for example, a CTS frame) from another wireless communication device. When this predetermined frame is received by the other wireless communication device, the other wireless communication device transmits the above response frame after the elapse of the minimum frame interval (Short InterFrame Space; SIFS). A method of obtaining TXOP using no RTS frame may be, for example, a case where a data frame for requesting transmission of an acknowledgement response frame directly in unicast (the data frame may be a frame having a form where frames are aggregated, or a frame having a form where payloads are aggregated, as described later) or a management frame is transmitted, and an acknowledgement response frame (an ACK frame or a BlockACK frame) is correctly received in response thereto. Alternatively, in a case of transmission of a frame that does not request another wireless communication device to transmit an acknowledgement response frame and has a Duration/ID field (hereinafter Duration field) where duration more than a period required to transmit this frame has been set, it can be interpreted that TXOP having duration described in the Duration field after the stage of transmission of this frame is obtained.

Reception processor 40 is configured to manage the carrier sense information as described before. The carrier sense information is managed in units of a channel. This carrier sense information includes both physical carrier sense information regarding busy/idle states of the medium (CCA) input from PHY processor 50 and virtual carrier sense information on the basis of the medium reservation time described in the received frame. If either one of these carrier sense information pieces indicates the busy state, then the medium is regarded as being in the busy state in which transmission is prohibited. It is considered here that in IEEE 802.11 standard, the medium reservation time is described in the Duration field of the MAC header. MAC processor 10, when having received a MAC frame that is addressed to other wireless communication devices (that is not addressed to the device itself), determines that the medium is virtually in the busy state from the end of the physical packet including this MAC frame over the medium reservation time. A scheme of this type for virtually determining that a medium is in the busy state, or the term during which the medium is virtually regarded as being in the busy state is called a Network Allocation Vector (NAV). The medium reservation period represents the length of duration of instructing suppression of access to the wireless medium, that is, the length of duration of determining of access to the wireless medium.

Here, the data frame may be a frame such that a plurality of MAC frames (i.e., MPDUs or sub-frames) are aggregated with each other or payload portions of a plurality of MAC frames are aggregated with each other. The former data frame is called an A (Aggregated)-MPDU and the latter data frame is called an A (Aggregated)-MSDU (MAC service data unit) in IEEE 802.11 standard. In the case of the A-MPDU, a plurality of MPDUs are aggregated with each other within the PSDU. Also, as a MAC frame, in addition to the data frame, the management frame and the control frame are also eligible for this aggregation. In the case of the A-MSDU, MSDUs which are a plurality of data payloads are aggregated within the frame body of one MPDU. As for each of A-MPDU and A-MSDU, partition information (length information, etc.) is stored in the data frame so that the aggregation of multiple MPDUs and the aggregation of multiple MSDUs can be appropriately separated at the receiver terminal. Both of the A-MPDU and the A-MSDU may be used in combination. The target of A-MPDU may be only one MAC frame instead of multiple MAC frames. Also in this case, the partition information is stored in the data frame. Also, the responses to the plurality of MAC frames are collectively transmitted in such a case of the data frame being A-MPDU. For the response in this case, the BA (BlockACK) frame is used instead of the ACK frame. In the following description and diagrams, the representation of MPDU may sometimes be used. This case also includes not only the case of the single MAC frame but also the case of A-MPDU or A-MSDU described before.

According to IEEE 802.11 standard, several procedures are defined in multiple stages to be taken for a terminal that is not the base station to participate in a BSS (which is called an infrastructure BSS) configured with the base station amongst others and to perform exchange of data frames within the BSS. For example, there is provided a procedure called association, according to which an Association Request frame is transmitted from the terminal that is not the base station to the base station to which the terminal requests the connection. The base station, after having transmitted an ACK frame for the association request frame, transmits an Association Response frame which is a response to the association request frame.

The terminal stores the capability of the own terminal in an association request frame. Transmission thereof allows the capability of the own terminal to be notified to the base station. For example, the terminal may store the channel or resource block or both of them that can be supported by the own terminal, or information for identifying the standards supported by the own terminal, in the association request frame, and transmit the frame. This information may also be stored in a frame to be transmitted in procedures called reassociation for reconnection to another base station. In this procedure of reassociation, a Reassociation Request frame is transmitted to the base station to which reconnection is requested from the terminal. The base station, after having transmitted the ACK frame in response to the reassociation request frame, transmits a reassociation response which is a response to the reassociation request frame.

As the management frame, in addition to the association request frame and the reassociation request frame, a beacon frame, a probe response frame, etc. may be used. The beacon frame is basically transmitted by the base station, and can store parameter notifying the capability of the base station itself along with the parameters indicating the attributes of the BSS. In view of this, as the parameter notifying the capability of the base station itself, the base station may be adapted to add the information on whether or not OFDMA is supported by the base station. Information on the supported rate of the base station may be notified as another parameter. The supported rate may contain a mandatory rate and optional rates. The probe response frame is a frame transmitted from a terminal (base station) that transmits the beacon frame in response to a probe request frame received. The probe response frame is basically for notifying the same content as the beacon frame. Consequently, the base station can notify the capability of the own station (whether OFDMA communication is supported or not, the supported rates, etc.) to the terminal having transmitted the probe response frame also through use of the probe response frame. This notification to the OFDMA compatible terminal allows the terminal to enable the function of the OFDMA communication of the own terminal, for example.

The terminal may notify information on the rate feasible by the own terminal among the supported rates of the base station, as information to be notified about the own terminal's capability, to the base station. As for the mandatory rate among the supported rates, the terminal connected to the base station has a capability of executing the mandatory rate. In some cases, the base station defines no supported rate. In such cases, the terminal can execute the mandatory rate set according to the type of the physical layer.

If there is a piece of information which is among the pieces of information described before and for which transmission of another piece of information makes this piece mandatory, the notification can be omitted. For example, in a case where the capability conforming to a certain new standards or specification is defined and conformity therewith automatically means the OFDMA compatible terminal, it is not necessarily explicitly notified that the terminal is an OFDMA compatible terminal.

Figure 3:
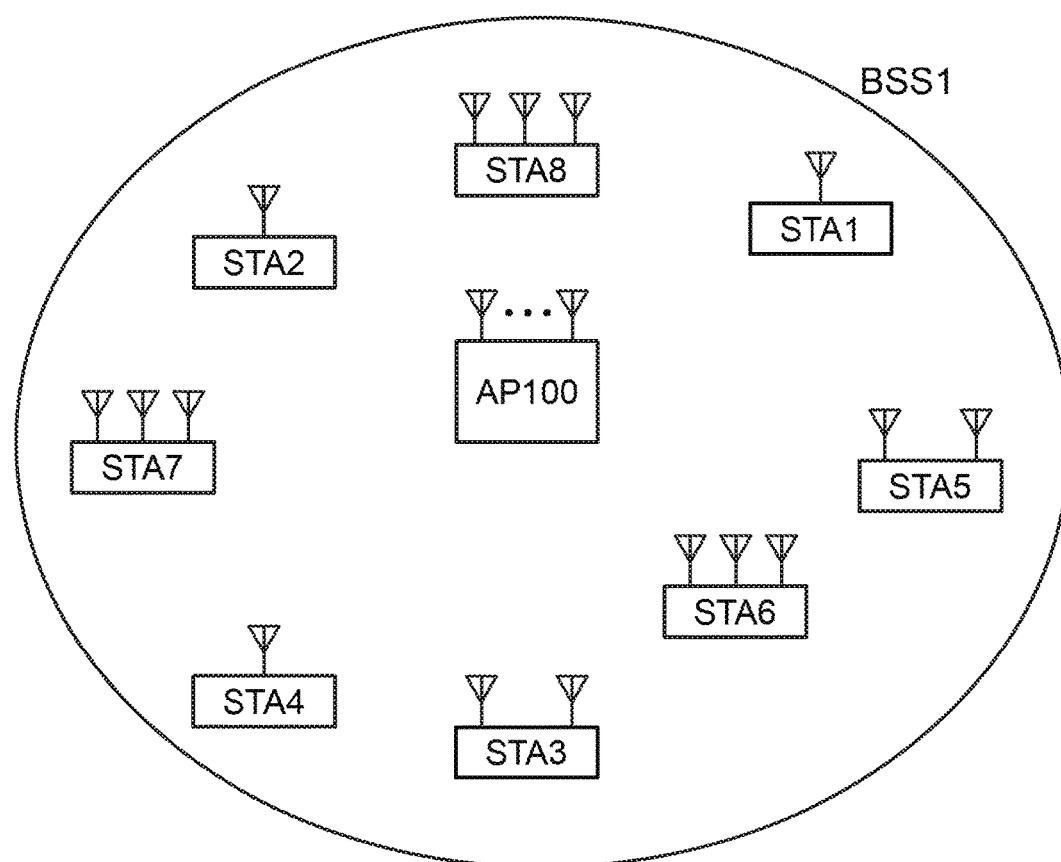
FIG. 3 is a diagram showing a wireless communication group formed of a base station and multiple terminals.

FIG. 3 shows a wireless communication system according to this embodiment. This system includes base station (AP: Access Point) 100 and multiple terminals (STA: STAtions) 1 to 8. Base station 100 and subordinate terminals 1 to 8 form BSS (Basic Service Set) 1. This system is a wireless LAN system in conformity with IEEE 802.11 standard that uses CSMA/CA (Carrier Sense Multiple Access with Collision Avoidance). The OFDMA compatible terminals and legacy terminals coexist. For example, terminals 1 to 6 are the OFDMA compatible terminals, and terminals 7 and 8 are the legacy terminals. Description is hereinafter made assuming this fact.

In the system in FIG. 3, in a case of execution of resource-block-based OFDMA, the equality of medium access opportunity after OFDMA communication is required to be considered between the OFDMA non-target terminals (terminals having not been designated as targets of OFDMA communication this time) and the target terminals and the base station. Upon receipt of frames (more specifically, physical packets containing frames) simultaneously transmitted from the base station or other terminals in OFDMA, the non-target terminal typically performs decoding only up to the common preamble of the header of the physical packet (e.g., a case where it is determined that the physical packet does not contain the frame destined for the own terminal on the basis of the content of the common preamble). In this case, an error is detected on the physical layer, and the error is notified to the MAC layer via the SAP (Service Access Point). Accordingly, on the MAC layer, EIFS (Extended Interframe Space) period is set as a certain duration of carrier sensing before backoff, at the next medium access. The EIFS period is longer than the certain period (DIFS/AIFS[AC]) of carrier sensing performed at normal medium access. Consequently, unfairness occurs between the non-target terminals that set the EIFS period, the normal terminals that set the normal DIFS/AIFS [AC] period (the OFDMA target terminals, the base station, etc.), at the next access.

Currently, conditions of setting the EIFS period include a case where the process of receiving PLCP (Physical Layer Convergence Procedure) is not correctly finished and a case where an error is detected in the FCS test on the MAC frame. In the case where the process of receiving PLCP is not correctly finished, control is performed so that an error can be notified in PHY-RXEND.indication to the MAC layer, and the EIFS period can be set on the MAC layer. Examples where the process of receiving PLCP cannot be correctly finished and an error in PHY-RXEND.indication is notified include a case where the MCS (Modulation and Coding Scheme) notified in the physical header is not supported (Unsupported Rate), a case of format violation, and a case of carrier lost. A case where the OFDMA non-target terminal described before perform decoding only up to the middle of the header of the physical packet also correspond to the case where the process of receiving PLCP cannot be correctly finished. It can be considered that an error is notified on the MAC layer in PHY-RXEND.indication.

Figure 4:
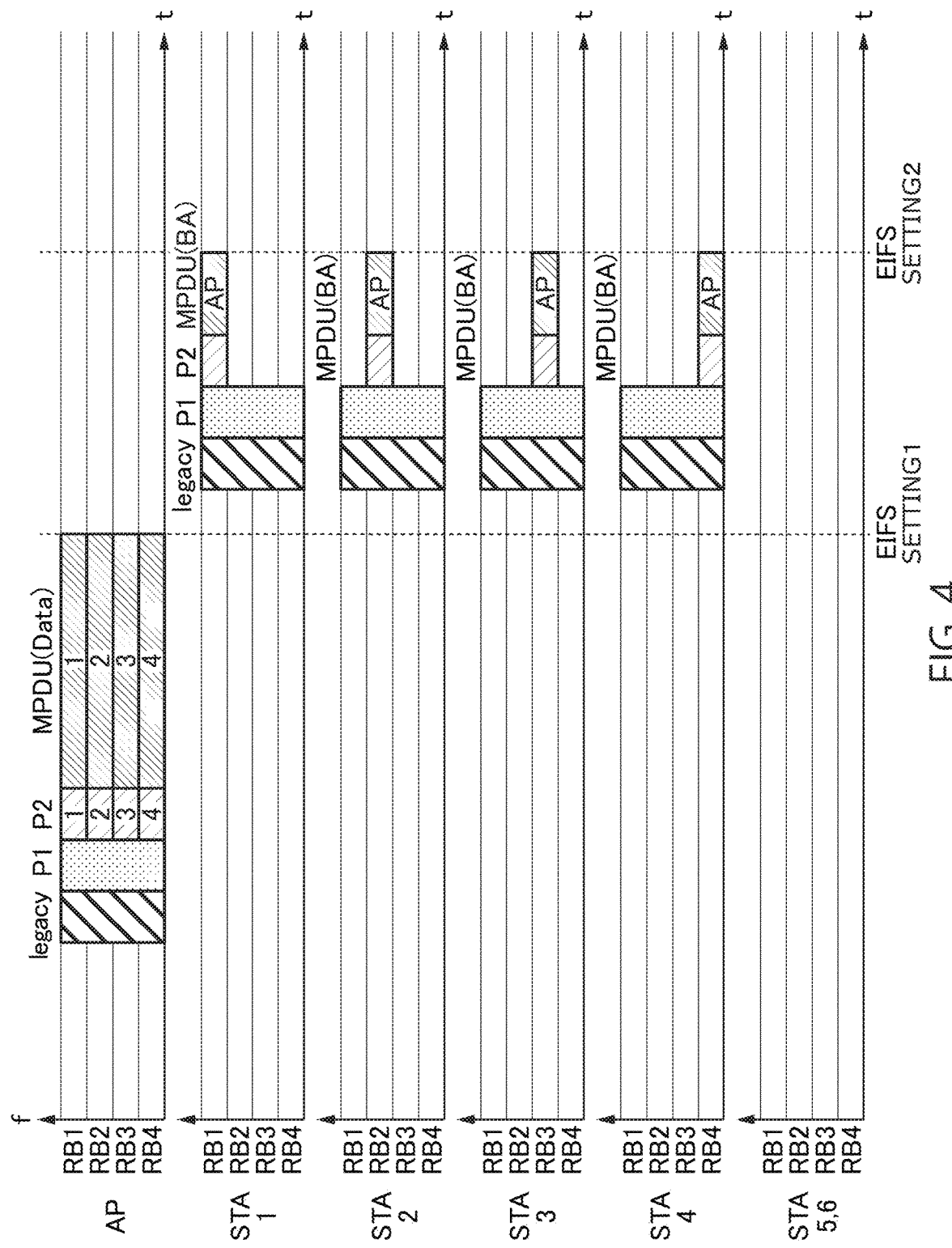
FIG. 4 is a diagram for illustrating unfairness in accessing a wireless medium and can be caused by OFDMA communication.

Hereinafter, referring to FIG. 4, occurrence of the inequality of access to the wireless medium between the OFDMA target terminals and the base station and the OFDMA non-target terminals after OFDMA communication is specifically described. FIG. 4 shows an operation sequence example in a case of OFDMA communication between base station (AP) 101 and terminal (STA) 1 to terminal (STA) 4. For the sake of description, it is assumed that terminals 1 to 4 and non-target terminals 5 and 6 have the capabilities of OFDMA communication and the capabilities are enabled but do not have the function of solving the unfairness pertaining to the characteristics of this embodiment. In a bottom part of FIG. 4, an operation example of terminals 5 and 6, which are OFDMA non-target terminals, is also shown.

In the sequence example, base station 101 and terminals 1 to 4 perform OFDMA communication (both of downlink transmission and uplink transmission) using a continuous 20 MHz width frequency band in one 20 MHz width channel. The base station allocates one or more continuous subcarriers as resource blocks to the terminals on the basis of the subcarriers orthogonally arranged in the 20 MHz width band. In this example, it is assumed that four resource blocks 1, 2, 3 and 4 are set in one channel, and resource blocks 1 to 4 are sequentially allocated to respective terminals 1 to 4 in a descending order of frequency. According to description in conformity with the example shown in FIG. 2, the case correspond to the case where K=4 is assumed, the four resource blocks set in channel M are sequentially allocated to respective terminals 1 to 4 in the descending order of frequency.

Base station 101 simultaneously transmits MAC frames to terminals 1 to 4 using resource blocks 1 to 4 in the channel (downlink OFDMA transmission). More specifically, the physical packets containing frames destined for terminals 1 to 4 are transmitted in respective resource blocks 1 to 4 on the basis of the access right on the medium of one frame obtained by preliminary carrier sensing of the channel. In the example in FIG. 4, the frame lengths of the MAC frames contained in the physical packets are the same.

Figure 5A:
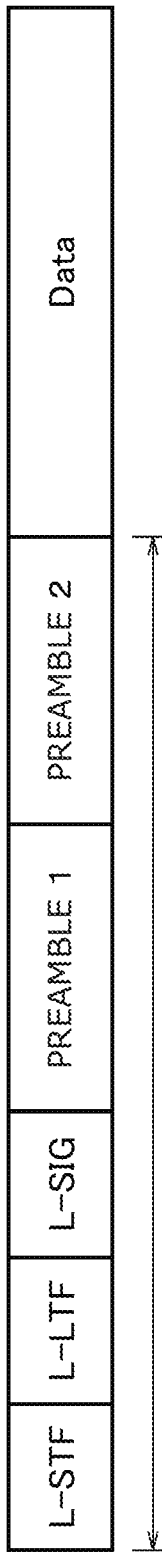
FIGS. 5A and 5B each is a diagram showing a schematic format example of a physical packet.

FIG. 5A is a diagram showing a schematic format example of a physical packet according to this embodiment. This format contains a physical header and a data field. On the beginning side of the physical header, L-STF, L-LTF and L-SIG fields are arranged. After these fields, the fields of preambles 1 and 2 according to this embodiment are arranged. Preamble 1 and 2 may be newly defined fields, or extensions of the fields after L-STF, L-LTF and L-SIG in an existing standard. For example, in the physical packet format of IEEE 802.11ac, which is the existing standard, VHT-SIG-A may be extended to define preamble 1, and VHT-SIG-B may be extended to define preamble 2. In at least one of a position between preambles 1 and 2, a position before preamble 1, or a position after preamble 2, another field may reside. For example, between preambles 1 and 2, STF and LTF fields may be arranged in this order. STF and LTF fields may be newly defined fields, extensions of VHT-STF and VHT-LTF of an existing standard, or fields identical to these fields.

L-STF, L-LTF and L-SIG are fields recognizable by the legacy terminal in conformity with IEEE 802.11a or the like (the beginning L represents legacy), and contain information on signal detection, frequency correction, transmission rate (or MCS) and the like. L-STF, L-LTF and L-SIG are required to be transmitted in the channel width band (20 MHz) so as to be received and decoded by legacy terminals. Consequently, in a case of OFDMA transmission to multiple terminals in multiple resource blocks in one channel, the contents of L-STF, L-LTF and L-SIG of physical packets transmitted to the terminals are required to be the same. Accordingly, even the legacy terminals can receive and decode L-STF, L-LTF and L-SIG common to these physical packets.

L-STF, L-LTF and L-SIG are sometimes called legacy fields in a collective manner. FIG. 4 shows the legacy field as a rectangle over four resource blocks so as to represent that the legacy field is transmitted in channel width band (20 MHz).

Preamble 1 transmitted by the base station contains information commonly recognizable by the OFDMA compatible terminals. Information set in preamble 1 of the header of the physical packet to be OFDMA-transmitted from the base station to multiple terminals may be, for example, information that identifies multiple terminals (target terminals) serving as OFDMA transmission targets. The information for identifying the multiple terminals may be information (identifiers) that individually identifies (identify) these terminals, or the group ID of a group to which the multiple terminals commonly belong. The group ID is allocated by the base station and notified to the terminals when or after the terminals join the BSS of the base station (i.e., at the time of association process). The base station can generate and manage multiple groups, and grasps the terminals on a group-by-group basis. In some cases, an identical terminal belongs to multiple groups. When the group to which the terminal belongs is changed, the changed group ID is notified to the terminal. Examples of information for identifying individual terminals include association IDs (AIDs) assigned by the base station at the time of association with the base station, or the terminals' MAC addresses, and both of them. The information for individually identifying the terminals are not limited to the examples described here as long as the terminals can be identified.

Another example of information set in this preamble 1 may be information for identifying the resource blocks used by the OFDMA target terminals. For example, in a case where terminals 1 to 4 are designated as target terminals, information for identifying resource blocks 1 to 4 may be set for terminals 1 to 4. More specifically, multiple fields that designate the number of resource blocks may be provided, and the resource block to be used may be identified on the basis of the number of resource blocks designated by the field at the position for the own terminal (sometimes called the user position). In this case, the position of the field for the own terminal is preliminarily notified at the time of association or any timing thereafter. The number of resource blocks allocated to respective terminals may be allocated to terminals in a descending order of precedence of field position. At this time, the order of allocation is defined in each of the resource blocks. The resource blocks are allocated in this order. In the example described before, one is set, as the number of resource blocks, in each of the fields for terminals 1 to 4. In this case, it is preliminarily defined that allocation is performed according to the order of resource blocks 1 to 4.

In a case where identifiers for individually identifying the respective resource blocks are defined, the identifiers of the resource blocks as many as the number of resource blocks to be used may be allocated at the positions (user positions) of the fields for the respective terminals in preamble 1. Alternatively, the correspondence information between the identifier, such as AID of the terminal, and the identifier of the resource block to be used by the terminal may be set in preamble 1.

Preamble 1 may contain information pertaining to the scheme (LDPC (Low Density Parity Check), convolution, etc.) of error correction code used for at least one of preamble 2 or the data field.

Preamble 1 may contain the total number of resource blocks used for OFDMA. For example, in a case where the resource block used in the channel is identified according to the total number of resource blocks used in one channel width band (e.g., the total number of resource blocks from the side of high frequency side or the low frequency side), the resource block used in OFDMA communication can be identified on the basis of the total number. Alternatively, in a case where the arrangement of resource blocks (the correspondence between resource blocks and subcarriers) varies according to the total number, the resource block used in OFDMA communication can be identified on the basis of the total number.

Preamble 1 may contain information pertaining to the intervals between the resource blocks (the number of subcarriers residing between adjacent resource blocks). For example, in a case where multiple arrangement patterns of resource blocks used for OFDMA exist in the channel and the intervals between resource blocks are different among the arrangement patterns, the resource block used for OFDMA communication may be identified on the basis of information pertaining to the intervals.

Each terminal may grasp the correspondence between each of the resource blocks and the subcarriers belonging to the resource block. The correspondence may be predefined by the system or specifications. Alternatively, the correspondence may be defined by the base station, and may be notified in the beacon frame, an association response frame, a newly defined frame, any control frame or the like, at the time of association with the terminal or at another timing. As described before, the correspondence between the resource block and subcarriers can vary according to the number of resource blocks to be used, in some cases. The resource block used by the terminal may be predetermined. In this case, in preamble 1, setting of information for identifying the resource block used by the terminal may be omitted. Preamble 1 which is uplink-transmitted from the terminal to the base station stores therein information recognizable by the base station (information identifying the base station etc.).

Preamble 1 is transmitted in channel width band (20 MHz) as with the case of the legacy field. Consequently, in a case where the physical packet is OFDMA-transmitted to multiple terminals in multiple resource blocks in one channel, the content of preamble 1 of the physical packet transmitted to the terminals is required to be the same. The OFDMA compatible terminal having received preamble 1 receives and decodes the signal in the channel width band. FIG. 4 shows preamble 1 as a rectangle over four resource blocks so as to represent that preamble 1 is transmitted in channel width band (20 MHz). L-STF, L-LTF, L-SIG and preamble 1 are comprehensively called a common preamble, in some cases.

Preamble 2 stores information required to decode the data field with respect to each corresponding resource block. For example, the modulation and coding scheme (MCS: Modulation and Coding Scheme) required to decode the MAC frame in the data field transmitted in the resource block is stored. Preambles 2 are transmitted to the target terminals in the bands for the respective resource blocks, instead of one channel width band. That is, preambles 2 are transmitted by frequency multiplexing. The OFDMA target terminal determines that the own terminal is designated in preamble 1, subsequently receives preamble 2 in the resource block designated in preamble 1 or having preliminarily been designated, and preamble 2 is decoded, thereby obtaining information, such as MSC, required to decode the data field (MAC frame). Preambles 2 are transmitted to the terminals in the bands for the respective resource blocks, and the contents may be different from each other. Note that if the contents of preambles 2 are the same, no problem occurs. Preamble 2 and the data field are common in that transmission is performed with respect to each resource block. Consequently, it can be regarded that a field containing preamble 2 and the data field exists. In this case, the field contains preamble 2 and the data field, and may further contain another field as long as the other field is transmitted in the same resource block. FIG. 4 illustrates preambles 2 in rectangles separated among resource blocks so as to represent that preambles 2 are transmitted in bands for the respective resource blocks. Numerals described in the rectangles representing preamble 2 indicate the numbers of terminals serving as destinations, for the sake of convenience. For example, rectangular preamble 2 in which numeral 1 is written means that information destined for terminal 1 is contained but does not mean that information for identifying the terminal is contained (it is a matter of course that the information for identifying the terminal may be contained).

The data field contains the MAC frame. As with preambles 2, the MAC frames are transmitted in bands for the resource blocks to the respective terminals. That is, the data fields are transmitted by frequency multiplexing. The MAC frames transmitted in the resource blocks are frames destined for the respective terminals. The contents of these MAC frames may be different from or the same as each other. The MAC frames transmitted in the respective resource blocks may be any of the data frames, management frames and control frames, and a combination thereof. The data frame may not only be the single MAC frame but also be an aggregation frame (A-MPDU) or the like in which multiple MAC frames are aggregated. In the example in FIG. 4, the data frame is set in the data field of the physical packet which is downlink-OFDMA-transmitted from the base station. The diagram illustrates this as "MPDU (Data)". As described before, "MPDU" may indicate not only a single MAC frame but also an aggregation frame (A-MPDU) or the like. This embodiment assumes the aggregation frame. FIG. 4 illustrates the MAC frame in rectangles separated among resource blocks so as to represent that the MAC frame (data frame) is transmitted in the bands for the respective resource blocks, in a manner analogous to that of preamble 2. Numerals described in the respective rectangles indicate numbers of terminals serving as destinations, for the sake of convenience. For example, the rectangular MAC frame in which numeral 1 is written is a frame destined for terminal 1 (e.g., RA is the MAC address of terminal 1).

The format of each field of the physical header has been described mainly assuming the case of downlink OFDMA communication. In a case of another type of communication, the format of the field (preamble 1, preamble 2, or both of these preambles) may be different according to the type of communication.

Figure 5B:
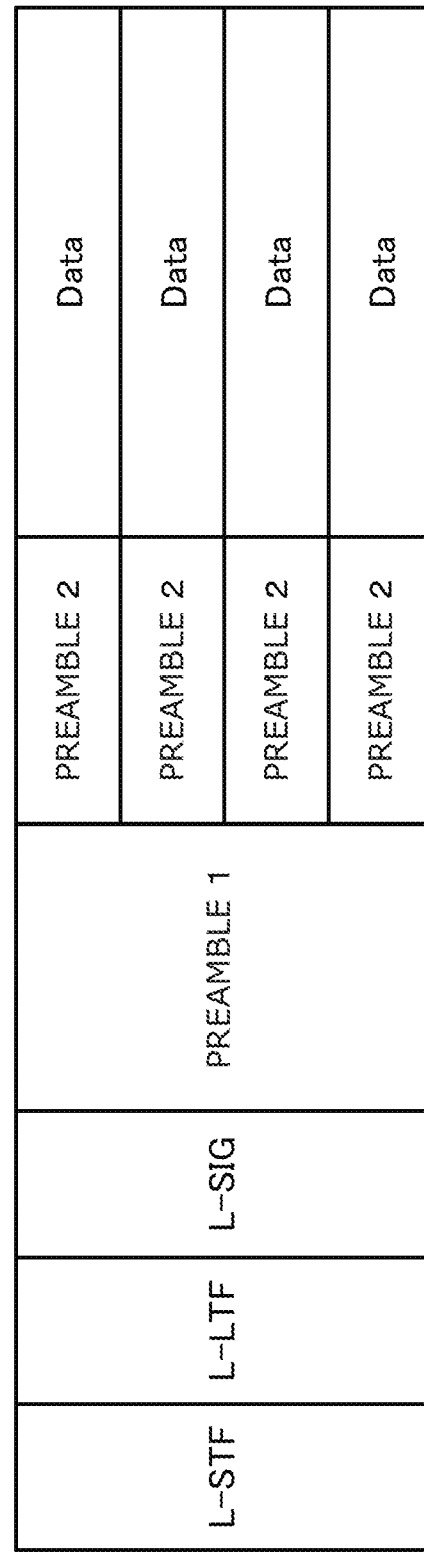

As described before, as for the physical packet that is OFDMA-transmitted from the base station, the legacy field and preamble 1 are transmitted in the channel bandwidth, and preamble 2 and the data field are transmitted in units of resource blocks. That is, in this case, the physical packet that is OFDMA-transmitted from the base station contains the legacy field and preamble 1 that are common to the target terminals, and multiple preambles 2 and multiple data fields on a terminal-by-terminal basis, as shown in FIG. 5B. The physical header contains the legacy field and preamble 1 that are common to the target terminals, and multiple preambles 2 on a terminal-by-terminal basis.

Figure 6:
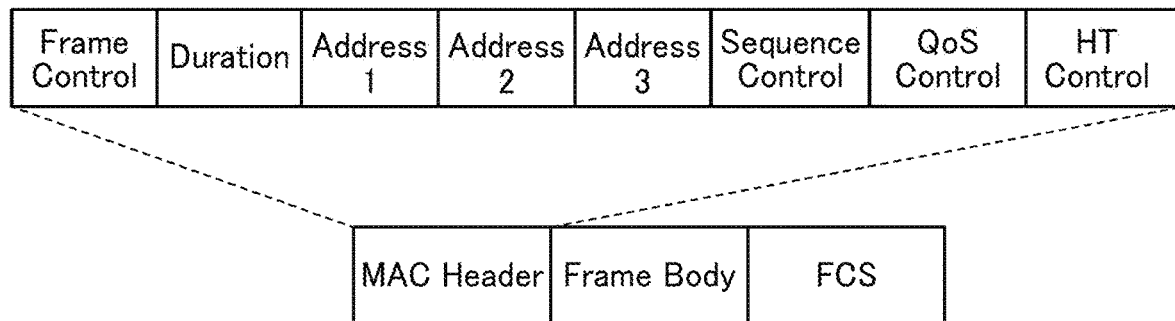
FIG. 6 is a diagram showing a basic format example of a MAC frame.

FIG. 6 is a diagram showing a basic format example of a MAC frame. The data frame, management frame, and control frame basically include such a frame format. This frame format includes a MAC header, a Frame body field, and a FCS field. The MAC header includes a Frame control field, a Duration field, an Address 1 field, an Address 2 field, an Address 3 field, a Sequence Control field, a QoS Control field and an HT (High Throughput) control field. Not all of these fields do not necessarily exist. Alternatively, some fields do not exist in some cases. Another field that is not shown in FIG. 6 may exist. For example, an Address 4 field may further exist. The Address 1 field stores therein a Receiver Address (RA). The Address 2 field stores therein a Transmitter Address (TA). The Address 3 field stores therein a BSSID (Basic Service Set IDentifier) which is the identifier of a BSS (in some cases, all the bits are set to 1 for all the BSSIDs as targets; wildcard BSSID) or a TA, according to the usage of the frame.

In the Frame Control field, two fields that are Type and Subtype are set as described before. Broad discrimination among the data frame, management frame and control frame is made according to the Type field. Narrow discrimination in the broadly discriminated frames, for example, identification of the BA frame, BAR frame, and a Beacon frame in the management frame, is made according to Subtype field.

As described before, in the Duration field, the medium reservation period is described. When a MAC frame destined for another terminal is received, it is determined that the medium is virtually busy over the medium reservation period from the end of the physical packet containing the MAC frame. Such a scheme for determining that the medium is virtually busy, or the duration during which the medium is virtually regarded to be busy is called a NAV (Network Allocation Vector) as described before.

The QoS field is used for QoS control that is for transmission in consideration of the precedence of the frame. The HT Control field is a field introduced in IEEE 802.11n, and exists in a case where the frame is a QoS data frame or a management frame and when the Order field is set to one. The an HT Control field can be extended to a VHT (Very High Throughput) Control field of IEEE 802.11ac and also to a HE (High Efficiency) Control field of IEEE 802.11ax, which is the next generation LAN standard. In such cases, notification can be made according to various functions of IEEE 802.11n, IEEE802.11ac or IEEE 802.11ax.

In the management frame, an information element (Information Element; IE) assigned the unique Element ID (IDentifier) is set in the Frame Body field; and one or more information elements can be set. The information element is identified by the Element ID, and includes fields which are an Element ID field, a Length field, and an Information field. The Information field stores therein the content of information to be notified. The Length field stores therein information on the length of the Information field. In the FCS field, FCS (Frame Check Sequence) information is set as a checksum symbol used to detect an error in the frame on the receiver side. An example of the FCS information may be CRC (Cyclic Redundancy Code) or the like.

In the sequence of FIG. 4, terminals 1 to 4 receive and decode the physical packets transmitted in the multiple resource blocks from base station 101, and obtain the MAC frames allocated to the respective terminals. An error test is performed on the basis of the FCS of the obtained MAC frame. If there is no error, the header and the frame body field (data main body) are processed. For example, in the case of the data frame, data stored in the frame body field is output to the upper layer. In the case of the management frame or control frame, an operation for management or control according to information contained in the frame body field is performed. Here, it is assumed that the MAC frame is an aggregation frame that contains multiple data frames.

Terminals 1 to 4 generate acknowledgement response frames each containing bitmap information indicating whether the corresponding data frame has successfully been received or not, on the basis of the result of error test for the corresponding data frame in the aggregation frame. Terminals 1 to 4 each transmit a physical packet that contains a BA frame (Block ACK frame) that is an acknowledgement response frame in the same resource block as the resource block in which the MAC frame has been received, SIFS-period after completion of reception of the frame from the base station. The uplink OFDMA transmission has thus been performed from terminals 1 to 4 to base station 101. The lengths of BA frames transmitted from the respective terminals are assumed to be the same as each other. The SIFS period is an example. Alternatively, any period may be adopted as long as the period is a certain constant period. This applies to every representation of SIFS period in the following description. As with the physical packet which is OFDMA-transmitted from the base station, the legacy field and preamble 1 of the physical packet containing the BA frame is transmitted in the channel width band (20 MHz width band). Preambles 2 and the MAC frames that are fields after preamble 1 are transmitted in the bands for the respective resource blocks. To represent these features, in FIG. 4, the legacy field and preamble 1 in the header of the physical packet transmitted by each terminal is represented as a rectangle over four resource blocks, and subsequent preambles 2 and the MAC frames are represented as rectangles contained only in the respective resource blocks. "AP" described in the rectangle representing the MAC frame means that the destination of the MAC frame is the base station (e.g., RA is the BSSID or MAC address of the base station).

Here, the physical packets which is OFDMA-transmitted in resource blocks 1 to 4 from the base station are received even by terminals other than terminals 1 to 4 only if the terminals are in states capable of receiving the signal from the base station. For example, the physical packet is received even by the non-target terminal (here, terminals 5 and 6). At this time, in a typical case, it is believed that the non-target terminal (without the function of this embodiment) decodes preamble 1 of the header of the physical packet, and resultantly decodes no field thereafter, and detects an error assuming that the physical packet has not been received correctly. In this case, the non-target terminal sets the EIFS period in carrier sensing at the next channel access, as described before. For example, at the time of completion of downlink OFDMA transmission of physical packets from the base station in FIG. 4, CCA becomes idle. In a case where the OFDMA non-target terminal performs carrier sensing for obtaining a channel access right, the EIFS period is set for carrier sensing in a certain period before backoff (see "EIFS SETTING 1" in FIG. 4). Likewise, also in a case where multiple physical packets are OFDMA-transmitted from multiple target terminals to the base station, the non-target terminals cannot receive the MAC frames in the physical packets correctly, and a reception error occurs. For example, as a result of decoding the legacy field and preamble P1, it is determined that the physical packet is not related to the own terminal, and a reception error is detected assuming that decoding of fields thereafter is not to be performed. Even if preamble 2 and the MAC frame of the field thereafter are received, the signal in which the signals from multiple terminals are duplicated is tried to be decoded. Consequently, the signal is not correctly decoded. A reception error is detected anyway. As a result, in carrier sensing at the next channel access, the EIFS period is set as carrier sensing in a certain period before backoff. For example, as shown in FIG. 4, at the time of completion of uplink OFDMA transmission of physical packets from multiple target terminals, CCA becomes idle. In a case of carrier sensing for obtaining a channel access right, the EIFS period is set for carrier sensing in a certain period before backoff (see "EIFS SETTING 2" in FIG. 4). The reception errors can include not only the example described here but also the examples described before, for instance, the example where MCS is not supported (Unsupported Rate) and the example where the carrier is lost (Carrier Lost).

Here, the EIFS period is described. For example, the EIFS period is defined as a period obtained by adding an SIFS period, an ACK frame time length (the length of a period required to transmit an ACK frame) and a DIFS/AIFS [AC] period together.

That is,

EIFS period=SIFS period+ACK frame time length+ DIFS/AIFS [AC] period.

The AIFS is an IFS determined based on the DIFS further in consideration of the concept of QoS (Quality of Service). AC of AIFS [AC] means an access category. The value of AIFS is set according to the priority (access category) determined according to the type and the like of data to be transmitted. The higher the priority is, the lower the value of AIFS is (the backoff period is also set advantageously).

Figure 7A:
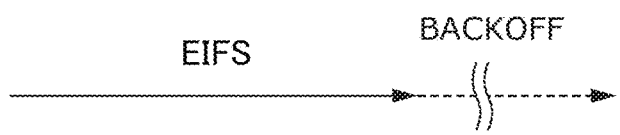
FIGS. 7A and 7B each is a diagram schematically showing a carrier sense period.
Figure 7B:
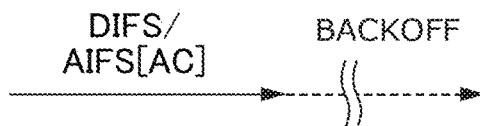

In a case of performing carrier sensing for obtaining the channel access right after OFDMA communication, the OFDMA target terminal or base station sets a normal period, i.e., the DIFS/AIFS [AC] period, as a certain period of carrier sensing to be performed before backoff, unless there are special circumstances, such as a reception error. Here, DIFS/AIFS [AC] period means one of DIFS and AIFS [AC] periods. The case without consideration of the QoS of data indicates the DIFS period. The case with consideration of the QoS indicates the AIFS [AC] period determined according to the type and the like of data to be transmitted. According to the relational expression of the EIFS period described before, the EIFS period is longer than the DIFS/AIFS [AC] period. Consequently, the terminal having detected a reception error is more disadvantageous in obtainment of the access right on the medium than terminals having not detected the error. FIG. 7 schematically shows this fact. FIG. 7A schematically shows the carrier sensing period in a case of setting the EIFS period (the sum of the EIFS period and the backoff period). FIG. 7B schematically shows the carrier sensing period (the sum of DIFS/AIFS [AC] period and the backoff period) in a case of setting the DIFS/AIFS [AC] period. The EIFS period is longer than the DIFS/AIFS [AC] period. It can thus be understood that the terminal having detected a reception error has a long standby time and is disadvantageous in obtainment of the access right. The value of the backoff period subsequent to the EIFS period and the DIFS/AIFS [AC] period is randomly determined. Even during the backoff period, the carrier sensing is continuously performed (backoff). The backoff is sometimes omitted.

To solve the unfairness described before, the OFDMA compatible terminal according to this embodiment executes the following operation as one of the characteristics. When the OFDMA compatible terminal according to this embodiment receives a physical packet which is downlink-OFDMA-transmitted from the base station and the own terminal is not designated as the OFDMA compatible terminal by preamble 1, that is, the terminal is the non-target terminal, this terminal identifies at least one resource block from among the resource blocks, decodes the data field of the identified resource block, and obtains the MAC frame. To obtain the MAC frame, the data field may be decoded using the information (MCS information, etc.) set in preamble 2 arranged before the MAC frame. The non-target terminal having obtained the MAC frame sets the NAV having the same period as the length of the value (the value pertaining to the duration of suppression of access to the medium) set after completion of MAC frame reception in the Duration field of the header, on the basis of this value. That is, the non-target terminal determines that the RA of the obtained MAC frame is not the MAC address of this terminal, i.e., not the MAC frame destined for the own terminal, thereby setting the NAV having the same length as the value set in the Duration field. The band as the target where the NAV is set is the channel width band where the physical packet has been transmitted. According to the above operation, even receipt of the physical packet containing the MAC frame that is not destined for the own terminal, the non-target terminal correctly decodes the packet. Consequently, the EIFS setting condition described before does not hold. Setting of the NAV based on the header of the MAC frame that is not destined for the own terminal does not prevent the communication of the other terminals, either.

Here, it may be predetermined which resource block the non-target terminal identifies among multiple resource blocks. For example, in a case where the resource block to be used when the own terminal is designated as the target of OFDMA communication is predetermined, this resource block may be selected. Alternatively, in a case where all the resource blocks can be received or decoded, any resource block can be selected. In a case where the resource blocks used in OFDMA-transmission by the base station are variable, preamble 1 may be decoded to grasp the resource blocks in use, and a resource block may be selected from among the grasped resource blocks. In a case of the non-target terminal where the supportable MCS is limited among MSCs usable in BSS 1, preamble 2 of each resource block may be decoded to identify the resource block of the MSC supportable by the own terminal, and the data field of the identified resource block may be decoded in this MCS to obtain the MAC frame.

Figure 8:
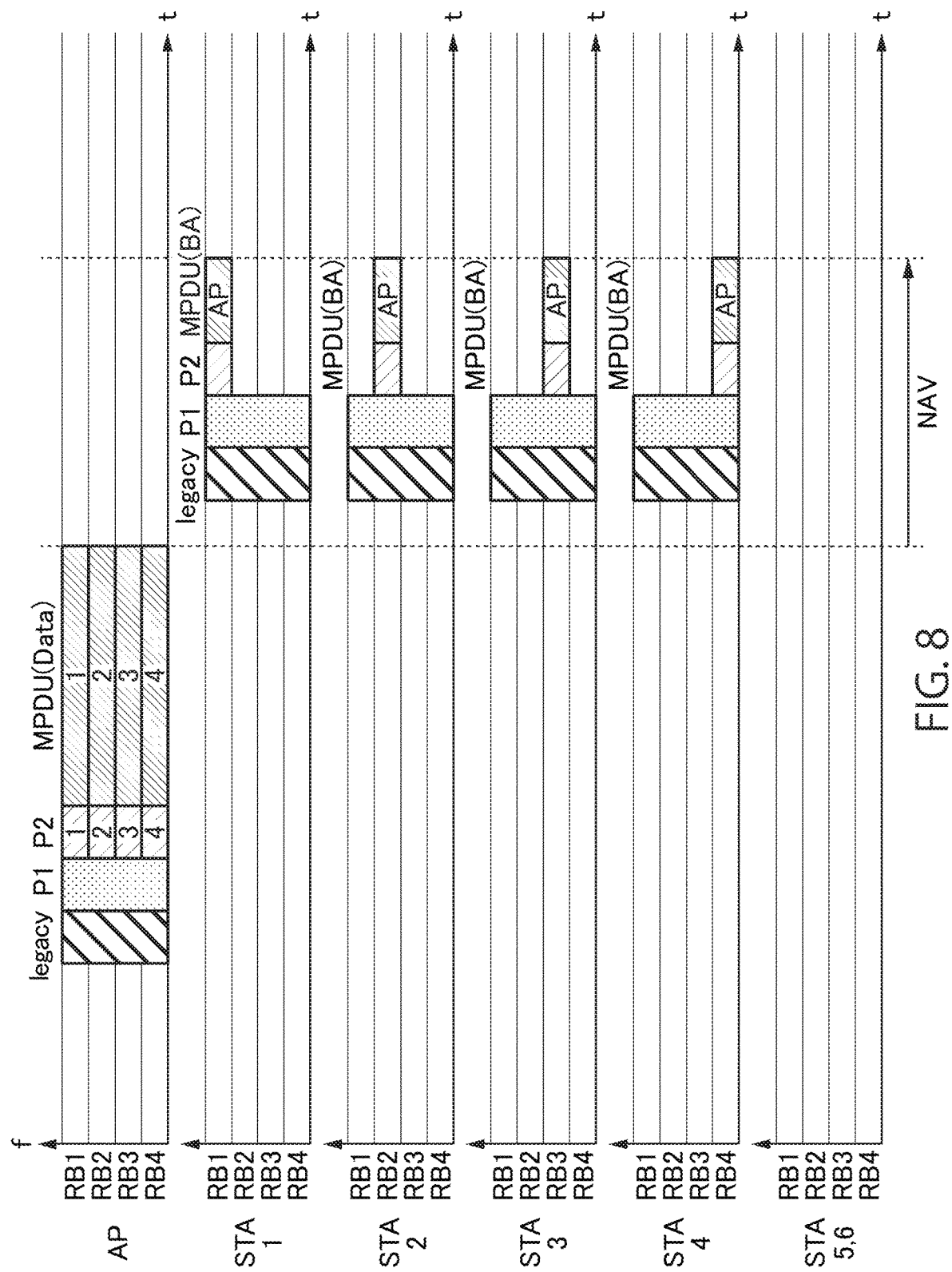
FIG. 8 is a diagram showing an example of an operation sequence according to a first embodiment.

FIG. 8 shows an operation sequence example in a case where terminals 5 and 6 that are non-target terminals set the NAV on the basis of the value described in the Duration field of the MAC frame obtained by decoding. The diagram is the same as FIG. 4 except in that the operation where terminals 5 and 6 correctly decode physical packets downlink-transmitted from the base station and set NAVs and the operation of correctly decoding one of the physical packets uplink-transmitted from terminals 1 to 4 to set (update) NAVs. It is assumed that the lengths of downlink MAC frames (data frames) (time length) are the same as each other, and the lengths of uplink MAC frames (BA frames) are the same as each other. As for the physical packet which is OFDMA-transmitted by base station 101, based on preamble 2 contained in one of the resource blocks, terminals 5 and 6 decode the data field and obtains the MAC frame. The NAV is set after the end of the MAC frame, on the basis of the value of the Duration field in the header of the MAC frame. The values of the Duration fields are set in conformity with the ends (coinciding with the ends of physical packets) of the MAC frames which are uplink-OFDMA-transmitted by terminals 1 to 4. In the example in FIG. 8, the time points of the ends of the uplink-OFDMA-transmitted MAC frames are the same. Accordingly, the ends of the pieces of NAV duration are the same. Alternatively, the time point of the end of the NAV duration may be set at a time point after or before the end of the uplink MAC frame. In the case of setting the time point therebefore, it is preferred that the time point be a time point after a timing at which the non-target terminal is incapable of recognizing that the reception be at least reception of the uplink-transmitted physical packet (or reception of the MAC frame) and only capable of recognizing a busy state. For example, at least a time point after the beginning of the legacy field is set. Terminals 5 and 6 receive multiple physical packets which are uplink-transmitted from terminals 1 to 4, and decode one of these packets in a manner analogous to the case of downlink transmission from the base station. The legacy fields and preambles 1 of these physical packets are set to values common to terminals 1 to 4. The format of preamble 1 in the case of uplink transmission may be the same as or different from the format of downlink preamble 1. Terminals 1 to 4 set the same value in preamble 1 on the basis of a predetermined rule. The format of preamble 2 may be the same or different from the format of downlink preamble 2. Preamble 2 stores, for example, information required to decode the data field for each resource block corresponding thereto. Terminals 5 and 6 decode the legacy field and preamble 1, further decode preamble 2 in the resource block selected from among the resource blocks, further decode the data field of the subsequent same resource block, and obtain the MAC frame. The NAV is updated on the basis of the Duration field in the header of the MAC frame. Terminals 5 and 6 may select the resource block to be decoded in a manner analogous to the case of downlink transmission. Alternatively, the same resource block as the resource block selected in downlink transmission may be selected. According to the above operation, even if terminals 5 and 6 receive physical packets destined for the base station from terminals 1 to 4, terminals 5 and 6 correctly decode one of these packets, thereby preventing the condition for EIFS setting from being satisfied. The NAV is subsequently set (up to the end of the physical packet to be uplink-transmitted, in this case) on the basis of the header of the MAC frame contained in the correctly decoded packet, thereby preventing the communication of the other terminals from being interfered, too.

The headers of the packets which are uplink-multi-user-transmitted from terminals 1 to 4 contain the legacy field, preamble 1 and preamble 2. However, the configuration of the header is not limited to this configuration. For example, a configuration can be adopted that includes the legacy field and preamble 1 but includes no preamble 2. In this case, for example, the base station may decode the data field of the uplink-multi-user-transmitted packet using decoding information (MCS, etc.) analogous to the encoding information of the downlink multi-user transmission taken place immediately therebefore. The base station starts reception within a certain fixed time period, e.g., SIFS+slot period (total time period of SIFS and slot time), after the last downlink multi-user transmission. In a case where a condition that the received packet is an uplink-multi-user-transmitted packet is satisfied, the base station may hold the last decoding information. In a case where the condition is not satisfied or SIFS+slot period has elapsed, the base station may remove the last decoding information. The decoding information required to decode the data field may be contained in the legacy field or preamble 1 or both of them.

It is assumed that terminals 5 and 6 perform carrier sensing in order to obtain the access rights on the medium after the NAV duration has elapsed. During uplink OFDMA communication, one of the uplink-transmitted physical packets is selected and correctly decoded, thereby suppressing setting of the EIFS period. Consequently, as with the normal case, the DIFS/AIFS [AC] period is set. Likewise, also in a case where base station 101 and terminals 1 to 4 start carrier sensing to obtain the access rights on the medium after uplink OFDMA transmission, the DIFS/AIFS [AC] period is set. Consequently, the unfairness of opportunity of obtaining the access right between the target terminals and base station and the non-target terminals is solved. When the carrier sensing results are idle and the access rights are obtained, terminals 5 and 6 can transmit frames (more specifically, packets with physical headers added). As an example of a packet or frame to be transmitted, what is to be described later in a fifth embodiment may be transmitted.

In a case where the MAC frames which are downlink-transmitted from the base station have different lengths, padding data items may be added to the ends of short MAC frames to adjust the frames so as to have the same length. Alternatively, in the case of consideration of difference between uplink MAC frames (BA frames) serving as responses, the following configuration may be adopted. That is, the pieces of NAV duration are set so that the ends of the pieces of NAV duration set according to the respective MAC frames which are downlink-OFDMA-transmitted from the base station can indicate the same time point. Consequently, for example, even if the ends of uplink MAC frames (BA frames) serving as responses are different, alignment of the ends of the pieces of NAV duration can maintain the equality among at least non-target terminals. Furthermore, the time point of the ends is set to coincide with the end of the longest MAC frame among the uplink MAC frames, thereby allowing the equality to be maintained among all the terminals including the non-target terminals, target terminals and base station.

In a case where the base station transmits multiple frames to multiple terminals (transmits multiple frames to terminals 1 to 4 in downlink OFDMA in the example in FIG. 8), the transmitted multiple frames may be the same as or different from each other. In a case where, as typical representation, it is represented that the base station transmits or receives multiple frames or the multiple X-th frames, these frames or the X-th frames may be the same as or different from each other. "X" may be assigned any value according to situations.

In the operation sequence example described before, in the case where the OFDMA non-target terminal is implemented with a function of power save mode, the terminal may change the operation according to whether to be in the power save operation or not. For example, a parameter the "power save mode activated" is provided. The state is determined as a state where the power save mode operation is performed when the parameter has a value of true(1). The state is determined as a state where the power save mode operation is not performed when the parameter has a value of false(0). Here, it may be configured such that the non-target terminal identifies at least any of the resource blocks and decodes the MAC frame to set the NAV when the parameter is false(0), and the terminal does not perform resource block identification and MAC frame decoding when the parameter is true. During the power save mode operation, the packet receiving operation is not performed. Consequently, the EIFS setting condition does not hold. Alternatively, a parameter of power management mode may be provided. When the parameter has a value of active(1), the mode is not the power save mode. When the parameter has a value of power save(2), the mode is the power save mode. In this case, it may be configured such that the non-target terminal identifies at least any of the resource blocks and decodes the MAC frame to set the NAV when the parameter is active(1), and the resource block identification and MAC frame decoding are not performed when the parameter is power save(2). Alternatively, irrespective of power saving, the terminal may include a parameter pertaining to presence or absence of execution of the operation according to this embodiment. When the parameter has a value of execution true(1) and the own terminal is not designated as an OFDMA target, at least any resource block is identified and the MAC frame is decoded to set the NAV. On the other hand, it may be configured such that when the parameter has a value of execution false(0) and the own terminal is not designated as an OFDMA target, the resource block identification and MAC frame decoding are not performed. Thus, the power consumption can be saved. Here, it may be controlled such that even without resource block identification and MAC frame decoding, it is not determined to be a reception error on the physical layer, and the EIFS period is not internally set. The value of the parameter can be set through input by a user, or switched according to the remaining amount of battery of the terminal. For example, in a case of a state requiring power saving, such as a case where the remaining amount of battery is equal to or lower than a threshold, the value of the parameter may be set to execution false(0). The value of the parameter may be switched by MAC/PHY manager 60 or MAC processor 10.

To prevent the EIFS period from being set after OFDMA communication is finished (BA frame transmission by each target terminal is completed), a configuration may be considered that sequentially transmits the BA frames from each terminal in the legacy format (the format of the existing standard without preambles 1 and 2), instead of OFDMA transmission. In this case, the non-target terminal (and the legacy terminal) correctly receives the BA frame (NAV setting is also expected), and the EIFS period can be prevented from being set. However, this configuration cannot simultaneously transmit the BA frames. Consequently, the efficiency is reduced. On the contrary, this embodiment can prevent the EIFS period of the non-target terminal from being set even in the case where the BA frame is OFDMA-transmitted as with FIG. 8. Consequently, reduction in efficiency can also be prevented.

As described before, in this embodiment, the OFDMA non-target terminal also decodes the data field of at least one resource block, obtains the MAC frame destined for another terminal or the base station, and analyzes the Duration field, thereby setting the NAV. The OFDMA compatible terminal according to this embodiment may notify whether the terminal has a capability of performing such decoding and the NAV to the base station. The notification may be made, for example, in an association request frame in an association process, or through notification in a management frame or the like at any timing after association. The base station may control execution of OFDMA communication on the basis of the notified capability. For example, in a case where the ratio of the number of terminals having the capability among the terminals connected to the own station is equal to or lower than a threshold, this station may determine not to execute OFDMA communication or to limit the communication. Alternatively, it may be determined to execute OFDMA communication only in a case where the ratio is higher than a threshold. Control and determination that are different from those described here may be performed.

In this embodiment, through the received physical packet, the data field of the resource block identified as described before is decoded to obtain the MAC frame (the MAC frame not destined for the own terminal), and the NAV is set according to the value set in the Duration field. Thus, the EIFS period can be prevented from being set, thereby allowing the opportunities of obtaining access rights to be the same conditions as those of the OFDMA target terminals and the base station after OFDMA communication.

Figure 9:
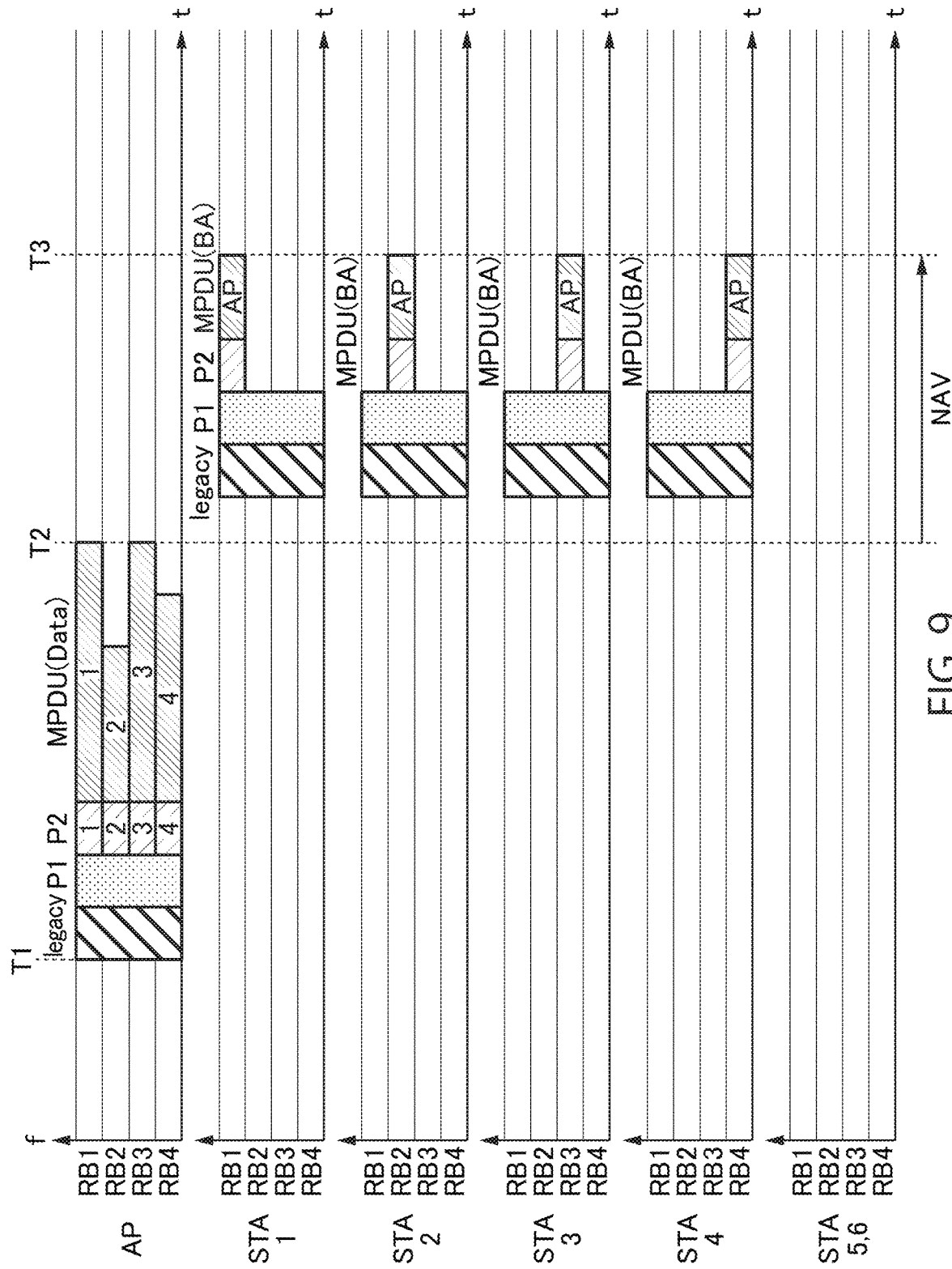
FIG. 9 is a diagram showing another example of the operation sequence according to the first embodiment.

In the sequence described before, the data field lengths (MAC frame lengths) of the resource blocks OFDMA-transmitted from the base station are the same (in the case where the terminals have different lengths of data items to be transmitted, the terminals adjust the lengths with respective padding data items). As another example, as shown in FIG. 9, this embodiment is applicable even to a case where the data field lengths (PSDU lengths) of the resource blocks are different from each other. Three examples of the method in this case are described below.

A first method adjusts and sets the NAV values (the values of Duration fields) so that the ends of the NAVs for the respective terminals can be the same time point. In this case, if the PSDU lengths of the resource blocks (or MPDU lengths) are different, values set in the Duration fields or the like of the respective MAC frames become different accordingly. Thus, the NAVs can concurrently finish, and, for example, the ends of NAVs can coincide with the end of the uplink-OFDMA-transmitted physical packet accordingly.

This configuration can also exert advantageous effects analogous to those of the sequence of FIG. 8. Although the OFDMA target terminals finish reception of MAC frames at different timings, carrier sensing is performed in the channel width, and the SIFS period is measured from the time point at which the state becomes idle, or the end of the MAC frame completely received last (more specifically, the end of the physical packet) is calculated by any method (e.g., the following second method) and the SIFS period is measured from the time point, thereby allowing the timings of uplink transmission of the respective terminals to coincide with each other.

The second method sets information for calculating the length of a physical packet which is downlink-OFDMA-transmitted (the length to the end of the PSDU having the largest length if PSDUs destined for multiple terminals are comprehensively regarded as one) in the L-SIG field or another field of the physical packet. The non-target terminal calculates the physical packet length (occupation period) from information on the field, and sets the NAV after the occupation period. The physical packet length (occupation period) is the length of T2–T1 in the example in FIG. 9. The common NAV value is set in the Duration field of each MAC frame. In this case, the end of NAV is configured to coincide with the time point (T3 in FIG. 9) of the end of each BA frame (more specifically, physical packet) to be uplink-OFDMA-transmitted. The OFDMA target terminals can cause the timings of uplink transmission to coincide in a manner analogous to the first method. Here, in an example of setting information for calculating the physical packet length (occupation period), the Rate field and Length field of the L-SIG field (defined in IEEE 802.11 standard) may be used. For example, the base station calculates the physical packet length (occupation period), that is, the time length (72 Mbps) required when receiving the physical packet at an actual rate, on the basis of multiple PSDUs (MAC frames, etc.) destined for multiple terminals. The base station determines the values of Rate field and Length field so that the physical packet length can be calculated on the basis of these Rate field (rate field) and Length field (length field). For example, the Rate field is set to a value representing 6 Mbps. The Length field is set to the data length (which may be the number of octets or be in another unit) coinciding with the physical packet length calculated as described before in the case of receipt of the physical packet at 6 Mbps. (The actual reception rate is higher than 6 Mbps. It can thus be believed that the Length field has a value shorter than an actual packet length. The actual rate is identified by preamble 2, for example). The non-target terminal calculates the occupation period (PPDU occupation period) of physical packet on the basis of the values of Rate field and Length field of the L-SIG field, and sets the NAV after the calculated occupation period according to the value of Duration field (the values of NAVs in the MAC frames are common as described before) read from any one of the MAC frames. Every resource block can be decoded to have the same time point at which the NAV is finished. The value set in the Rate field is not limited to 6 Mbps. Another value may be set.

As a third method, a case is assumed where before the base station starts downlink OFDMA, the terminal always notifies the longest time length (the length of T2–T1) as the finish time point of the physical packet (PPDU) for downlink transmission (i.e., the packet length). In this case, the base station sets the NAVs having the same value in the MAC frames to be downlink-transmitted. Here, it is assumed that the terminal has a configuration that does not receive the resource block destined for the own terminal but receives the entire PPDU. That is, the terminal does not determine the end of PSDU only for the resource block destined for the own terminal but performs a process of receiving the entire PPDU (i.e., all the individual resource blocks). In this case, the end of the longest PSDU is determined. Also in a case where the non-target terminal receives the downlink-transmitted physical packet, the terminal performs the process of receiving the entire PPDU, determines the end of the PPDU (the end of the longest PSDU), and sets the NAV on the basis of the determination. The length of NAV may be obtained from the Duration field of the MAC frame of any resource block.

In the first to third methods described before, the lengths of BA frames transmitted from the target terminals are the same as each other. However, in a case where the lengths of BA frames are different from each other (see FIG. 13 described later), the NAV may be appropriately adjusted according thereto. For example, the value of each NAV may be determined so that the end of each NAV can coincide with the end of the BA frame completely transmitted last, within the ranges of frameworks of the first to third methods. As described later with reference to FIGS. 16 and 18, after downlink OFDMA transmission, the base station may transmit the BAR frames, and may cause the target terminals to transmit the BA frames as the responses thereto in uplink OFDMA. In the sequences of FIGS. 8 and 9 described before, one frame exchange (transmission and reception) of the downlink OFDMA transmission from the base station and the uplink OFDMA transmission from the target terminals is performed. However, analogous frame exchange may be continuously performed one or more times thereafter. Also in this case, the non-target terminal may decode the downlink physical packet destined for another terminal and uplink physical packet destined for the base station in a manner analogous to that described before (operation for preventing the EIFS setting condition from being satisfied). The types of frames to be exchanged are not limited to the combination of the data frame and the BA frame.

Figure 10:
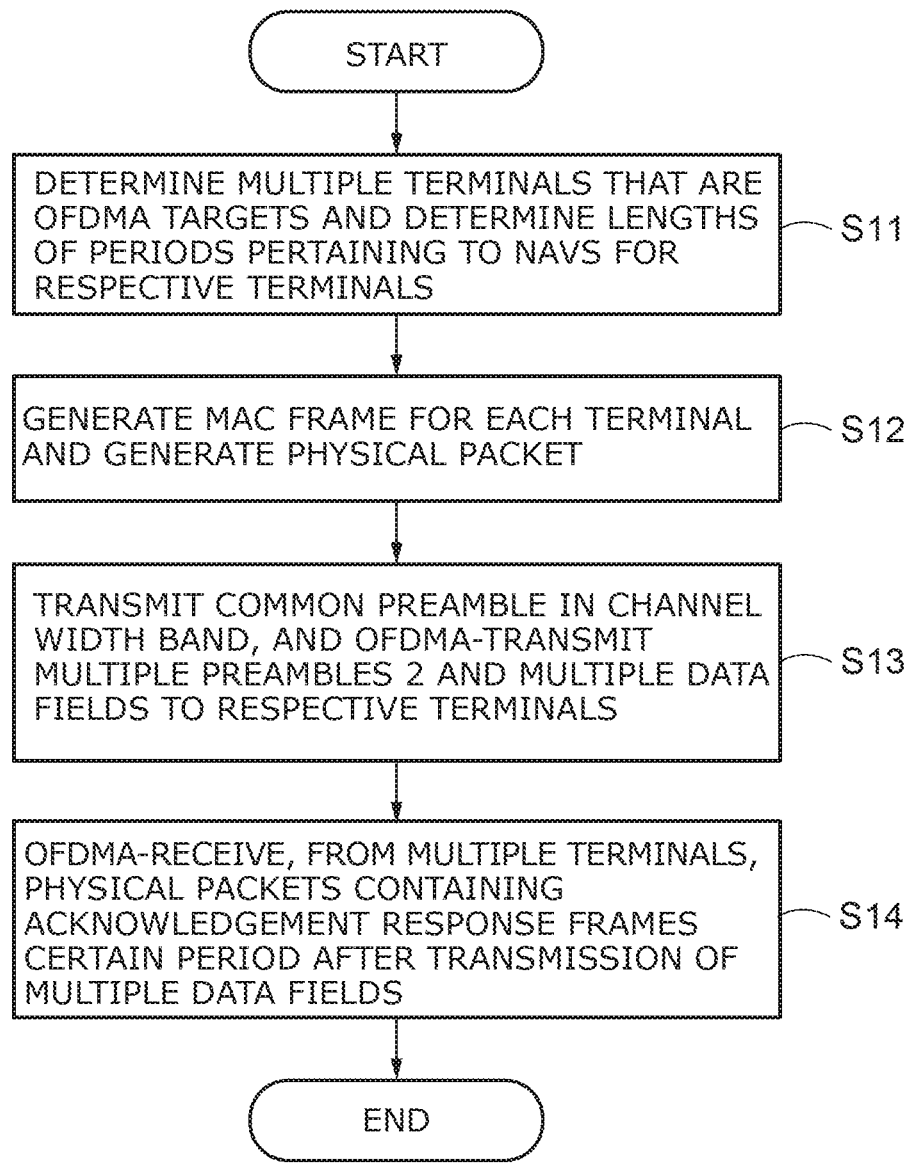
FIG. 10 is a flowchart showing an operation of a base station according to the first embodiment.

FIG. 10 is a flowchart showing an example of the operation of the base station according to this embodiment. The base station determines multiple terminals that are OFDMA targets, and the lengths of the pieces of duration pertaining to the NAVs for the respective terminals (S11). More specifically, the length of the pieces of NAV duration are determined so that the time points of the ends of the pieces of NAV duration can be the same, on the basis of the lengths of multiple MAC frames transmitted to multiple terminals and the lengths of BA frames (more specifically, the lengths of physical packets containing BA frames) with which the terminals respond. At this time, for example, the time point of the end of NAV duration is aligned to the end of the BA frame with which each terminal responds (the end of the BA frame that is received last if the ends of BA frames are different from each other). In a case where the MAC frames to be transmitted to the multiple terminals have different lengths, padding data items may be added to the ends of short MAC frames to adjust the frames so as to have the same length. The base station generates the MAC frame with the Duration field set to a value pertaining to the determined NAV duration length, for each terminal (S12). The base station stores the MAC frames in the respective data fields and adds physical headers to generate physical packets (also S12). The physical header contains: the legacy field; preamble 1 that contains information for identifying the multiple terminals (the identifiers of the individual terminals or the group ID or both of them or the like); and preambles 2 that are for the respective terminals and contain information for decoding the data fields containing the MAC frames.

The base station transmits the legacy field and preamble 1 of the physical packet in the band of one channel width, and subsequently transmits preambles 2 and data fields in OFDMA (MAC frames) (S13).

The base station receives, from the multiple terminals, the physical packets containing acknowledgement response frames (BA frames) containing information pertaining to the success and failure of MAC frame reception through OFDMA, SIFS-period after transmission of the multiple MAC frames (S14).

Figure 11:
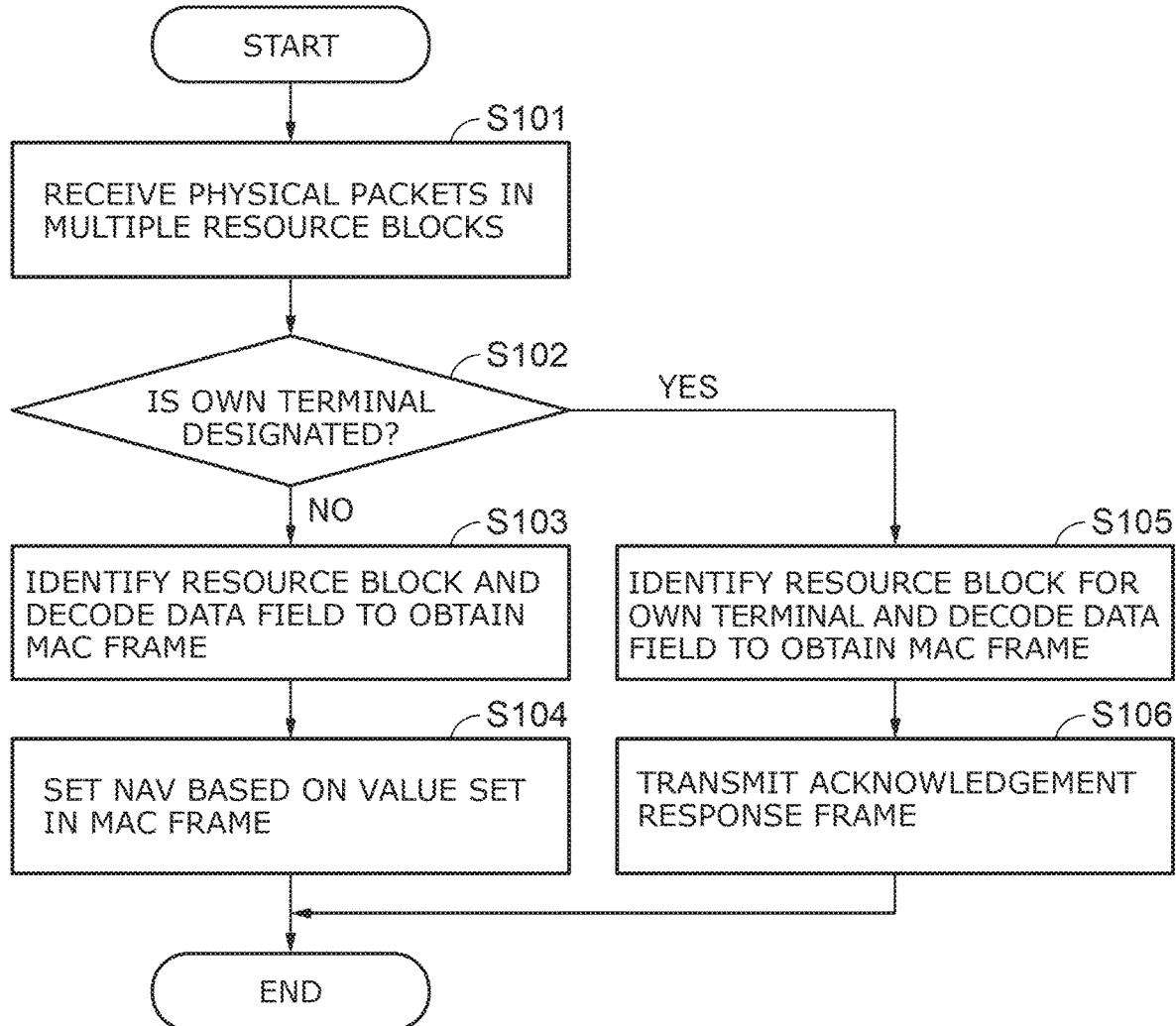
FIG. 11 is a flowchart showing an operation of a terminal according to the first embodiment.

FIG. 11 is a flowchart of an operation in a case where the terminal (OFDMA target terminal) according to this embodiment receives the physical packet transmitted from the base station in OFDMA.

The terminal having received the physical packet decodes the legacy field and preamble 1, and determines whether the own terminal is designated as the OFDMA target terminal (S101 and S102). When information for identifying the own terminal or the group ID to which the own terminal belongs is set in preamble 1, it is determined to be designated.

When the own terminal is not designated as an OFDMA target, the terminal identifies at least one resource block among the multiple resource blocks, and decodes preamble 2 and the MAC frame in the identified resource block (S103). On the basis of the value set in the Duration field of the header of the MAC frame, the NAV is set after completion of reception of the physical packet (more specifically, completion of reception of the MAC frame in the identified resource block) (S104). In a case of obtaining the access right on the medium after lapse of the NAV duration, a normal period (DIFS/AIFS [AC] period) is set as a certain period of carrier sensing before backoff, carrier sensing is performed meanwhile, and subsequently carrier sensing is further performed in a randomly determined backoff period. In a case where the uplink-transmitted physical packet (the physical packet containing the acknowledgement response frame) is received in the NAV duration, the physical packet is decoded, and the NAV is updated on the basis of the Duration field of the MAC frame header contained in the physical packet. The uplink-transmitted physical packet may be multiple physical packets transmitted from the other multiple terminals in uplink-OFDMA, or the physical packets individually transmitted (through single user transmission) at different timings by the other terminals.

In a case where the own terminal is designated as the OFDMA target, the terminal identifies the resource block for the own terminal, and decodes the data field in this data block to obtain the MAC frame (S105). The header of the MAC frame is analyzed, and an operation according to the analysis result is performed. In a case where the MAC frame is the data frame (including the case of aggregation frame), for example, the acknowledgement response frame (more specifically, the physical packet containing the acknowledgement response) is transmitted in this resource block SIFS-period after completion of MAC frame reception (S106). At this time, also from the other terminal designated as the OFDMA target, the physical packet containing the acknowledgement response frame may be simultaneously transmitted. In this case, the multiple acknowledgement response frames are transmitted in uplink OFDMA.

In this embodiment, the OFDMA non-target terminal decodes the data field of at least one resource block among the multiple resource blocks. In a case where the data fields of two or more resource blocks can be decoded, that is, a case where the own terminal supports the modulation and coding schemes for preambles 2 in two or more resource blocks, a resource block with a modulation and coding scheme satisfying a predetermined condition may be selected. For example, the resource block according to the most robust modulation and coding scheme may be selected. The most robust modulation and coding scheme may be, for example, the modulation and coding scheme having the lowest transmission rate, or the modulation and coding scheme having the lowest coding rate. According to another condition, the resource block having the modulation and coding scheme equal to or lower than a certain transmission rate or a certain coding rate may be selected. Such selection can reduce the possibility of detecting an error in the FCS of the frame. Consequently, the possibility of correct decoding becomes improved.

Even if preamble 1 is set to the group ID of the group to which the own terminal belongs, the MAC frame obtained from the resource block for the own terminal can sometimes be not destined for the own terminal (a case where RA is not the address of the own terminal or the like) according to the result of analysis of this MAC frame. Also in this case, the NAV may be set on the basis of the value described in the Duration field of the obtained MAC frame. Thus, the normal decoding operation is performed, and the EIFS setting condition is not satisfied.

In the embodiment described above, the NAV is set on the basis of the Duration field. Alternatively, the value of the length of the period during which the NAV is set may be set in preamble 1, multiple preambles 2 or both of these preambles in the physical header. At this time, the values of the lengths of pieces of NAV duration may be determined so that the ends of the pieces of NAV duration become the same time point, for the respective MAC frames. The terminal extracts the value from among preamble 1 and multiple preambles 2, and sets the NAV after the time point of the end of the data field or the MAC frame in the corresponding resource block during the duration indicated by this value.

According to this embodiment as described above, when the terminal (non-target terminal) that is not designated as an OFDMA target receives the physical packets OFDMA-transmitted from the base station, the terminal decodes the MAC frame (the MAC frame destined for another terminal) in at least one resource block among the resource blocks, and sets the NAV on the basis of the medium reservation period set in the Duration field of the header. Thus, a decoding operation analogous to that in the case of correctly receiving the MAC frame destined for another terminal is performed. Consequently, an error in the PLCP receiving process in the non-target terminal and an error of testing the MAC frame (FCS error) can be prevented from occurring, and the EIFS period can be prevented from being set during carrier sensing to be performed in subsequent access right acquisition.

Second Embodiment

The first embodiment has mainly described the mode of maintaining the equality of opportunity of obtaining access rights among the OFDMA non-target terminals and the target terminals and the base station. This embodiment shows a mode that can maintain the equality of opportunity of obtaining access rights not only for the OFDMA non-target terminals but also legacy terminals.

Figure 12:
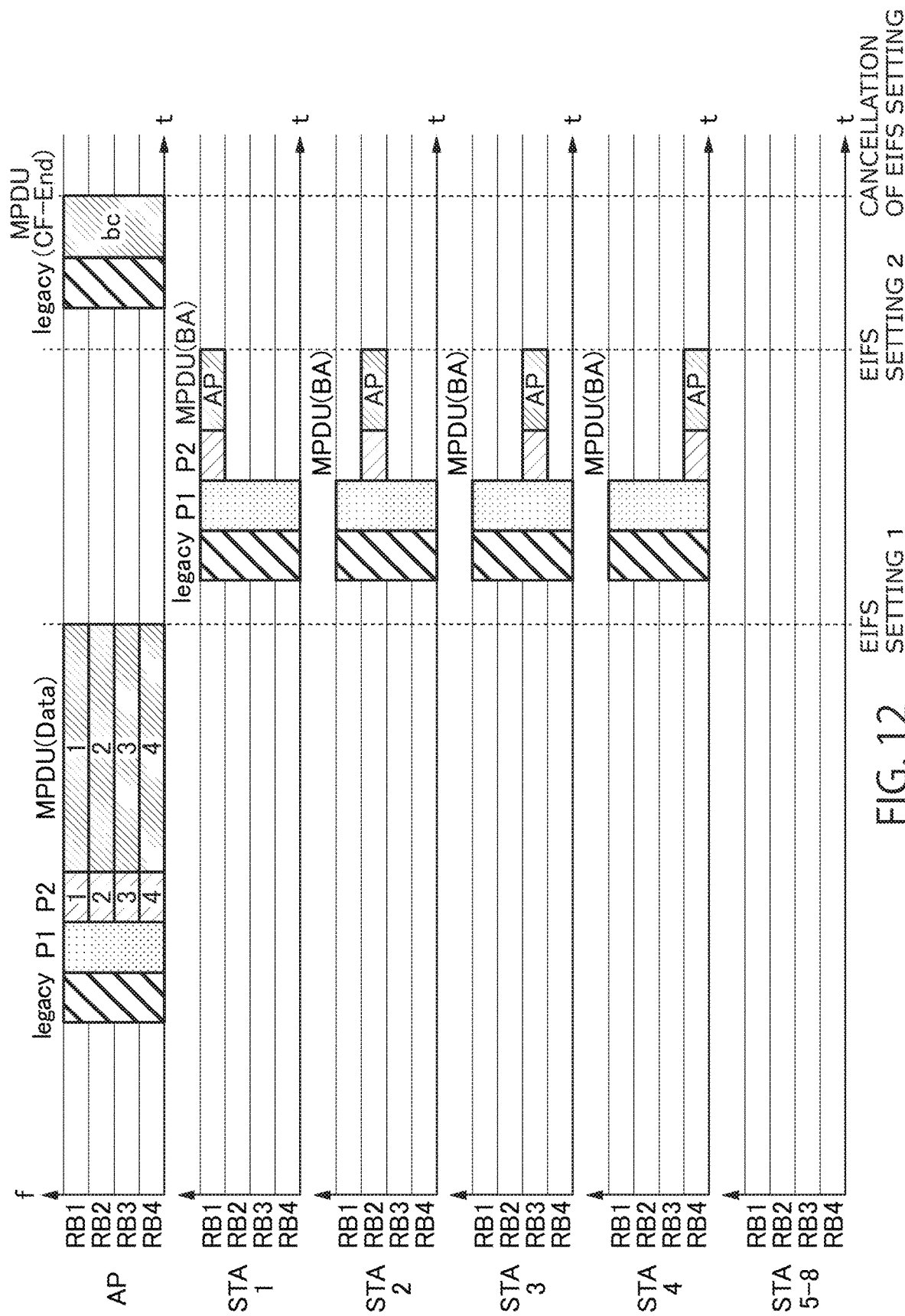
FIG. 12 is a diagram showing a first example of an operation sequence according to a second embodiment.

FIG. 12 is a diagram showing a first example of an operation sequence according to the second embodiment. The difference from the operation sequence of FIG. 8 in the first embodiment is mainly described. As with the first embodiment, terminals 1 to 6 are OFDMA compatible terminals. Among these terminals, terminals 1 to 4 are assumed as OFDMA compatible terminals, terminals 5 and 6 are assumed as OFDMA non-target terminals. Terminals 7 and 8 are assumed as legacy terminals.

As with the first embodiment, base station 101 simultaneously transmits MAC frames destined for terminals 1 to 4 to terminals 1 to 4 using resource blocks 1 to 4 in the channel (downlink OFDMA transmission). SIFS-period after receipt of the physical packets, terminals 1 to 4 simultaneously transmit (uplink-OFDMA-transmit) the physical packets containing acknowledgement response frames using resource blocks 1 to 4. More specifically, the legacy field and preamble 1 are transmitted in the channel width band, and preambles 2 and the data fields (acknowledgement response frames) are transmitted in the resource blocks. In the operation sequence of FIG. 8 in the first embodiment, during downlink-OFDMA-transmission from the base station, terminals 5 and 6 that are the OFDMA non-target terminals decode the legacy field and preamble 1 and decode preamble 2 and the MAC frame in at least one selected resource block, and set the NAV on the basis of the value described in the Duration field of the header of the MAC frame. According to this sequence, such an operation is not required to be performed. Consequently, in a case where terminals 5 and 6 try to obtain access rights after completion of downlink OFDMA transmission, uplink OFDMA transmission, or completion of both of the transmissions, these terminals set the EIFS period (see "EIFS SETTING 1" and "EIFS SETTING 2" at the bottom of FIG. 12). Terminals 7 and 8 that are the legacy terminals set the EIFS period in an analogous case. Alternatively, terminals 5 and 6 may operate in a manner analogous to that in the first embodiment, and set the NAVs.

Base station 101 transmits the CF-End frame SIFS-period after completion of receipt of the BA frame uplink-OFDMA-transmitted from terminals 1 to 4. The CF-End frame is a frame for announcing completion of CFP (Contention Free Period). That is, the frame is for permitting access to the wireless medium. In this embodiment, the CF-End frame is transmitted even in situations where CFP is not started. The RA field of the CF-End frame is typically set to a broadcast address. "bc" in FIG. 12 means that the destination address of the CF-End frame is the broadcast address. Alternatively, the destination address of the CF-End frame may be permitted to be a multicast address or multiple unicast addresses. The Duration field of the header of the CF-End frame is set to 0 as the medium reservation period.

The header of the physical packet containing the CF-End frame is configured to contain the legacy field but to contain no preamble 1 and preamble 2. The physical packets containing the CF-End frames are transmitted in one channel width band, and the physical packets are correctly received by terminals 1 to 8. Thus, the EIFS setting in terminals 5 to 8 are canceled. Terminals 1 to 8 are permitted to access the medium after completion of reception of the CF-End frame, and set the normal DIFS/AIFS [AC] period when intending to obtain the access right (see "CANCELLATION OF EIFS SETTING" at the bottom of FIG. 12).

The CF-End frame transmission is only one example. Alternatively, another frame may be transmitted in the physical packet in the legacy format only if the frame has a function of permitting the receiving terminal to access the wireless medium. At this time, in the frame, the Duration field or the like may set to a value pertaining to the length of duration during which suppression of access to the wireless medium is instructed. The length of this duration may be set to 0, or a value larger than 0. Also in a case where such a frame is transmitted, each terminal correctly receives the physical packet containing this frame. Consequently, the EIFS period is prevented from being set. The setting of the duration to 0 allows each terminal to start an operation for accessing the medium after the finish time point of this frame is reached. In the case where the value larger than 0 is set, terminals 1 to 8 can start the operations for accessing the media when the time period indicated by this value has elapsed after completion of reception of this frame.

Thus, the CF-End frames or the frames having an analogous function prevents the EIFS periods from being set by OFDMA non-target terminals 5 and 6 and legacy terminals 7 and 8. Consequently, the equality of opportunity of obtaining the access right can be maintained among all terminals 1 to 8 and the base station. As described before, after finish of downlink OFDMA transmission or finish of uplink OFDMA transmission, or after both of them, terminals 5 to 8 may set the EIFS periods. But in any these cases, another communication continues at SIFS intervals after the EIFS period is set. Consequently, no access right can be obtained at all, and it can be regarded that no problem of unfairness occurs.

Figure 13:
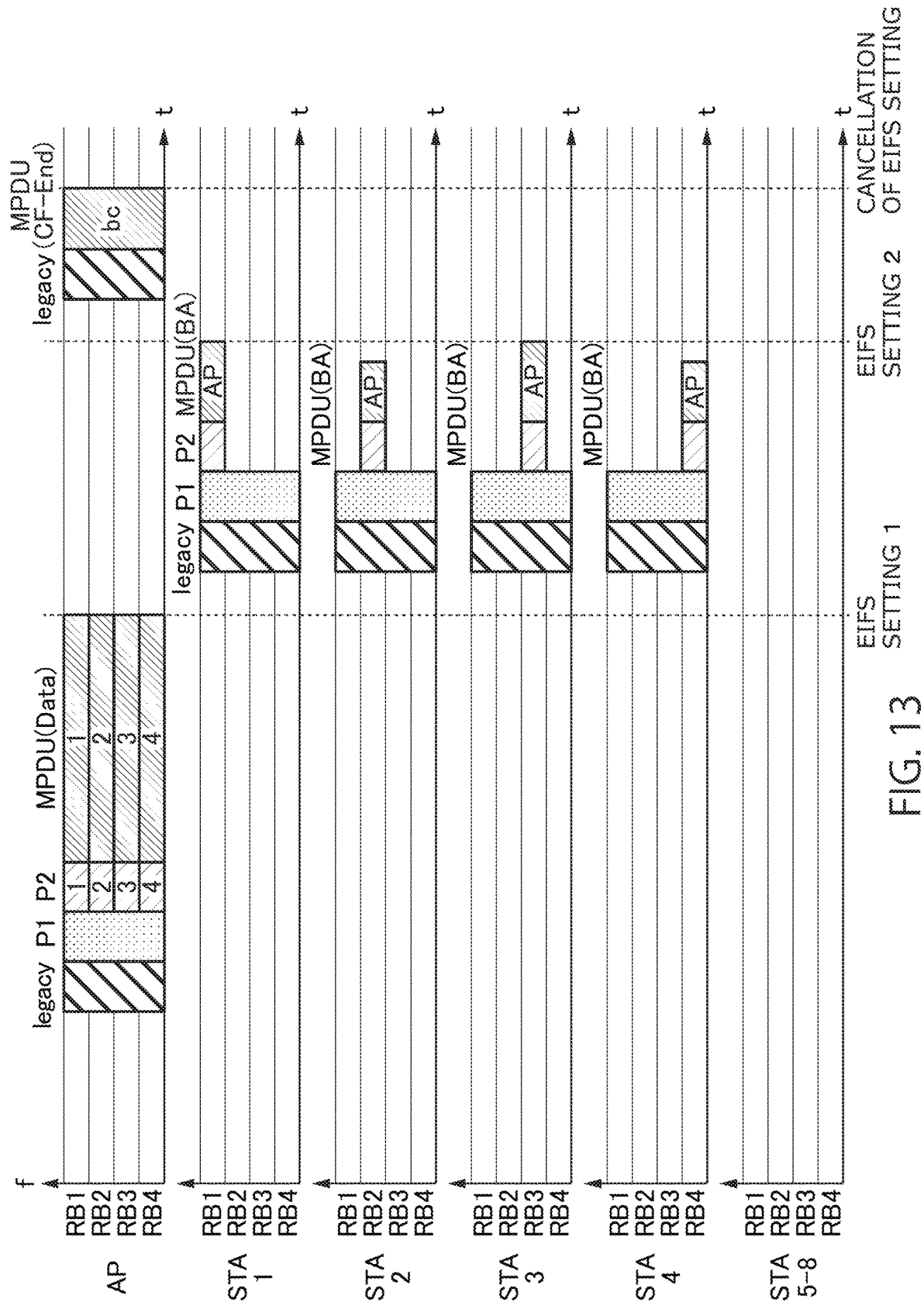
FIG. 13 is a diagram showing a second example of the operation sequence according to the second embodiment.

FIG. 13 is a diagram showing a second example of the operation sequence according to the second embodiment. The difference from the operation sequence example of FIG. 12 is mainly described.

Unlike the operation sequence example of FIG. 12, the length of MAC frames (here, BA frames) uplink-OFDMA-transmitted from terminals 1 to 4 are different. The lengths of MAC frames transmitted from terminals 2 and 4 are shorter than those from terminals 1 and 3. The physical header length is assumed to be fixed. This is because even if the sizes of the MAC frames themselves are the same among the terminals, the frame time lengths (i.e., the periods required to transmit the frames) are different according to the applied transmission rate or modulation and coding scheme (MCS). According to a method of determining the transmission rates or MCSs of the BA frames to be uplink-transmitted from terminals 1 to 4, the transmission rates or MSCs of the response frames (BA frames) may be determined according to the transmission rates or MCSs of the MAC frames transmitted from the base station to the terminals. For example, the response is made at the maximum transmission rate among the transmission rates equal to or lower than the transmission rate of the MAC frame received from the base station among the transmission rates supported by the own terminal. In such a case, according to the transmission rates or MCSs for the MAC frames transmitted from the base station to terminals 1 to 4, the transmission rate or MCSs for frames serving as responses may sometimes be different among the terminals. As a result, the uplink MAC frame time lengths are different among the terminals.

In such a case, base station 101 compares the packet lengths of the physical packets received from terminals 1 to 4 with each other, and transmits the CF-End frame SIFS-period after completion of reception of the physical packet having the largest packet length. In a case where the PHY header length is fixed, base station 101 may compare the frame lengths of the MAC frames contained in the physical packets received from terminals 1 to 4 with each other, and transmit the CF-End frame SIFS-period after completion of reception of the longest MAC frame. Terminals 1 to 4 may set the packet lengths of physical packets, the MAC frame lengths, or both of the lengths in the PHY headers (legacy fields) or other fields, and base station 101 may read the values set therein and compare the values with each other to identify the maximum value of the physical packet, the maximum value of the MAC frame length, or both of the maximum values.

In the sequence example of FIG. 13, downlink OFDMA transmission and uplink OFDMA transmission in response thereto are performed only one time, and subsequently the CF-End frame is transmitted. Alternatively, before CF-End frame transmission, an analogous sequence may be repeatedly performed. Also in this case, the start timing at which base station 101 starts to measure the SIFS period after receipt of the uplink-OFDMA-transmitted physical packet may be the timing of completion of reception of the physical packet having the maximum packet length as described before. When the repetition of the sequence is finished, the CF-End frame may be transmitted at the timing determined in a manner analogous to that as described before.

In the sequence example of FIG. 13, the value of Ack policy subfield of the QoS control field in the header of the MAC frame in the physical packet OFDMA-transmitted by the base station is set to the value indicating Normal Ack. Accordingly, terminals 1 to 4 having received the data frames (aggregation frames) operate so as to return the BA frames SIFS-period after reception of the data frames even without receipt of the BA request (Block Ack Request) frames from the base station. The Ack policy in this case is specifically called Implicit Block Ack Request.

Figure 14:
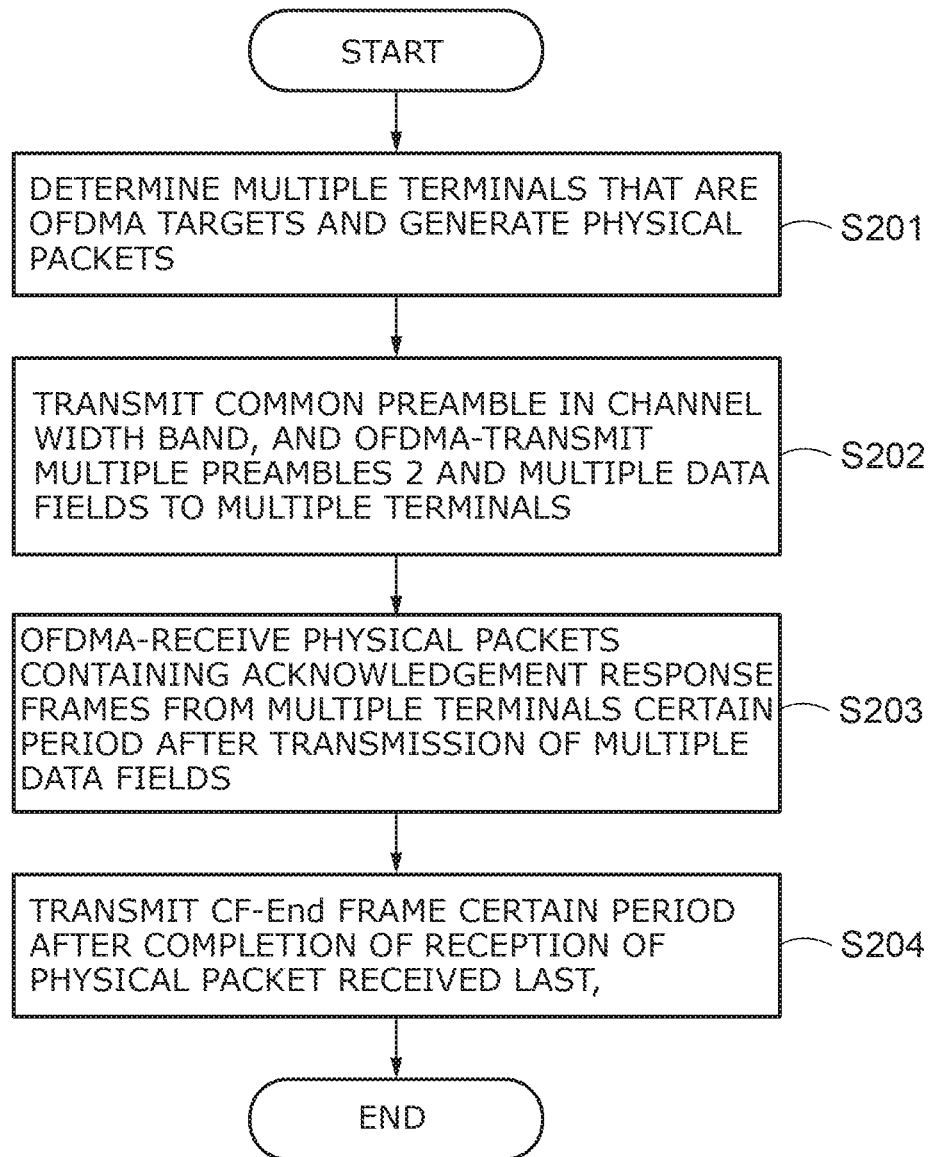
FIG. 14 is a diagram showing a flowchart of an operation of the base station corresponding to the operation sequence example shown in FIG. 13.

FIG. 14 is a diagram showing a flowchart of the operation of the base station corresponding to the operation sequence example shown in FIG. 13. The base station determines multiple terminals that are OFDMA targets, and generates multiple MAC frames to be transmitted to the multiple terminals (S201). The base station stores these frames in the respective data fields and adds physical headers to generate physical packets (also S201). The physical header contains: the legacy field; preamble 1 that contains information for identifying the multiple terminals; and preambles 2 that are for the respective terminals and contain information for decoding the data fields containing the MAC frames.

The base station transmits the legacy field and preamble 1 of the physical packet in the band of one channel width, and subsequently transmits preambles 2 and data fields (MAC frames) in OFDMA (S202).

The base station receives, from the multiple terminals, the physical packets containing acknowledgement response frames containing information pertaining to the success and failure of MAC frame reception through OFDMA, SIFS-period after transmission of the multiple MAC frames (S203).

SIFS-period after completion of receipt of the physical packet completely received last among the physical packets, the physical packet containing the CF-End frame that is an example of a frame that does not request transmission of an acknowledgement response is transmitted (S204).

As described before, as in a case or the like where the modulation and coding schemes (MCSs) or transmission rates are different among the destination terminals in uplink OFDMA transmission, the acknowledgement response frames serving as responses or the physical packets containing these frames sometimes have different lengths (time lengths). Consequently, in the sequence example of FIG. 13, the base station identifies the physical packet having the longest packet length among the physical packets for the terminals, and the end of the physical packet is adopted as the starting point of the SIFS period before CF-End frame transmission.

Here, according to a third example of the operation sequence of the second embodiment, in order to equalize the lengths of physical packets to be transmitted by the terminals, the base station notifies information on the MCSs or transmission rates applied to the responses, in the physical packets to be transmitted in OFDMA. For example, the base station sets information for instruction on the MCS or transmission rate to be applied to the response, in preamble 1, preambles 2, or the legacy field. Alternatively, new fields may be defined in the physical headers for the respective resource blocks. The information on the MCSs or transmission rates may be set in the new fields. Alternatively, the information on the MCS or transmission rate applied to the response may be set in a reserved area of any field of the header of each MAC frame, or in a field newly defined in the header of each MAC frame. It is the matter of course that the information on the MCS or transmission rate applied to the response may be designated by a method that is other than that described here. In a case where the size of the acknowledgement response frame (the BA frame, the ACK frame or the like) is fixed, setting of the same MCS or transmission rate for each terminal allows the length of the response frame (the BA frame) or the physical packet containing this frame to be the same. Consequently, the base station is not required to perform a process of identifying the physical packet having the longest packet length among the received physical packets, on a terminal-by-terminal basis.

Here, the information on the MAC or transmission rate to be used in response to the terminals is not necessarily explicitly designated. Alternatively, the base station may transmit the MAC frames to terminals 1 to 4 in downlink-OFDMA at the transmission rates that terminals 1 to 4 can implicitly designate for application to BA frame transmission. That is, the transmission rate or MCS for the MAC frames to be transmitted in downlink-OFDMA is controlled, which allows the time length of the response frame (BA frame) returned from each terminal to be controlled. As described before, each terminal can determine the transmission rate or MCS for the response frame (BA frame) according to the transmission rate or MCS for the MAC frame that has been transmitted in OFDMA from the base station and is destined for the own terminal. For example, the response is made at the maximum transmission rate among the transmission rates equal to or lower than the transmission rate of the MAC frame transmitted from the base station and among the transmission rates supported by the own terminal. In the case of this rule, the base station determines the terminals' transmission rates or MCSs of the MAC frames to be transmitted in downlink-OFDMA so as to equalize the transmission rates applied to the response frames to be returned from the corresponding terminals.

In a specific example, the rates that the base station defines as the supported rates and notifies to the respective terminals are assumed as rates 1 to 10. Rates 1, 2, 3, . . . , 10 becomes higher in this order. Rate 1 is the lowest and rate 10 is the highest. It is assumed that terminal 1 supports rates 1, 4 and 7, terminal 2 supports rates 1, 4 and 8, terminal 3 supports rates 1, 4 and 9, terminal 4 supports 1, 4 and 8, among rates 1 to 10. At this time, the base station identifies one rate commonly supported by the terminals, and identifies the minimum rate among the rates that are at least the identified rate (called the common rate) and higher than the common rate, on a terminal-by-terminal basis. The rate that is at least the common rate and less than the minimum rate is then determined on a terminal-by-terminal basis, and the determined rate is applied to the MAC frame to be transmitted to the corresponding terminal.

For example, rate 4 is identified as the common rate. For, terminal 1, the minimum rate among the rates higher than rate 4 is rate 7. Consequently, the base station determines the transmission rate from among the rates that are at least rate 4 and less than rate 7, that is, rates 4 to 6. Likewise, for terminal 2, the base station determines the transmission rate from among rates 4 to 7. For terminal 3, the base station determines the transmission rate from among rates 4 to 8. For terminal 4, the base station determines the transmission rate from among rates 4 to 7. The thus determined transmission rates are applied to the MAC frames to be transmitted to the respective terminals. Consequently, the transmission rates of the response frames of the respective terminals can be determined as rate 4 in a unified manner. In a case where downlink OFDMA transmission is to be completed by the base station early, the highest transmission rates among the candidate rates may be determined for the respective terminals.

Here, the base station may determine the sizes (the sizes of data fields) of the MAC frames to be transmitted in consideration of the transmission rates determined for the respective terminals so as to equalize the lengths of the MAC frames to be transmitted to the terminals (assuming that the PHY header has the same header length). In a variation example, the sizes of the MAC frames to be transmitted by the respective terminals are made the same while the difference in MAC frame length (time length) due to the difference in transmission rate may be adjusted by transmitting padding data at the end in a case of the MAC frames having shorter lengths than the longest MAC frame has. Thus, the transmission completion timings to the respective terminals can be aligned with each other, the transmission start timing of the response frames (BA frames) can be aligned with each other accordingly.

In some cases, the base station does not explicitly define the supported rates. In such cases, it is assumed that each terminal selects the transmission rate according to a rule analogous to that described above and responds, the transmission rate or MCS to be applied to the MAC frame (aggregation frame) to be transmitted to each terminal may be determined from a rate set necessarily supported by the base station in conformity with the physical layer.

It has been assumed that the transmission rate or MCS to be applied to the physical header of the physical packet is fixed. Alternatively, in a case of consideration of situations where each terminal can apply a different transmission rate or MCS to the physical header, the configuration is as follows. For example, information on the transmission rate or MCS commonly applied to the physical header is set in preamble 1, preambles 2, the legacy field, or any multiple fields thereof in the PHY header of the physical packet to be transmitted by the base station. In a case where the transmission rates or MCSs of some of the fields in the physical header are fixed, determination may be made for the remaining fields. For example, in a case where the transmission rates or MCSs of preambles 2 provided for the respective resource blocks are preliminarily, commonly defined, the transmission rate or MCS for the common preambles (preamble 1 and the legacy field) may be designated to have the same value for each terminal.

Third Embodiment

According to the sequences shown in FIGS. 12 and 13 in the second embodiment, the lengths of the MAC frames (more specifically, the total lengths of the lengths of preambles 2 and the lengths of the MAC frames) to be downlink-OFDMA-transmitted are the same. Consequently, the terminals' (terminals 1 to 4) transmission of the response physical packets SIFS-period after completion of reception of the resource blocks destined for the respective terminals allows the transmission start timings of the terminals to be synchronized with each other. However, in a case where the lengths of the MAC frames to be downlink-OFDMA-transmitted, this method can cause a problem in that the timings of the transmission deviate from each other among the terminals. The deviation in transmission timing causes a possibility that the common preamble (the legacy field and preamble 1) received in the channel width band by the base station from the terminals cannot be correctly decoded, with a certain magnitude of deviation. According to this embodiment, even in such a case, the transmission timings of the response physical packets transmitted from the respective terminals can be synchronized with each other while the equality of opportunity of obtaining access rights can be maintained.

Figure 15:
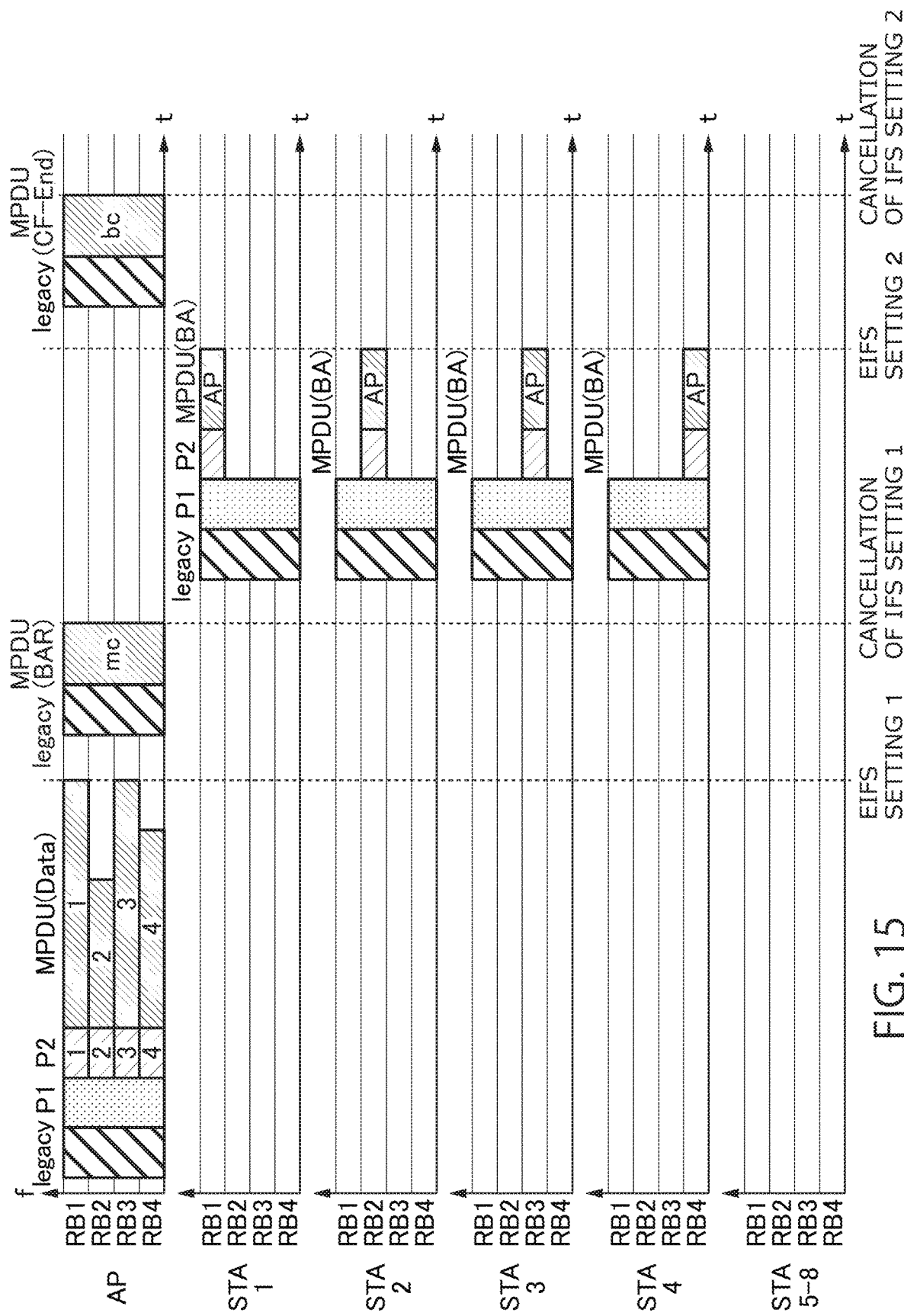
FIG. 15 is a diagram showing a first example of an operation sequence according to a third embodiment.

FIG. 15 is a diagram showing a first example of the operation sequence according to the third embodiment. The difference from the operation sequence of FIG. 12 in the second embodiment is mainly described.

As with the sequence of FIG. 12 in the second embodiment, base station 101 transmits the physical packets containing the MAC frames destined for terminals 1 to 4 using resource blocks 1 to 4 in the channel (downlink OFDMA transmission). However, the lengths (time lengths) of MAC frames of terminals 1 to 4 are not the same. In the example of the diagram, the lengths of MAC frames transmitted by terminals 1 and 3 are the same. Meanwhile, the MAC frame length of terminal 4 is shorter than these lengths, and the MAC frame length of terminal 2 is further shorter. The Ack policy fields of the QoS control fields in the headers of the MAC frames destined for terminals 1 to 4 are set to values indicating Block Ack. Consequently, even when terminals 1 to 4 receive the physical packets, the terminals operate so as not to return the acknowledgement response frames (BA frames) SIFS-period after the reception.

The base station identifies the transmission completion timing of the longest MAC frame among the physical packets transmitted to terminals 1 to 4, and transmits the BAR (Block Ack Request) frame in the channel width band (e.g., 20 MHz width band) SIFS-period after the identification. The physical header of the BAR frame contains the legacy field but contain no preambles 1 and 2. RA of the BAR frame is the multicast address of the group to which terminals 1 to 4 belong. The "mc" in the diagram means that RA of the BAR frame is the multicast address. It can be considered to set the broadcast address instead of the multicast address. The BAR frame can be correctly received even by terminals 5 and 6, which are the OFDMA non-target terminals, and by terminals 7 and 8, which are the legacy terminals. Consequently, terminals 5 to 8 correctly receive the BAR frames, thereby canceling the EIFS period setting (see "CANCELLATION OF EIFS SETTING 1" in FIG. 15).

Upon receipt of the physical packets containing the BAR frames which are downlink-OFDMA-transmitted from the base station, terminals 1 to 4 transmit the physical packets containing the BA frames after lapse of the SIFS period because RAs of the BAR frames indicate the multicast address of the group to which the respective terminals belong. The BAR frame is a control frame, and the type and sub-type of the MAC header are set to the respective values indicating Control and BAR. The sequence of BA frame transmission and thereafter is analogous to that of FIG. 12. In a case where RA of the BAR frame is set to the broadcast address, a rule may be adopted where the terminal having received the MAC frame in immediately previous downlink OFDMA transmission becomes the target of the BAR frame.

As described before, in the sequence example of FIG. 15, the base station transmits the physical packet containing the BAR frame SIFS-period after completion of transmission of the MAC frame having the longest packet length (longest time length) among the physical packets which is downlink-OFDMA-transmitted by the base station. Thus, the transmission timings of the BA frames transmitted by the terminals can be synchronized with each other.

Figure 16:
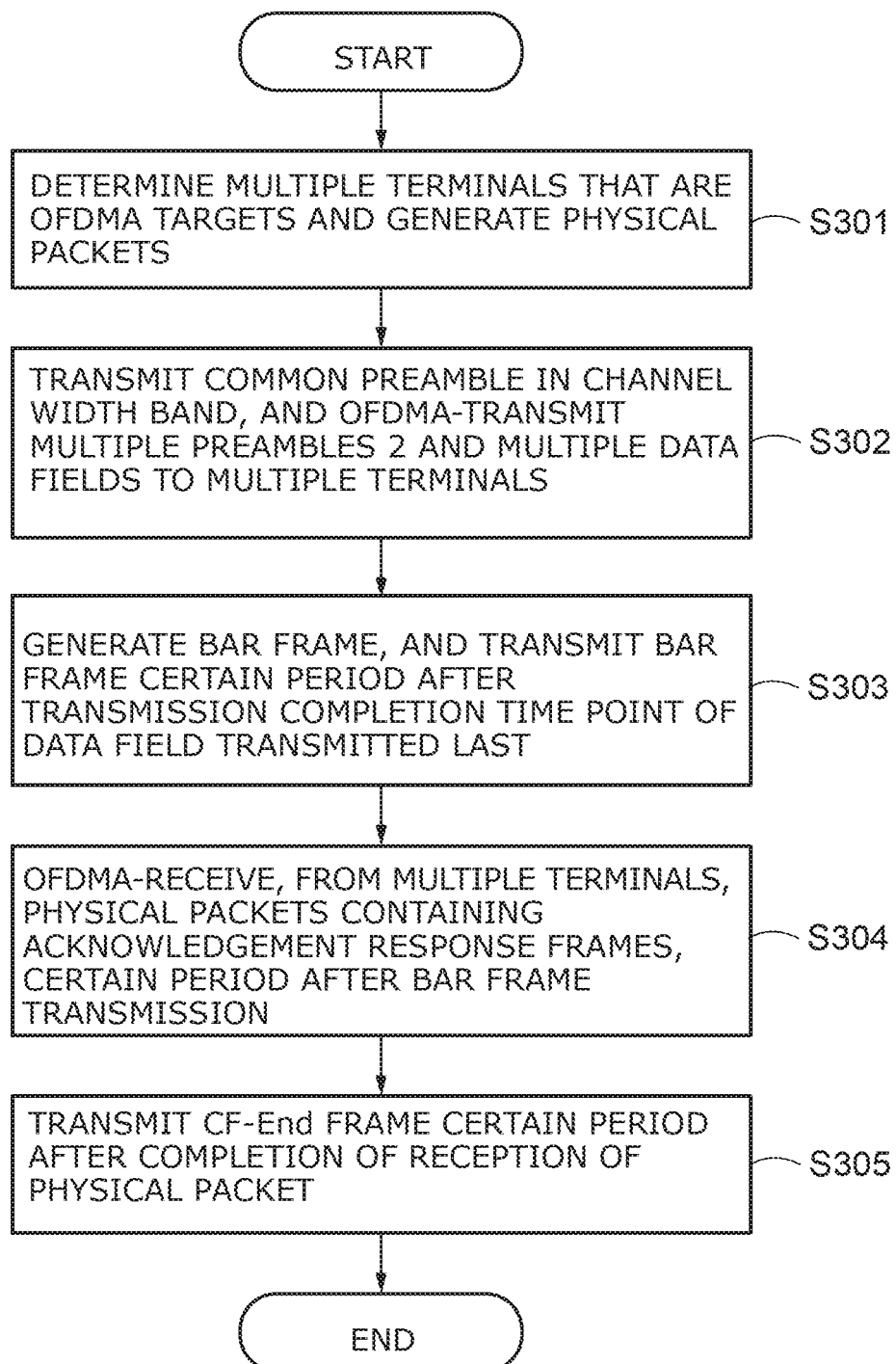
FIG. 16 is a diagram showing a flowchart of an operation of the base station corresponding to the operation sequence example shown in FIG. 15.

FIG. 16 shows a flowchart of the operation of the base station corresponding to a first example of the operation sequence according to the third embodiment shown in FIG. 15. The base station determines multiple terminals that are OFDMA targets (S301), and generates multiple MAC frames to be transmitted to the multiple terminals. The base station stores these frames in the respective data fields and adds physical headers to generate physical headers (also S301). The physical header contains: the legacy field; preamble 1 that contains information for identifying the multiple terminals; and preambles 2 that are for the respective terminals and contain information for decoding the data fields containing the MAC frames.

The base station transmits the legacy field and preamble 1 of the physical packet, in the band of one channel width, and subsequently transmits preambles 2 and data fields (MAC frames) in OFDMA (S302).

The base station generates the BAR frame for requesting transmission of the BA frames as the frame containing information pertaining to the success and failure of reception of the MAC frame (S303), and transmits the physical packet containing the BAR frame SIFS-period after transmission completion time point of the data field transmitted last among the data fields (also S303).

The base station receives the physical packets containing the BA frames in OFDMA a certain period after transmission of the BAR frame, from the multiple terminals (S304). The base station transmits the physical packet containing the CF-End frame a certain period such as SIFS after reception of the physical packets from the multiple terminals (S305).

Figure 17:
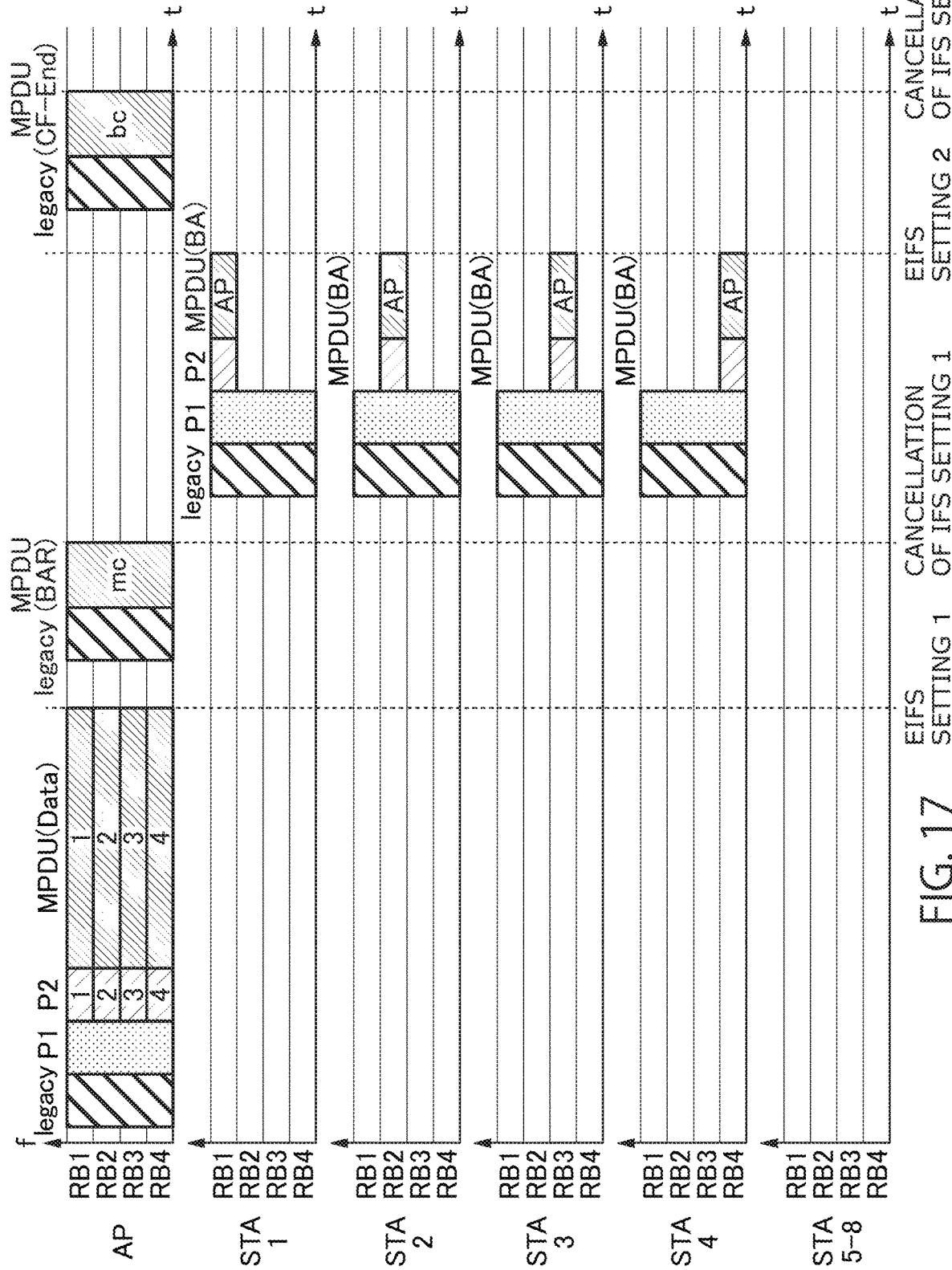
FIG. 17 is a diagram showing a second example of the operation sequence according to the third embodiment.

In the sequence example of FIG. 15, the lengths of the MAC frames which are downlink-OFDMA-transmitted by the base station are not the same. However, even in a case where these frame lengths are the same as with the sequence diagram of FIG. 12 of the second embodiment, BAR frame transmission allows the transmission timings of the BA frames to be synchronized with each other. FIG. 17 shows a sequence example in this case as a second example of the operation sequence according to the third embodiment. As shown in FIG. 17, the lengths of the data fields of the physical packets (the lengths of MAC frames) transmitted to terminals 1 to 4 are the same. The description of the operation in FIG. 17 is self-evident according to the description of FIGS. 15 and 12. Consequently, the description is omitted. The operation of the base station in this case can be understood only by replacing step 304 in FIG. 16 according to the difference described before.

Figure 18:
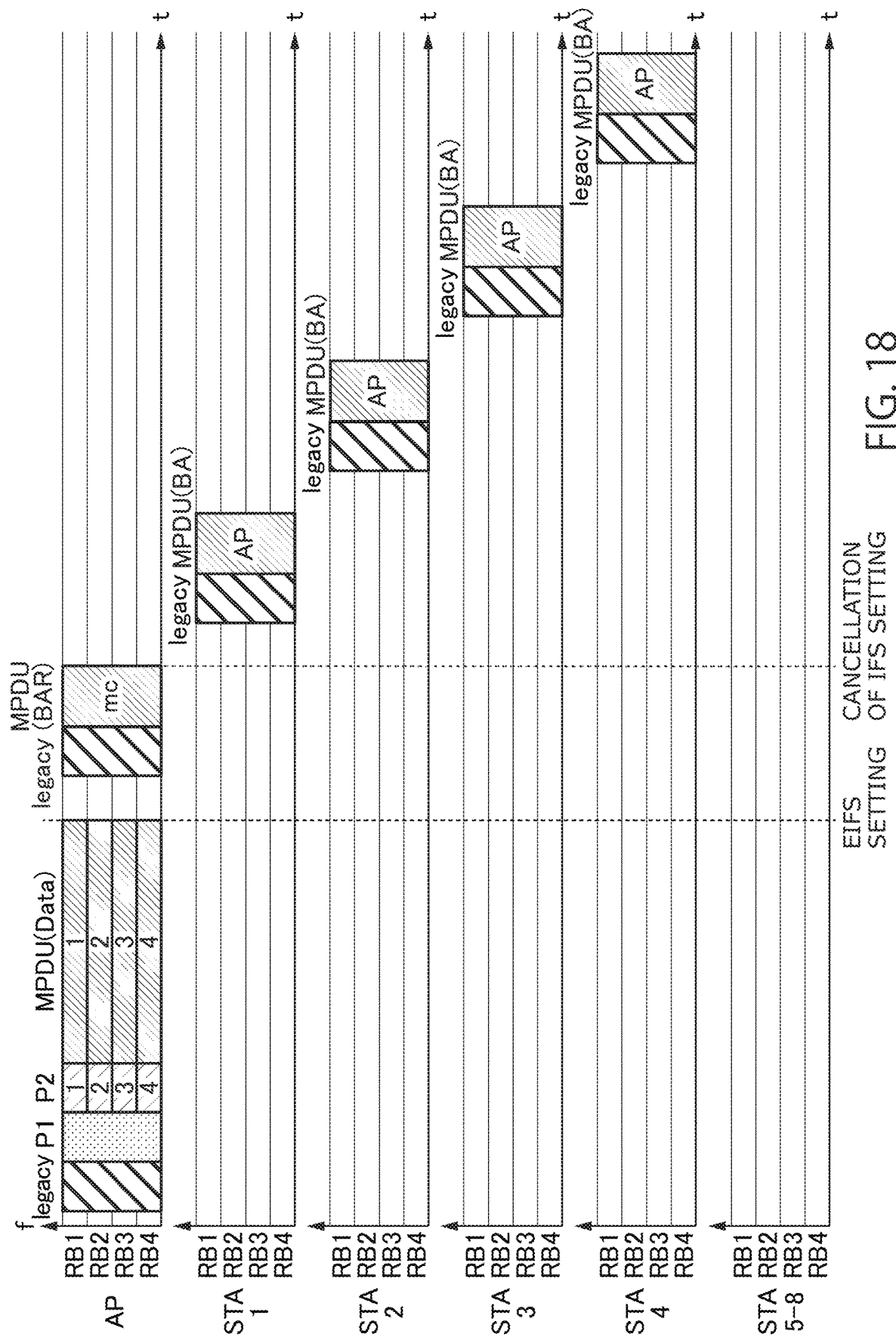
FIG. 18 is a diagram showing a third example of the operation sequence according to the third embodiment.

FIG. 18 is a diagram showing a third example of the operation sequence according to the third embodiment. The difference from the operation sequence examples of FIG. 15 or 17 is mainly described.

In the sequence examples of FIGS. 15 and 17 described before, the BA frames (more specifically, the physical packets containing the BA frames) are OFDMA-transmitted from the OFDMA target terminals (terminals 1 to 4) to the base station. In the sequence example of FIG. 18, terminals 1 to 4 return the physical packets containing the BA frames not in OFDMA transmission but sequentially with every SIFS period deviation. The physical packet containing the BA frame has the legacy format (without preambles 1 and 2, etc.). Each terminal transmits the physical packet in the channel bandwidth (e.g., 20 MHz band).

To achieve the transmission, the base station includes information for identifying the timing at which the OFDMA target terminals are caused to return the BA frames, and information for identifying the MCS (or transmission rate) to be applied to BA frame transmission, into the BAR frame to be transmitted SIFS-period after completion of downlink OFDMA transmission. To achieve this, the BAR frame in conformity with the existing standard may be extended. To achieve this, in the body field of the format of the existing BAR frame, for example, at a position after or before BAR Information field (a field in which the sequence number or the like of the MAC frame requested at the first time through the BAR frame is set) or another position, a field for identifying BA frame transmission timing (called a transmission timing field) and a field for identifying the MCS (or transmission rate) to be applied to the BA frame (called a transmission rate field) may be added. Alternatively, these fields may be added in the header of the BAR frame. The non-target terminal receives the physical packet that contains the BAR frame and has the legacy format, thereby canceling the EIFS period setting problem. After the reception, the non-target terminals can correctly receive even the physical packets containing the BA frames sequentially transmitted from the terminals (the physical packets containing BA frames can be correctly received because these packets have the legacy format). Consequently, the EIFS period setting problems does not occur. Consequently, after transmission of the BA frame from the terminal transmitting the BA frame last, the equality of opportunity of obtaining the access rights to the wireless medium among the terminals can be maintained in the case of obtaining the access right.

According to a method other than that of adding the transmission timing field and the transmission rate field to the body field of the BAR frame, the base station may add these fields to preamble 1 or may add these fields to preambles 2 for the respective source blocks of the physical packet that the base station is to transmit in downlink-OFDMA. Alternatively, these fields may be added to the headers or the body fields of the MAC frames carried in the physical packets to be downlink-OFDMA-transmitted. According to a method other than the methods described here, the information for identifying the transmission timing and the information for identifying the MCS (or transmission rate) may be notified.

As described before, the transmission timings and transmission rates designated for terminals 1 to 4 are set so that the physical packets transmitted from terminals 1 to 4 can be separated by SIFS-intervals. For example, as shown in FIG. 18, in a case where terminals 1, 2, 3 and 4 transmit, in this order, the physical packets containing the BA frames, a timing SIFS-period after completion of BAR frame transmission is designated for terminal 1. For terminal 2, a timing is designated that is a timing after a total period after completion of BAR frame transmission; the total period is obtained by totalizing the SIFS period, BA frame time length of terminal 1 (more correctly, the time length of the physical packet containing the BA frame), and the SIFS period (i.e., 2×SIFS period+BA frame time length of terminal 1). Likewise, for terminal 3, a timing is designated that is after 3×SIFS period+BA frame time length of terminal 1+BA frame time length of terminal 2. Likewise, for terminal 4, a timing is designated that is after 4×SIFS period+BA frame time length of terminal 1+BA frame time length of terminal 2+BA frame time length of terminal 3.

To calculate the BA frame time lengths of terminals 1 to 3, the transmission rates that terminals 1 to 3 applies to BA frame transmission are required to be determined (the BA frames assumed to have the same size). Thus, the base station determines the transmission rates to be applied to terminals 1 to 3, and calculates the BA frame time lengths on the basis of the respective transmission rates. For terminals 1 to 3, the determined transmission rates are respectively designated according to the method described above. There is no terminal that transmits the BA frame after terminal 4. Consequently, the transmission rate is not necessarily designated for terminal 4. However, the case of designating the transmission rate even for terminal 4 is herein assumed.

Upon receipt of the physical packets containing the BAR frames transmitted from the base station, terminals 1 to 4 extract information for identifying the transmission rate and transmission timing to be applied to BAR frame transmission. According to the extracted transmission rate, the BA frames are generated, and the physical packets containing the BA frames are generated. According to the extracted transmission timings, the physical packets are transmitted. The physical packets transmitted from terminals 1 to 4 are separately transmitted with deviation of every SIFS period, and are sequentially received by the base station.

It has been assumed that the transmission rate or MCS to be applied to the physical header of the physical packet is fixed. Alternatively, in a case of consideration of situations where the terminal can apply different transmission rate or MCS, the configuration is as follows. For example, each terminal set information on the transmission rate or MCS commonly applied to the physical header, in preamble 1, preambles 2, the legacy field, or any multiple fields thereof in the PHY header of the physical packet to be transmitted by the base station. In a case where the transmission rates or MCSs of some of the fields in the physical header are fixed, determination may be made for the remaining fields in an analogous manner. For example, in a case where the transmission rates or MCSs of preambles 2 provided for the respective resource blocks are preliminarily, commonly defined, the transmission rate or MCS for the common preambles (preamble 1 and the legacy field) may be designated to have the same value for each terminal.

In the examples of the above description, the base station explicitly notifies the transmission rates to be applied to terminals 1 to 4, to these terminals 1 to 4. Alternatively, the base station may transmit the BAR frames at transmission rates that terminals 1 to 4 can implicitly designate for application to BA frame transmission. As described in the second embodiment, each terminal can determine the transmission rate or MCS for the response frame (BA frame) according to the transmission rate or MCS for the MAC frame that has been transmitted from the base station in OFDMA and is destined for the own terminal. For example, the response is made at the maximum transmission rate among the transmission rates equal to or lower than the transmission rate of the MAC frame transmitted from the base station in the set of rates supported by the own terminal. The base station can thus identify the transmission rates that the terminals apply to responses on the basis of the transmission rates applied to the MAC frames to be transmitted to the respective terminals.

In some cases, the base station does not define the supported rates. In this case, it may be assumed that the terminals select the transmission rates from the rate set necessarily supported by the base station in conformity with the physical layer according to a rule analogous to that described before and respond.

The order of causing the terminals to respond with the BA frames is terminals 1, 2, 3, and 4 in the example in FIG. 18. However, the order of causing the terminals to respond is not limited to this order. The base station may determine the response order of the terminals according to a predetermined rule, or in any manner. For example, the response order of the terminals may be determined according to a rule where the terminals respond in the ascending or descending order of the frequencies of allocated resource blocks or an order based on another criterion. In the case of response in descending order of frequencies, as with the example in FIG. 18, the order is terminals 1, 2, 3 and 4. In the case of response in ascending order of frequencies, the order is terminals 4, 3, 2 and 1. The order of response of the terminals may be determined to be the descending or ascending order of the association ID (AID) or MAC address, or an order based on another criterion. Alternatively, in a case where a terminal having a power save mode resides, the terminal may be caused to respond with priority.

Figure 19:
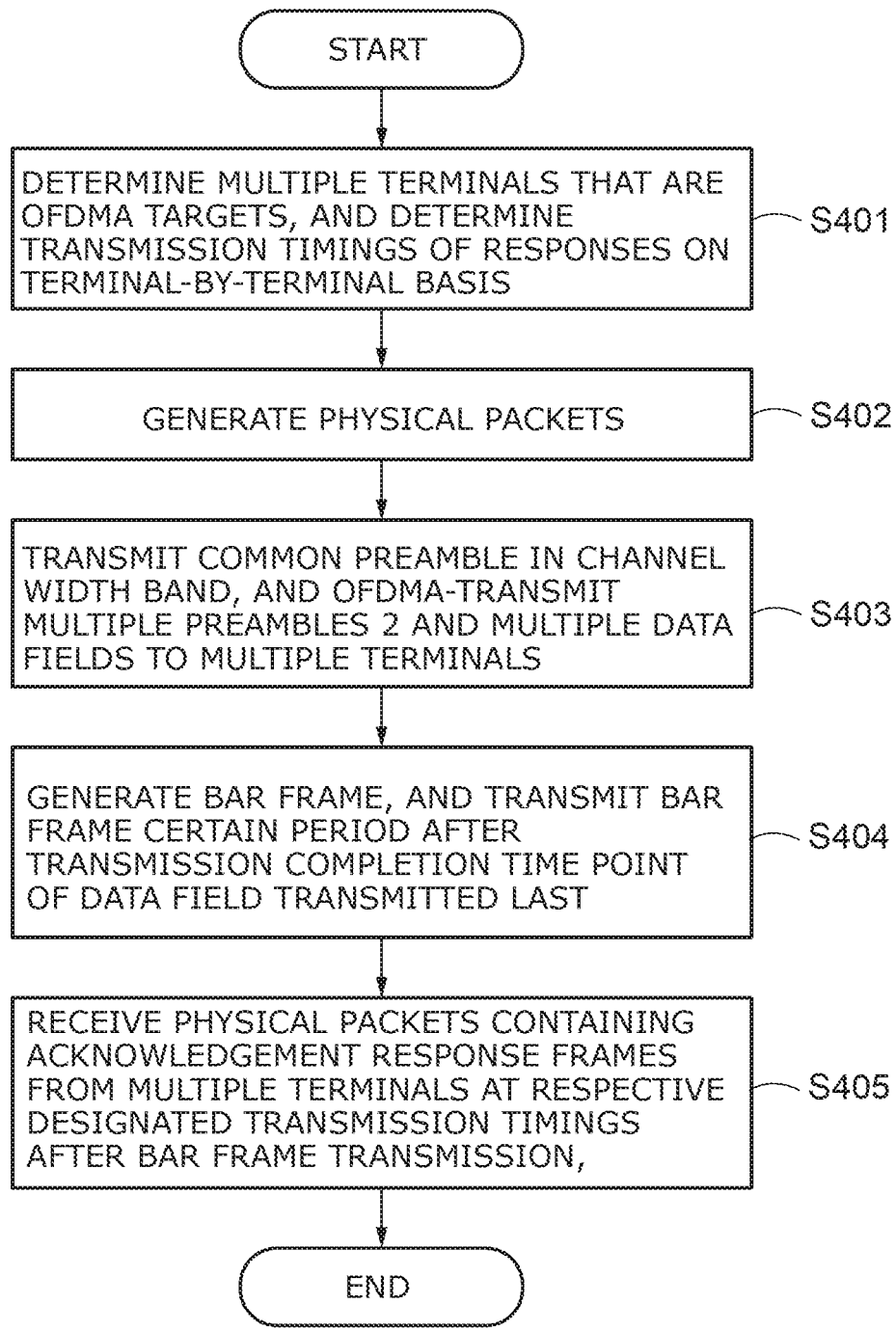
FIG. 19 is a diagram showing a flowchart of an operation of the base station corresponding to the operation sequence example shown in FIG. 18.

FIG. 19 is a diagram showing a flowchart of an operation of the base station corresponding to the third example of the operation sequence according to the third embodiment shown in FIG. 18. The base station determines multiple terminals that are OFDMA targets, and determines the transmission timings of the physical packets containing the BA frames that are response frames to the BAR frames transmitted from the base station on a terminal-by-terminal basis (S401). The transmission timings are determined so that the physical packets containing the BA frames won't be received at overlapping timings. For example, the transmission timings are determined so that the reception intervals of the physical packets can be separated by every SIFS period. The base station generates multiple MAC frames to be transmitted to multiple terminals. The base station stores these frames in the respective data fields and adds physical headers to generate physical packets (the same S402). The physical header contains: the legacy field; preamble 1 that contains information for identifying the multiple terminals; and preambles 2 that are for the respective terminals and contain information for decoding the data fields containing the MAC frames. At least one of preamble 1, preambles 2, or the MAC frames contains information for designating the transmission timing determined on terminal-by-terminal basis.

The base station transmits the legacy field and preamble 1 of the physical packet in the band of one channel width, and subsequently OFDMA-transmits preambles 2 and data fields (MAC frames) (S403).

The base station generates the BAR frame for requesting transmission of the BA frame (S404), and transmits the physical packet containing the BAR frame SIFS-period after transmission completion of the data field transmitted last among the data fields (the same S404).

After BAR frame transmission, the base station sequentially receives, from multiple terminals, the physical packets that contain the BA frames and have been transmitted at the respective designated transmission timings (S405).

In the flow described above, the base station may determine the modulation and coding schemes or transmission rates that multiple terminals apply to BA frame transmission so that the receptions of the BAR frames received from the respective terminals won't overlap. In this case, at least one of preamble 1, preambles 2, or the MAC frames contains information for identifying the determined modulation and coding scheme or transmission rate. Or the multiple terminals may adopt the rule of determining the modulation and coding scheme or transmission rate applied to the BA frames according to the modulation and coding scheme or transmission rate applied to the BAR frames. In a case where this rule is recognized, the modulation and coding scheme or transmission rate applied to the BAR frames may be determined by the base station so that the receptions of the BAR frames received from the respective terminals won't overlap.

Fourth Embodiment

The first to third embodiments have described the schemes that keep the equality of the opportunities of obtaining access rights on the medium among the terminals (i.e., among the OFDMA target terminals, the OFDMA non-target terminals, and the base station) in the case of OFDMA transmission from the base station to the multiple terminals. Likewise, also in a case of multi-user MIMO (Multi-User Multiple Input, Multiple Output: MU-MIMO) transmission from the base station to multiple terminals, unfairness occurs in the opportunities of obtaining the access rights on the medium. MU-MIMO transmission from the base station to the multiple terminals is specifically called downlink MU-MIMO in some cases. MU-MIMO transmission from the multiple terminals to the base station is called uplink MU-MIMO in some cases. In this embodiment, a terminal that can perform at least the downlink MU-MIMO communication between these downlink MU-MIMO and uplink MU-MIMO is called a MU-MIMO compatible terminal.

In the downlink MU-MIMO transmission, a technique called beamforming is used to form among multiple terminals radio waves (beams) having directionalities making the interference with each other minimum or small. The terminals and the formed beams are used to transmit data streams to the respective terminals. Simultaneous transmission, that is, spatially multiplexed transmission, can thus be made from the base station to the multiple terminals, in the same frequency band. The fourth embodiment assumes a case where the channel width band (e.g., 20 MHz width band) is used as the frequency band for MU-MIMO communication.

The schemes of preventing the unfairness in obtaining the access rights described in the first to third embodiments are also applicable to the case of MU-MIMO transmission from the base station to the multiple terminals. Consequently, the opportunities of obtaining access rights can be made equal between the terminals and the base station that are designated as the targets of MU-MIMO transmission this time (MU-MIMO target terminals), and the terminals that are not designated as the targets of MU-MIMO transmission this time (MU-MIMO-non-target terminals), among the MU-MIMO compatible terminals. The opportunities of obtaining access rights are made equal further including legacy terminals.

The fourth embodiment is hereinafter described in detail. The difference from the first to third embodiments is mainly described. Various derivatives, such as modification, enhancement, replacement, addition and exception, described in the first to third embodiments are also applicable to this embodiment. Modification, enhancement, replacement, addition, exception and the like that are self-evident from the description of the first to third embodiments are not described again here. A block diagram of a wireless communication device mounted on each of the base station and terminals according to this embodiment is the same as that of FIG. 1. The difference of each block is only change according to change of the communication scheme from OFDMA to MU-MIMO. Basically, the description of the block diagram is also applicable by replacing OFDMA with MU-MIMO and resource blocks with the streams.

Figure 20:
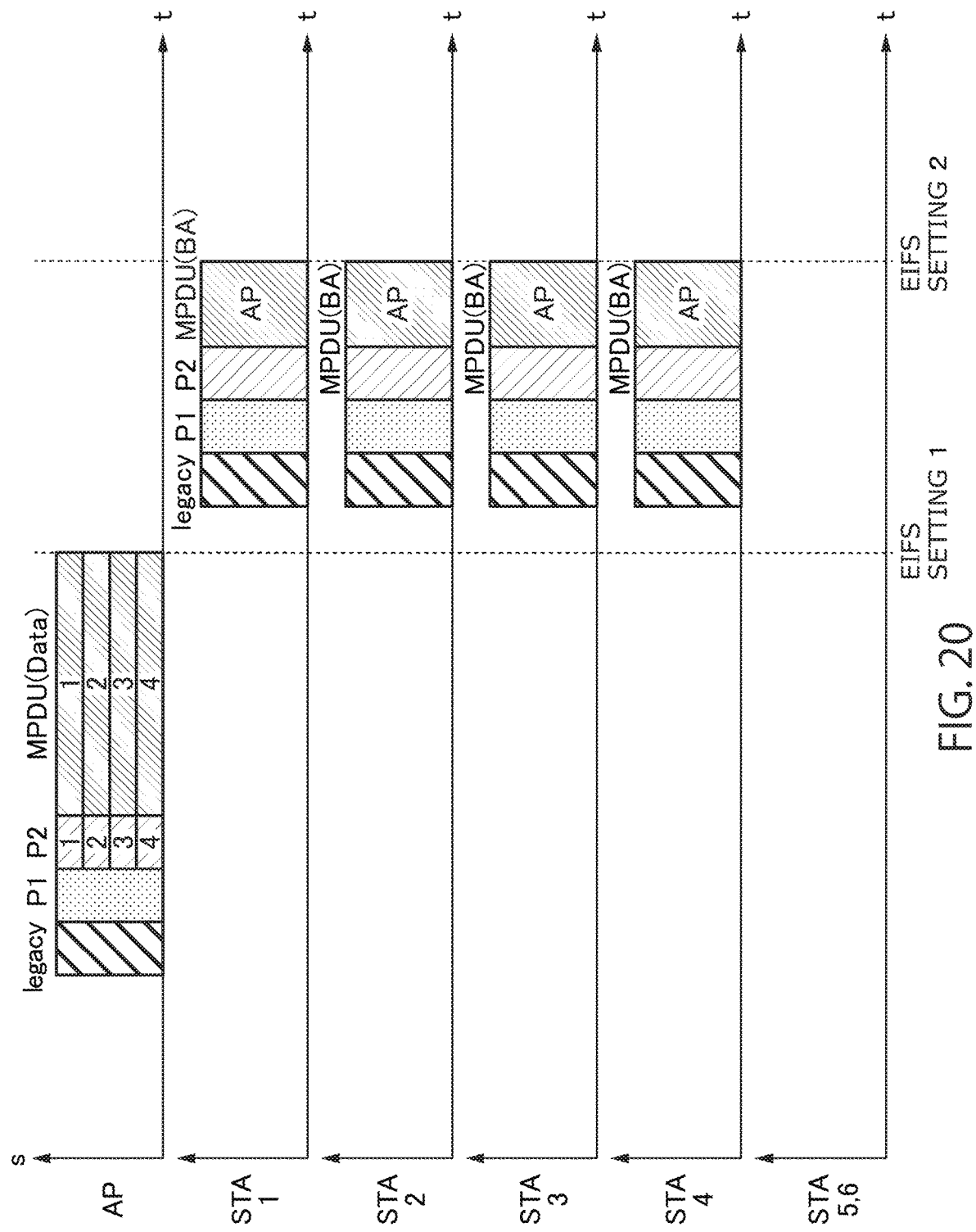
FIG. 20 is a diagram for illustrating unfairness in accessing a wireless medium and can be caused by MU-MIMO communication.

Referring to FIG. 20, possible access unfairness is described that can occur between the MU-MIMO-non-target terminals, and the MU-MIMO-target terminal and the base station. FIG. 20 shows an operation sequence example in a case of MU-MIMO communication between base station (AP) 101 and MU-MIMO target terminals (STA) 1 to 4. For the sake of description, it is assumed that terminals 1 to 4 and terminals 5 and 6 have the capabilities of MU-MIMO communication and the capabilities are enabled but do not have the function of solving the unfairness pertaining to the characteristics of this embodiment. In a bottom part of FIG. 20, an operation example of terminals 5 and 6, which are MU-MIMO-non-target terminals, is also shown. The abscissa axis indicates the time, and the ordinate axis indicates the space.

In the sequence example, base station 101 and terminals 1 to 4 perform MU-MIMO communication (both of downlink transmission and uplink transmission) using one channel of 20 MHz width band. Base station 101 may preliminarily transmit packets for measurement or any packets from antennas to individual terminals, and receive packets that contain pieces of channel information estimated by the respective terminals. Downlink channel information between the multiple antennas of base station 101 and one or more antennas of each terminal may thus be obtained. The channel information may be obtained by a method other than that described here. Base station 101 generates physical packets containing MAC frames destined for the respective terminals, generates one or more streams for the respective terminals, on the basis of the generated physical packets, using the pieces of downlink channel information for the respective terminals, and transmits the streams to terminals 1 to 4.

According to the format example of the physical packet of this embodiment, as with the first to third embodiments, on the beginning side of the physical header, legacy fields (L-STF, L-LTF and L-SIG) are arranged. After these fields, the fields of preambles 1 and 2 according to this embodiment are arranged. Data fields are arranged after the physical headers. Preambles 1 and 2 adopt the same names as those in the first to third embodiments. However, the contents set therein are different information according to the difference in scheme between OFDMA and MU-MIMO. OFDMA communication allocates the resource blocks to the terminals. Meanwhile, for MU-MIMO, the resource blocks correspond to the streams. Different information is set according to the difference.

Preamble 1 of the physical packets transmitted in MU-MIMO by the base station stores therein information commonly recognizable by the MU-MIMO compatible terminals. An example of the information set in this preamble 1 is information for identifying multiple terminals that are the MU-MIMO transmission targets (target terminals). The information for identifying the multiple terminals may be information that individually identifies these terminals. Alternatively, the group ID of a group to which the multiple terminals commonly belong may be set.

Another example of information set in this preamble 1 may be information for identifying the streams to be received by the MU-MIMO target terminals. For example, in a case where terminals 1 to 4 are designated as target terminals, information for designating the number of streams may be set for terminals 1 to 4. For example, multiple fields that designate the number of streams may be provided, and the stream for the own terminal may be identified on the basis of the number of streams designated by the field at the position for the own terminal (sometimes called the user position). In this case, the position of the field for the own terminal is preliminarily notified at the time of association or any timing thereafter. In the example described above, one is set, as the number of streams, in each of fields for terminals 1 to 4. In preamble 1, information on the total number of streams used for MU-MIMO transmission may be set. This method can be adopted in a case where the streams used by each terminal or the number of these streams can be identified from the total number of streams.

The stream may be decoded using the downlink channel information. Information on the downlink channel with the base station, having preliminarily been obtained before MU-MIMO communication, may be used. The channel information may be obtained using the physical header (e.g., in a case with LTF for estimation, its field is used) of the physical packet received this time. In the latter case, if multiple streams are transmitted to the terminal, for example, the base station may provide one or more symbols in LTF for estimation with symbols having patterns (e.g., bit sequences of 1 and 0) orthogonal to each other with respect to the streams, on a stream-by-stream basis. At this time, the patterns that conform to the field position and are as many as the streams are allocated to the terminal by the base station. The terminal may extract the signals of LTF parts of multiple streams coinciding with the pattern of the own terminal, through calculation of the received signal and the pattern, and estimate the channel information for each stream. The channel information for each stream of the own terminal may be used to separate (extract) a subsequent field concerned. Preamble 1 transmitted from each terminal to the base station in MU-MIMO stores therein information recognizable by the base station.

The legacy field and preamble 1 are transmitted in the channel width band (non-MIMO). FIG. 20 illustrates the legacy field and preamble 1 in respective single rectangle blocks in order to represent that the legacy field and preamble 1 are non-MIMO-transmitted (i.e., through omni-transmission without directionality in any specific direction). L-STF, L-LTF, L-SIG and preamble 1 are comprehensively called a common preamble, in some cases.

Preambles 2 store therein information (MCSs, etc.) required to decode the MAC frames for the respective streams. Preambles 2 are transmitted by spatial multiplexing (MU-MIMO transmission). The MU-MIMO target terminals receive preambles 2 (and subsequent MAC frames) contained in the streams for the own terminals and decode preambles 2 to obtain the information on MCSs and the like, and decode the data fields on the basis of the MCSs and the like to obtain the MAC frames. FIG. 20 illustrates preamble 2 in rectangles separated in the spatial direction on a stream-by-stream basis so as to represent that preambles 2 are transmitted in MU-MIMO. Numerals described in the rectangles representing preambles 2 indicate the numbers of terminals serving as destinations, for the sake of convenience.

The data field contains the MAC frame. The MAC frames are transmitted by spatial multiplexing (MU-MIMO transmission). The MAC frame is the data frame, management frame, or control frame. The data frame may not only be the single data frame but also be an aggregation frame (A-MPDU) in which multiple data frames are aggregated.

FIG. 20 illustrates the MAC frames in rectangles separated in the spatial direction in a stream-by-stream basis so as to represent that the MAC frames are transmitted in MU-MIMO.

Each of terminals 1 to 4 receives and decodes the legacy field, preamble 1, preamble 2 for the own terminal, and the data field in the physical packet transmitted from base station 101, and further decodes the stream for the own terminal to obtain the MAC frame. Unlike downlink OFDMA transmission described in the first to third embodiments, downlink MU-MIMO transmission performs transmission in beamforming to each terminal, and it is basically believed that each terminal does not receive streams (preambles 2 and data fields) other than the stream for the own terminal.

Terminals 1 to 4 generate acknowledgement response frames each containing bitmap information indicating whether the corresponding data frames have been successfully received or not, on the basis of the result of error test for the corresponding data frame in the aggregation frame. Terminals 1 to 4 each transmit a physical packet that contains a BA frame (Block ACK frame) that is an acknowledgement response frame in the channel width band, SIFS-period after completion of reception of the physical packets (completion of MAC frame reception) from the base station. In the case of transmission in two or more streams, terminals 1 to 4 may correctly transmit (omni-transmit) the legacy field and preamble 1 of the physical packet header containing the BA frame, and form directional beams on the basis of the preliminarily obtained uplink channel information for the base station (information on the uplink channel between the multiple antennas of the terminal and the multiple antennas of the base station) and transmit preambles 2 and MAC frames that are subsequent to preamble 1 in stream.

Here, the physical packets transmitted in beam from the base station to terminals 1 to 4 in downlink MU-MIMO may be received by terminals other than terminals 1 to 4. For example, the MU-MIMO-non-target terminals (here, terminals 5 and 6) may receive the beam destined for terminal 1 according to the positional relationship with the base station. According to examples of the positional relationship, the terminal concerned resides between the base station and terminal 1, or resides near to terminal 1. At this time, according to the related art, the MU-MIMO-non-target terminal decodes preamble 1 of the header of the physical packet, resultantly determines that the own terminal is not designated, does not perform decoding thereafter, and detects a reception error. In this case, the non-target terminal sets the EIFS period in carrier sensing at the next channel access, as described before (see "EIFS SETTING 1" in FIG. 20). Also in a case of receipt of the physical packets transmitted in MU-MIMO from the multiple target terminals to the base station, a reception error is detected in an analogous manner, and the EIFS period is set in carrier sensing at the next channel access (see "EIFS SETTING 2" in FIG. 20).

The terminals that do not detect the reception error (the target terminals, base station, etc.) set the DIFS/AIFS [AC] period in the normal manner, thereby causing unfairness with the non-target terminals.

Thus, to solve the unfairness described before, the MU-MIMO compatible terminal according to this embodiment performs execution of the following operation. In a case of receiving the physical packet transmitted in MU-MIMO from the base station, the MU-MIMO compatible terminal decodes the data field of the stream received by the own terminal and obtains the MAC frame when the own terminal is not designated as the MU-MIMO target (in the case of the non-target terminal). To decode the MAC frame, information on MCS and the like set in preamble 2 before the MAC frame is used. Here, in the downlink MU-MIMO transmission, beam-transmission is made to the MU-MIMO target terminals (terminals 1 to 4). Consequently, it is considered that the case where the non-compatible terminal can receive preamble 2 and thereafter of the physical packet is a case where the terminal concerned resides between the base station and terminals 1 to 4 or resides near to terminals 1 to 4. Also in this case, in a reception environment with the SINR of the received signal being at least a threshold, the signal can be decoded.

Figure 21:
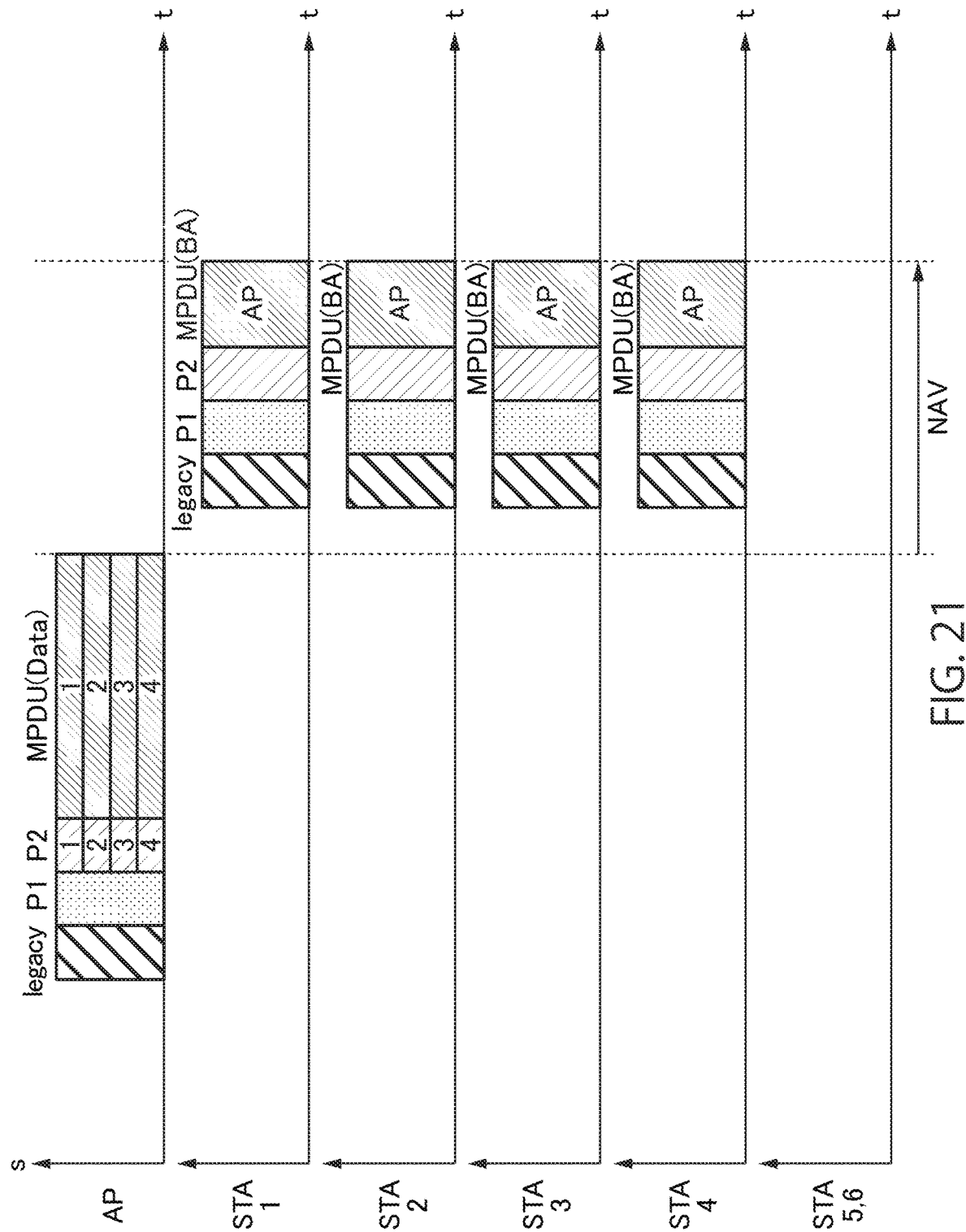
FIG. 21 is a diagram showing a first example of an operation sequence according to a fourth embodiment.

The terminal having decoded the data field to obtain the MAC frame sets the NAV after the completion of reception of the MAC frame on the basis of the value set in the Duration field of the header thereof. It is determined that RA of the MAC frame is not the MAC address of the own terminal, thereby setting the NAV. FIG. 21 shows an operation sequence example in a case where the non-target terminal (terminal 5 or 6 or both of them) sets the NAV, as a first example of the operation sequence according to the fourth embodiment. The operation is the same as that in FIG. 20 except the operation of the non-target terminal's setting the NAV. The non-target terminal receives the physical packet transmitted by base station 101, and sets the NAV after the end of the MAC frame, on the basis of the value of the Duration field in the header of the MAC frame in the stream. The NAV duration is set by completion of uplink MU-MIMO transmission, for example. Terminals 5 and 6 receive multiple physical packets uplink-MU-MIMO-transmitted from terminals 1 to 4, and decode one of these packets. The legacy fields and preambles 1 of these physical packets are set to common values. In a part of preambles 2 of the physical packets (or a part of preamble 1 is also allowed), the pattern signals of terminals 1 to 4 that are orthogonal to each other are set. Terminals 5 and 6 decode the legacy field and preamble 1, and separate corresponding preamble 2 on the basis of the preliminarily grasped pattern signal to obtain the channel information. Terminals 5 and 6 preliminarily grasp the pattern signal used by at least one of terminals 1 to 4 and use the pattern signal. For example, the base station may determine the pattern signals to be used for terminals 1 to 6, and store therein the list that contains these signals for a case of notifying the list. Terminals 5 and 6 decode the remaining part of preamble 2 and the subsequent data field using the obtained channel information, and obtains the MAC frame. The NAV is updated on the basis of the Duration field in the header of the decoded MAC frame. According to the above operation, even if terminals 5 and 6 receive physical packets destined for the base station from terminals 1 to 4, terminals 5 and 6 correctly decode one of these packets, thereby preventing the condition for EIFS setting from being satisfied. The NAV is subsequently set (up to the end of the physical packet to be uplink-transmitted, in this case) on the basis of the header of the MAC frame contained in the correctly decoded packet, thereby preventing the communication of the other terminals from being interfered. In a case where non-target terminals 5 and 6 perform carrier sensing to obtain the access rights on the medium after lapse of the NAV duration, the DIFS/AIFS [AC] period is correctly set. In a case where base station 101 and terminals 1 to 4 also try to obtain the access rights in an analogous manner, the DIFS/AIFS [AC] period is set. Consequently, the unfairness of obtaining the opportunity of the access right between the MU-MIMO-non-target terminals and target terminals and base station is solved.

The headers of the packets transmitted from terminals 1 to 4 in uplink-multi-user contain the legacy field, preamble 1 and preambles 2. However, the configuration of the header is not limited to this configuration. For example, a configuration can be adopted that includes the legacy field and preamble 1 but includes no preamble 2. In this case, for example, the base station may decode the data field of the packet transmitted in uplink-multi-user using decoding information (MCS, etc.) analogous to the encoding information of the downlink multi-user transmission taken place immediately therebefore. The base station starts reception within a certain fixed time period, e.g., SIFS+slot period (total time period of SIFS and slot time), after the last downlink multi-user transmission. In a case where a condition that the received packet is transmitted in uplink-multi-user is satisfied, the base station may hold the last decoding information. In a case where the condition is not satisfied or SIFS+slot period has elapsed, the base station may remove the last decoding information. The decoding information required to decode the data field may be contained in the legacy field or preamble 1 or both of them. In a case where the header contains no preamble 2, the data fields received from terminals 1 to 4 may be separated by preliminarily obtaining channel information through sounding for each of terminals 1 to 4 or through another method and then using this channel information.

Terminals 1 to 4 may transmit the BA frames through normal transmission (omni-transmission) sequentially in a legacy format (not containing preambles 1 and 2), instead of uplink MU-MIMO transmission. Consequently, the non-target terminal (and legacy terminal) can correctly receive and decode the uplink-transmitted physical packet, and set the NAV, thereby preventing the EIFS period from being set. However, in comparison with the case where the BA frames are transmitted in uplink-MU-MIMO, a longer time is required to receive all the BA frames, and the efficiency is decreased. As described in the above embodiments, to cause the terminals to sequentially transmit the BA frames, it is preferred to perform control so that the physical packets containing the BA frames can be separately transmitted from the terminals with deviation of every SIFS period.

Figure 22:
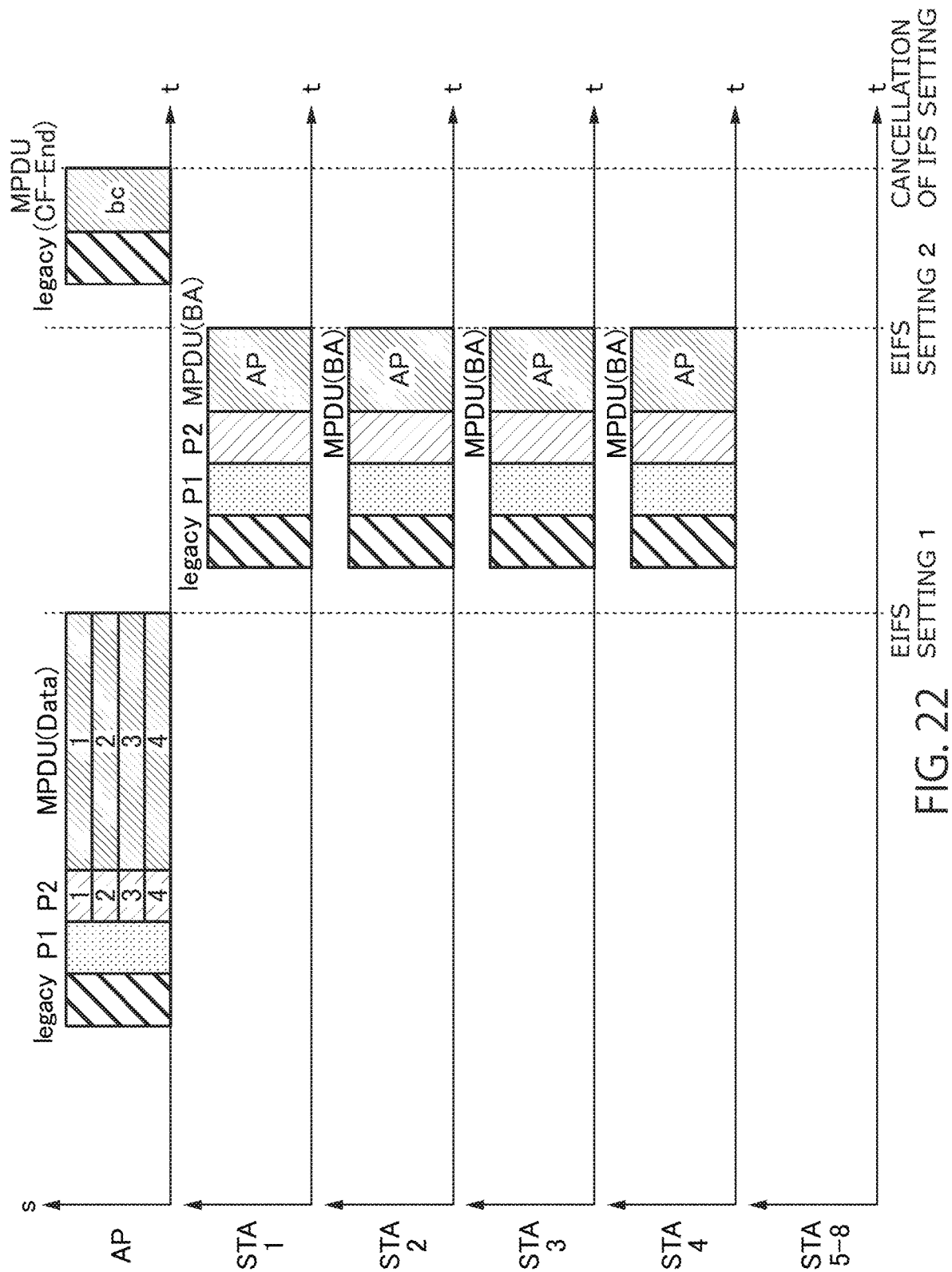
FIG. 22 is a diagram showing a second example of an operation sequence according to the fourth embodiment.

FIG. 22 is a diagram showing a second example of the operation sequence according to the fourth embodiment. This operation sequence example corresponds to the operation sequence example in FIG. 12 according to the second embodiment. It is assumed that terminals 1 to 6 are MU-MIMO compatible terminals, terminals 1 to 4 thereamong are MU-MIMO target terminals, and terminals 5 and 6 are MU-MIMO-non-target terminals. Terminals 7 and 8 are assumed as legacy terminals.

Base station 101 transmits the physical packets containing the MAC frames destined for terminals 1 to 4 by spatial multiplexing (downlink MU-MIMO transmission). Terminals 1 to 4 transmit the physical packets containing the acknowledgement response frames by spatial multiplexing (uplink MU-MIMO transmission) SIFS-period after completion of receipt of the MAC frames. Terminals 5 to 8 can receive any of the physical packets transmitted to terminals 1 to 4, or the physical packets transmitted from terminals 1 to 4 to the base station, according to the positions at which the respective terminals reside. In a case of receipt of any physical packet, for example, terminals 5 and 6 determine that preamble 1 does not contain information for identifying the own terminal, and thus detect a reception error. Terminals 7 and 8 detect a reception error because of a format error, such as incapability of analyzing preamble 1. In a case of trying to obtain access rights after completion of downlink MU-MIMO transmission, uplink MU-MIMO transmission, or completion of both of the transmissions, the EIFS period is set (see "EIFS SETTING 1" and "EIFS SETTING 2" at the bottom of FIG. 22).

Base station 101 transmits (omni-transmits) the CF-End frame SIFS-period after completion of receipt of the BA frame transmitted in uplink-MU-MIMO from terminals 1 to 4. The physical packets containing the CF-End frames are correctly received by terminals 1 to 8. Consequently, terminals 1 to 8 are permitted to access the medium after completion of reception of the CF-End frame, and set the normal DIFS/AIFS [AC] period when intending to obtain the access right (see "CANCELLATION OF EIFS SETTING" at the bottom of FIG. 22).

Thus, the CF-End frame prevents the EIFS period in terminals 5 to 8 from being set. Consequently, the equality of opportunity of obtaining the access right can be maintained among all terminals 1 to 8 and the base station. As described before, instead of the CF-End frame, another frame that does not request transmission of an acknowledgement response may be transmitted. This analogously applies to the following description.

Figure 23:
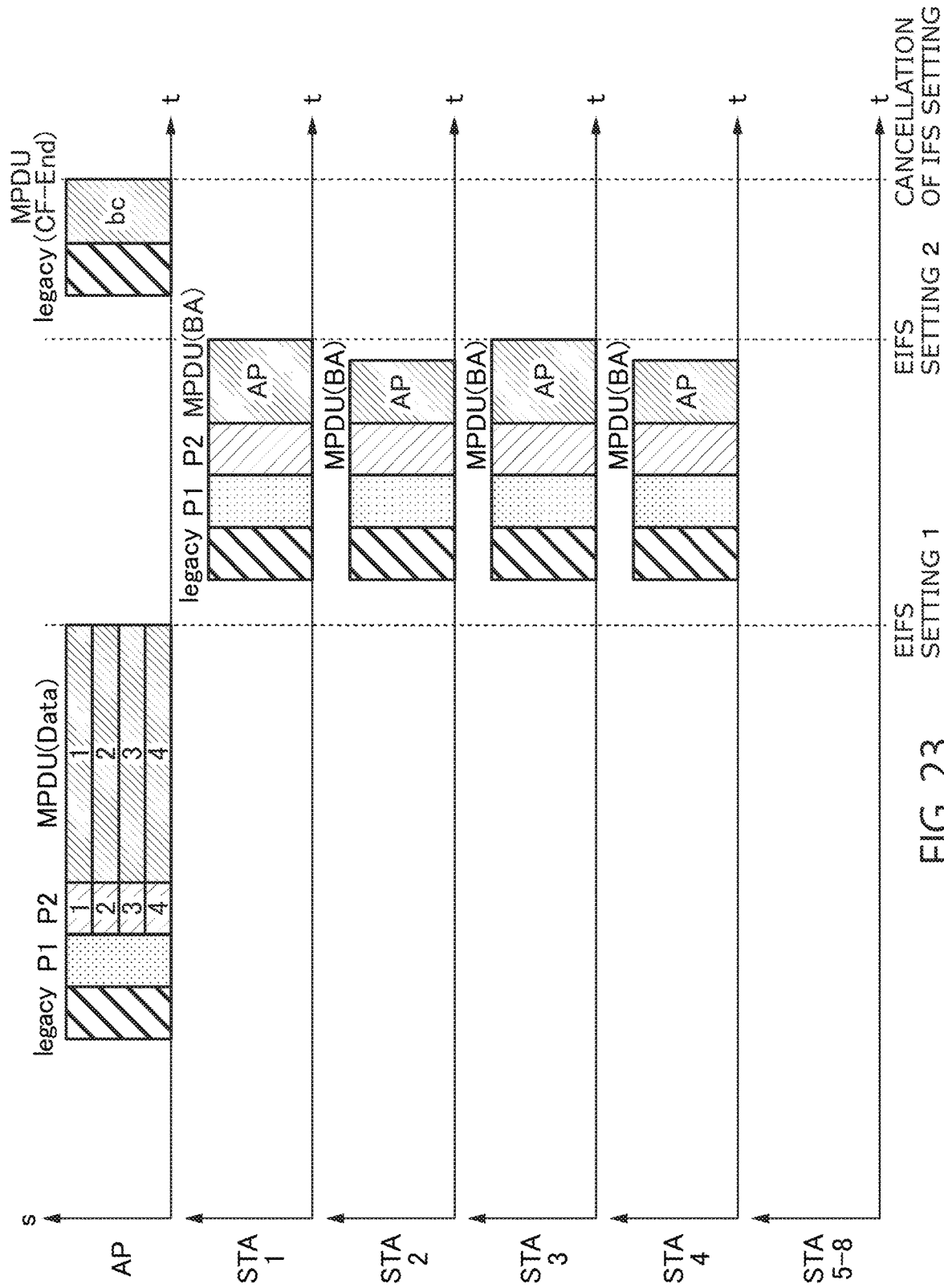
FIG. 23 is a diagram showing a third example of the operation sequence according to the fourth embodiment.

FIG. 23 shows a third example of the operation sequence according to the fourth embodiment. This operation sequence example corresponds to the operation sequence example in FIG. 13 according to the second embodiment.

This example is different in the lengths of MAC frames (here, BA frames) transmitted in uplink-MU-MIMO from terminals 1 to 4. The lengths of MAC frames transmitted from terminals 2 and 4 are shorter than those from terminals 1 and 3. Base station 101 transmits the CF-End frame SIFS-period after completion of reception of the physical packet having the largest packet length among the physical packets received from terminals 1 to 4. In a case where the PHY header length is fixed, the CF-End frame may be transmitted SIFS-period after completion of reception of the MAC frame having the largest frame length among the MAC frames.

According to a fourth example of the operation sequence according to the fourth embodiment, in order to equalize the lengths of physical packets transmitted by the terminals, the base station may notify information on the MCS or transmission rate applied to response, in the physical packet to be transmitted in downlink-MU-MIMO by the base station. Consequently, the base station is not required to identify the physical packet having the longest physical packet among the physical packets on a terminal-by-terminal basis. The information on MAC or transmission rate used to response is not necessarily explicitly designated as described in the previous embodiments. Alternatively, terminals 1 to 4 may transmit the MAC frames to terminals 1 to 4 in downlink-MU-MIMO at the transmission rates that terminals 1 to 4 can implicitly designate for application to BA frame transmission.

Figure 24:
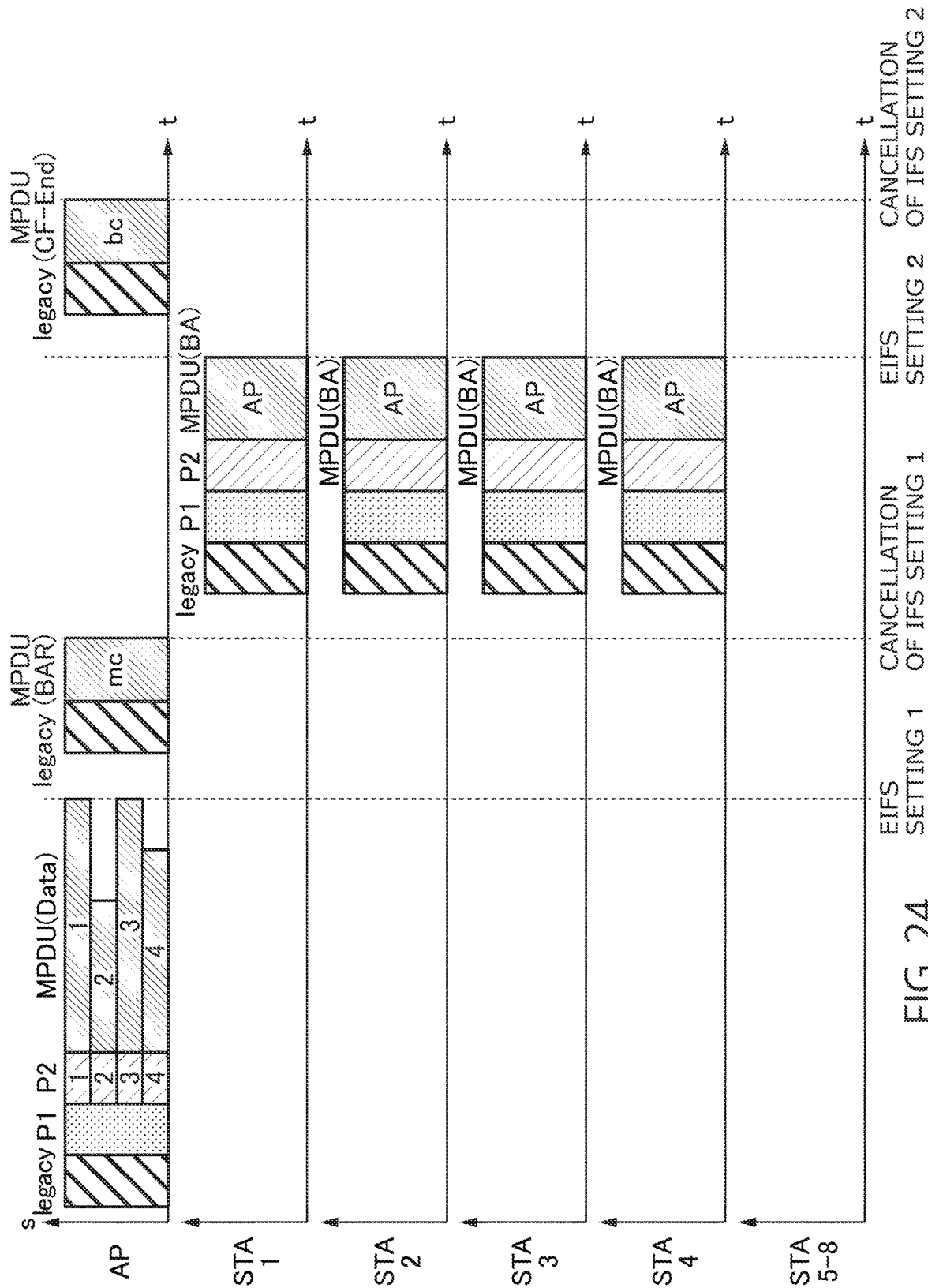
FIG. 24 is a diagram showing a fifth example of the operation sequence according to the fourth embodiment.

FIG. 24 shows a fifth example of the operation sequence according to the fourth embodiment. This operation sequence example corresponds to the operation sequence example in FIG. 15 according to the third embodiment.

Base station 101 transmits the physical packets containing the MAC frames destined for terminals 1 to 4 by spatial multiplexing (downlink MU-MIMO transmission). However, the lengths of MAC frames to be transmitted to terminals 1 to 4 are not the same. The base station transmits (omni-transmits) the BAR (Block Ack Request) frame SIFS-period after the time point of the length of the packet having the largest packet length among the physical packets transmitted to terminals 1 to 4. The BAR frame has the legacy format. RA of the BAR frame is the multicast address of the group to which terminals 1 to 4 belong. It can be considered to set the broadcast address instead of the multicast address. The BAR frames are not only correctly received by terminals 1 to 4 but also correctly received by terminals 5 to 8. Consequently, terminals 5 to 8 correctly receive the physical packets containing the BAR frames, thereby canceling the EIFS period setting (see "CANCELLATION OF EIFS SETTING 1" in FIG. 15).

Upon receipt of the BAR frames transmitted from the base station, terminals 1 to 4 transmit the physical packets containing the BA frames by spatial multiplexing (uplink MU-MIMO transmission) after lapse of SIFS period. If terminals 5 to 8 fail to receive the physical packets, the EIFS period setting occurs again here ("EIFS SETTING 2" in FIG. 24). However, subsequently, the CF-End frames are transmitted from the base station, and terminals 5 to 8 correctly receive these frames, thereby canceling the EIFS period setting. That is, subsequently, when the non-target terminals, the target terminals and the base station try to access the wireless medium, the DIFS/AIFS [AC] period is correctly set.

Figure 25:
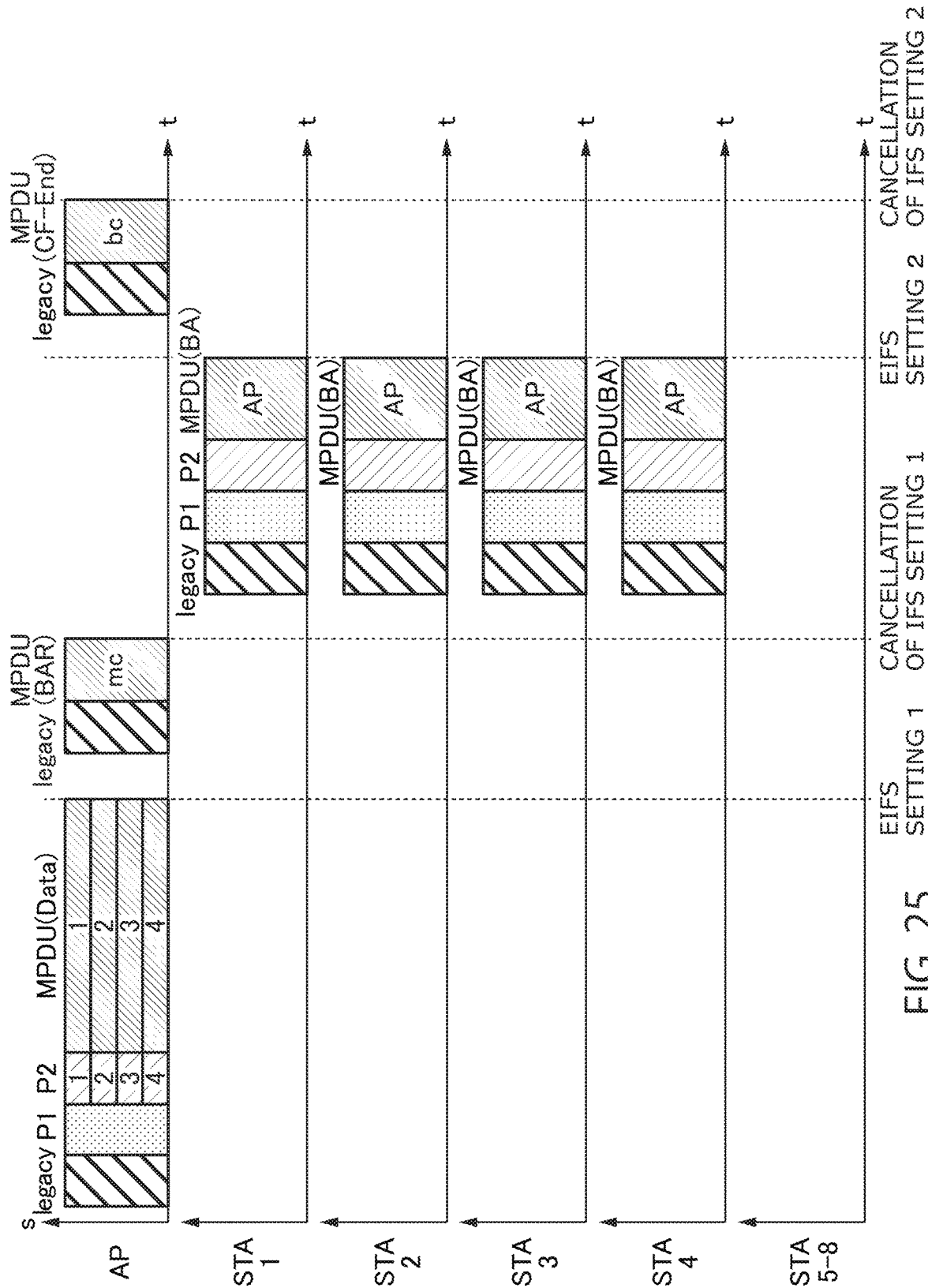
FIG. 25 is a diagram showing a sixth example of the operation sequence according to the fourth embodiment.

In the sequence example of FIG. 24, the packet lengths of the physical packets downlink-MU-MIMO-transmitted by the base station are not the same among the terminals. However, also in a case where these packet lengths are the same, BAR frame transmission allows the transmission timings of the BA frames to be synchronized with each other in an analogous manner. FIG. 25 shows a sequence example in this case as a sixth example of the operation sequence according to the fourth embodiment. This sequence example corresponds to the operation sequence example in FIG. 17 according to the third embodiment.

Figure 26:
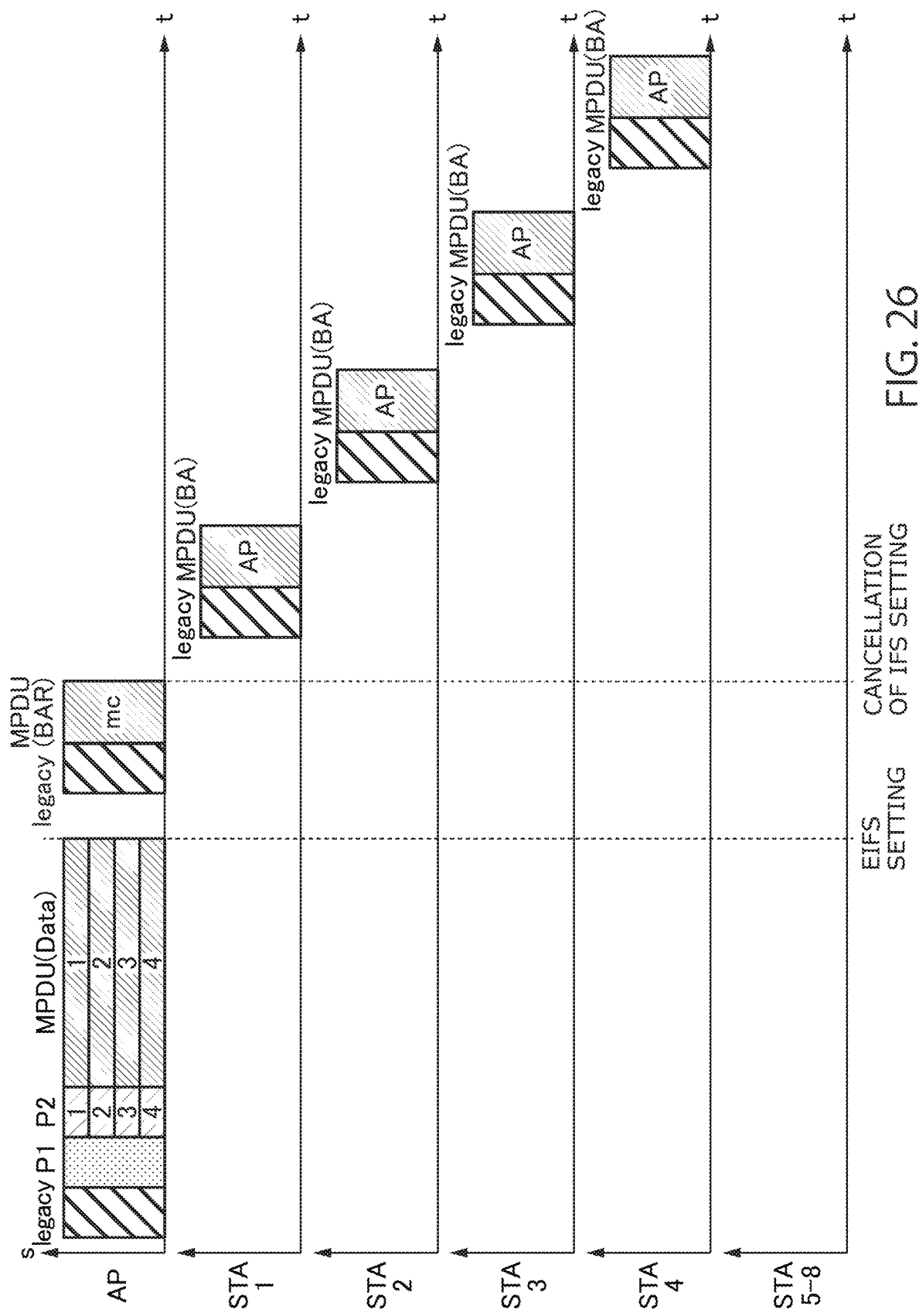
FIG. 26 is a diagram showing a seventh example of the operation sequence according to the fourth embodiment.

FIG. 26 shows a seventh example of the operation sequence according to the fourth embodiment. This operation sequence example corresponds to the operation sequence example in FIG. 18 according to the third embodiment.

In this sequence example, terminals 1 to 4 do not transmit the BA frames in uplink-MU-MIMO in response to the BAR frames received from the base station. Instead, the terminals sequentially transmit (omni-transmit) the physical packets containing the respective BA frames to the base station with every SIFS period deviation. The physical packet containing the BA frame has the legacy format (without preambles 1 and 2).

The base station transmits (omni-transmits) the BAR frame SIFS-period after completion of downlink MU-MIMO transmission. The BAR frame contains information for identifying the timing at which the MU-MIMO target terminals are caused to return the BA frames, and information for identifying the MCS (or transmission rate) to be applied to BA frame transmission. The details are as described in the previous embodiments. Terminals 5 to 8 correctly receive the physical packets containing the BAR frames (set the NAVs according to the value of Duration field), thereby canceling the EIFS period setting problem. Subsequently, the physical packets containing the BA frames sequentially transmitted from the respective terminals can also be correctly received. Accordingly, any event that is a cause of setting the EIFS period does not occur. Consequently, in a case where each terminal and the base station try to access the wireless medium after terminal 4 that is to transmit the BA frame last transmits this BA frame, each DIFS/AIFS [AC] period is correctly set and the equality among the terminals is maintained.

The transmission timings and transmission rates designated for terminals 1 to 4 may be set so that the physical packets respectively transmitted therefrom can be separated by SIFS-intervals, in an analogous manner to the embodiments described above. The base station may not necessarily explicitly notify the transmission rates to be applied to respective terminals 1 to 4, to these terminals 1 to 4. In this case, the base station may transmit the BAR frames at transmission rates that terminals 1 to 4 can implicitly designate for application to BA frame transmission. The details have been described in the previous embodiments. The order of causing the terminals to respond with the BA frames is terminals 1, 2, 3, and 4 in the example in FIG. 18. However, the order of causing the terminals to respond is not limited to this order.

This embodiment describes the mode of equalizing the opportunities of obtaining access rights on the medium in the case where the base station performs downlink multi-user MIMO (Multi-User Multiple Input, Multiple Output: MU-MIMO) transmission to the multiple terminals. Alternatively, modes analogous to the first to fourth embodiments are applicable also to a communication scheme in which OFDMA and MU-MIMO are combined (called OFDMA & MU-MIMO). In this communication scheme, each of the resource blocks are allocated to multiple terminals, and the downlink MU-MIMO transmission is performed in units of resource blocks simultaneously in these resource blocks. Combination of the fourth embodiment and any of the first to third embodiments allows a mode for equalizing the opportunities of obtaining access rights on the medium to be achieved also for this communication scheme.

Fifth Embodiment

Figure 27:
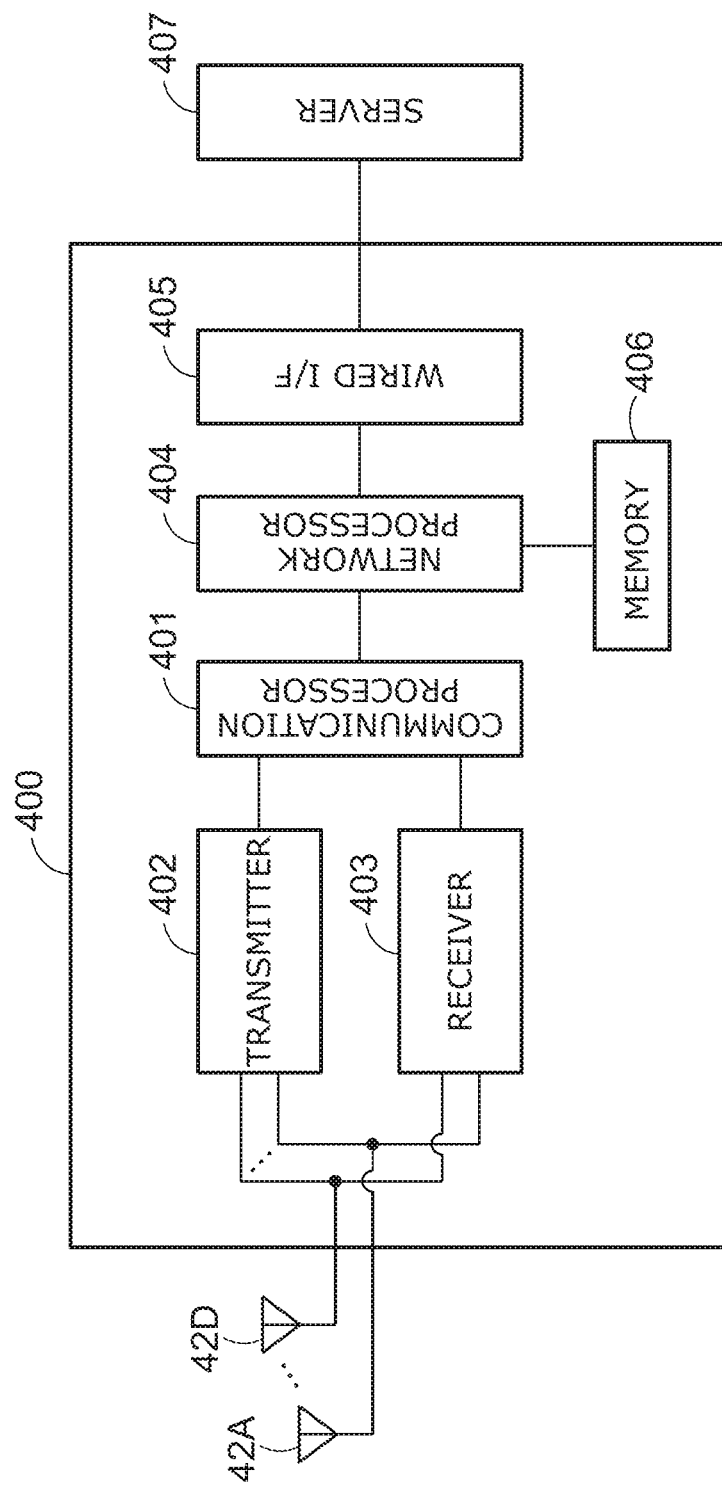
FIG. 27 is a functional block diagram of a base station or a terminal according to the fifth embodiment.

FIG. 27 is a functional block diagram of base station (access point) 400 according to a fifth embodiment. This access point includes communication processor 401, transmitter 402, receiver 403, antennas 42A, 42B, 42C and 42D, network processor 404, wired I/F 405, and memory 406. Access point 400 is connected to server 407 via wired I/F 405. Communication processor 401 has functions analogous to those of MAC processor 10 and MAC/PHY manager 60 described in the first embodiment. Transmitter 402 and receiver 403 have functions analogous to those of PHY processor 50 and analog processor 70 described in the first embodiment. Network processor 404 has a function analogous to that of upper processor 90 described in the first embodiment. Here, communication processor 401 may internally include a buffer for exchanging data with network processor 404. This buffer may be a volatile memory, such as DRAM, or a nonvolatile memory, such as NAND or MRAM.

Network processor 404 controls data exchange with communication processor 401, reading and writing data from and to memory 406, and communication with server 407 via wired I/F 405. Network processor 404 may perform a communication process on a layer, such as TCP/IP or UDP/IP, which is the upper layer of the MAC layer, and a process on the application layer. The operation of the network processor may be performed as a process of software (program) by a processor, such as CPU, or performed by hardware or performed by both of software and hardware.

For example, communication processor 401 corresponds to a baseband integrated circuit, and transmitter 402 and receiver 403 correspond to an RF integrated circuit that transmits and receives frames. Communication processor 401 and network processor 404 may be implemented in one integrated circuit (one chip). A part performing digital domain processes of transmitter 402 and receiver 403 and a part performing analog domain processes thereof may be implemented in different chips. Communication processor 401 may execute a communication process on a higher layer than the MAC layer; the higher layer may be TCP/IP or UDP/IP. Although the number of antennas is four in this case, it is only required that at least one antenna is included.

Memory 406 stores therein data received from server 407, and stores therein data received through receiver 402. Memory 406 may be, for example, a volatile memory, such as DRAM, or a nonvolatile memory, such as NAND or MRAM. Memory 406 may be an SSD, an HDD, an SD card, an eMMC or the like. Memory 406 may be arranged outside of base station 400.

Wired I/F 405 transmits and receives data to and from server 407. In this embodiment, communication with server 407 is performed in a wired manner. The communication with server 407 may be executed in a wireless manner.

Server 407 is a communication device that returns a response containing requested data in response to data transfer request for requesting data transmission. For example, an HTTP server (web server), FTP server or the like is assumed. However, the implementation is not limited thereto as long as the device includes the function of returning the requested data. The device may be a communication device, such as a PC or smartphone, operated by a user. The device may wirelessly communicate with base station 400.

When STA belonging to BSS of base station 400 issues a data transfer request to server 407, a packet pertaining to the data transfer request is transmitted to base station 400. Base station 400 receives the packet via antennas 42A to 42D, receiver 403 performs a process on the physical layer and the like, and communication processor 401 performs a process on the MAC layer and the like.

Network processor 404 analyzes the packet received from communication processor 401. More specifically, the destination ID address, the destination port number and the like are verified. In a case where the data in the packet is a data transfer request, such as an HTTP GET request, network processor 404 checks whether the data requested by the data transfer request (e.g., data residing at URL requested in the HTTP GET request) is cashed (stored) in memory 406. Memory 406 stores therein a table that associates URLs (or their archived representation, e.g., hash values or alternative identifiers) with data. Here, a state where the data is cached in memory 406 is represented such that cache data resides in memory 406.

In a case no cache data resides in memory 406, network processor 404 transmits a data transfer request to server 407 via wired I/F 405. That is, on behalf of STA, network processor 404 transmits the data transfer request to server 407. More specifically, network processor 404 generates an HTTP request, performs a protocol process, such as adding a TCP/IP header, and passes the packet to wired I/F 405. Wired I/F 405 transmits the received packet to server 407.

Wired I/F 405 receives the packet serving as the response to the data transfer request, from server 407. Network processor 404 grasps that the packet is destined for STA on the basis of the IP header of the packet received via wired I/F 405, and passes the packet to communication processor 401. Communication processor 401 executes a process on the MAC layer for the packet, and transmitter 402 executes a process on the physical layer therefor, and transmits the packet destined for STA via antennas 42A to 42D. Here, network processor 404 associates the data received from server 407 with the URL (or its archived representation), and stores therein the associated data as cache data in memory 406.

When the cache data resides in memory 406, network processor 404 reads the data requested by the data transfer request, from memory 406, and transmits the data to communication processor 401. More specifically, an HTTP header and the like are added to the data read from memory 406, and a protocol process, such as adding a TCP/IP header, is performed, and the packet is transmitted to communication processor 401. At this time, for example, the transmission source IP address of the packet is set to an IP address identical to the IP address of the server, and the transmission source port number is set to a port number (the destination port number of the packet transmitted by the communication terminal) identical to the port number of the server. Consequently, from the standpoint of STA, communication appears to be made with server 407. Communication processor 401 executes a process on the MAC layer for the packet, and transmitter 402 executes a process on the physical layer therefor, and transmits the packet destined for STA via antennas 42A to 42D.

According to such operations, response is made with frequently accessed data based on the cache data stored in memory 406, thereby allowing the traffic between server 407 and base station 400 to be reduced. The operation of network processor 404 is not limited to the operation in this embodiment. No problem occurs with another operation of a typical or general cache proxy as long as the operation obtains data from server 407 instead of STA, caches the data in memory 406, and responds with the cache data in memory 406 in response to a data transfer request for the same data.

The base station (access point) of this embodiment is applicable as the base stations of the first to fourth embodiments. For example, the base station preliminarily receives the data transfer requests issued by multiple terminals including terminals 1 to 4, and identifies the terminals (here, terminals 1 to 4) in which the data items requested by the data transfer requests are cashed. The base station reads the data from memory 406, generates the data frames containing the respective read data items, adds physical headers (a legacy field, preamble 1, and preambles 2), and downlink-transmits the frames to terminals 1 to 4. For the terminal with no data being cached in memory 406, an operation of obtaining the data requested by server 407 through the data transfer request and caching the data in memory 406. This operation may be performed independently of wireless network communication on the sides of terminals 1 to 4 described before. Here, it is assumed that the data transmitted to terminals 1 to 4 is the data obtained from server 407. The configuration is not necessarily limited thereto. The data may be data obtained by any method as long as the data stored in memory 406 is transmitted. For example, the data may be data received from an external device other than server 407. The data cached in memory 406 is not necessarily transmitted. Alternatively, information based on the cached data can be transmitted to terminals in the data frames or management frames. For example, the information may be information, such as the data amount or data type of the cached data. In the case of transmission of this information, a request for transmitting the information may be obtained from the terminal, and the information may be transmitted in response to the request. Alternatively, the base station may transmit the information without receipt of such a request.

The base station may change the length of NAV according to the amount of data that is cached in memory 406 and is to be transmitted to terminals 1 to 4. In a case where such data is OFDMA-transmitted to terminals 1 to 4, it may be configured such that the larger the amount of data is, the longer the NAV is. For example, the NAV value may be set according to the largest amount of data. In the example of FIG. 8, in a case where the amounts of data destined for respective terminals 1 to 4 are large, it may be considered that OFDMA transmission of the downlink data frame and OFDMA transmission of the uplink BA frame may be performed multiple times. In this case, the NAV may be set according to the length of period from the end of the data frame downlink-OFDMA-transmitted first (it is assumed that the ends of data frames of terminals 1 to 4 coincide with each other in FIG. 8 (including a case of adding padding data)) to the end of the BA frame uplink-transmitted at the last time of the series of frames exchanges (the ends of the BA frames transmitted by terminals 1 to 4 coincide with each other in FIG. 8). Note that in a case with a TXOP limit, the NAV value is set within the TXOP limit. In the simplest case, the TXOP limit is 0 (only one frame can be transmitted). In this case, the NAV value is set up to the end of the BA frame transmitted first. In a case where the TXOP limit is not 0, the NAV value may be set within a limit value according to the data type (AC or TID) and the like. Instead of the configuration that sets the NAV value in the Duration field of the header of the MAC frame, a configuration may be adopted that sets the value in preamble 1 or preambles 2 or both of them.

In this embodiment, the base station having the cache function has been described. Alternatively, the same block configuration as that in FIG. 27 can achieve a terminal (STA) having the cache function. In this case, wired I/F 405 may be omitted. The terminals of this embodiment may be applied as the terminals of the first to fourth embodiments. For example, terminals 5 and 6 (see FIG. 8 and the like) read the data cache in memory 406 when the access to the wireless medium is not suppressed (after the NAV is canceled in FIG. 8), transmit the data frames containing the read data (more specifically, the physical packet to which the physical header is added) to the base station. The data may be data obtained from server 407, or data obtained by another method. Alternatively, data required to generate the acknowledgement response frame (the BA frame, the ACK frame, etc.) may be read from memory 406, and the acknowledgement response frame may be generated on the basis of the data. The data cached in memory 406 is not necessarily transmitted. Alternatively, information based on the cached data can be transmitted to the base station in the data frames, management frames or the like. For example, the information may be information, such as the data amount or data type of the cached data. In the case of transmission of this information, a request for transmitting the information may be obtained from the base station, and the information may be transmitted in response to the request. Alternatively, the information may be transmitted without receipt of such a request. In the case of uplink multi-user communication (MU-MUMO, OFDMA, etc.), the base station may determine the uplink target terminals using the information. Alternatively, the base station may determine terminals that are targets of downlink multi-user communication, using the information. For example, it can be considered that a terminal having at least a certain value of data amount, or a terminal having a data amount having at least a certain ratio to the buffer size is regarded to have a small available capacity of the buffer and is not selected as a downlink target terminal. In a case of multi-hop network, the terminal has both of a role of serving as a terminal as non-base station and a role of serving as a base station. When the terminal operates as a base station, this terminal is only required to perform the operation of the base station described before.

Sixth Embodiment

Figure 28:
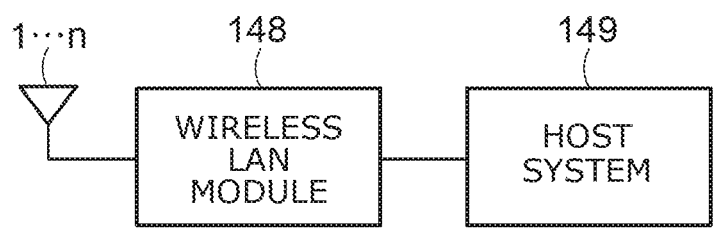
FIG. 28 shows an overall configuration example of a terminal or a base station according to a sixth embodiment.

FIG. 28 shows an example of entire configuration of a terminal or a base station. The example of configuration is just an example, and the present embodiment is not limited to this. The terminal or the base station includes one or a plurality of antennas 1 to n (n is an integer equal to or greater than 1), a wireless LAN module 148, and a host system 149. The wireless LAN module 148 corresponds to the wireless communication device according to the first embodiment. The wireless LAN module 148 includes a host interface and is connected to the host system 149 through the host interface. Other than the connection to the host system 149 through the connection cable, the wireless LAN module 148 may be directly connected to the host system 149. The wireless LAN module 148 can be mounted on a substrate by soldering or the like and can be connected to the host system 149 through wiring of the substrate. The host system 149 uses the wireless LAN module 148 and the antennas 1 to n to communicate with external apparatuses according to an arbitrary communication protocol. The communication protocol may include the TCP/IP and a protocol of a layer higher than that. Alternatively, the TCP/IP may be mounted on the wireless LAN module 148, and the host system 149 may execute only a protocol in a layer higher than that. In this case, the configuration of the host system 149 can be simplified. Examples of the present terminal include a mobile terminal, a TV, a digital camera, a wearable device, a tablet, a smartphone, a game device, a network storage device, a monitor, a digital audio player, a Web camera, a video camera, a projector, a navigation system, an external adaptor, an internal adaptor, a set top box, a gateway, a printer server, a mobile access point, a router, an enterprise/service provider access point, a portable device, a hand-held device and so on.

Figure 29:
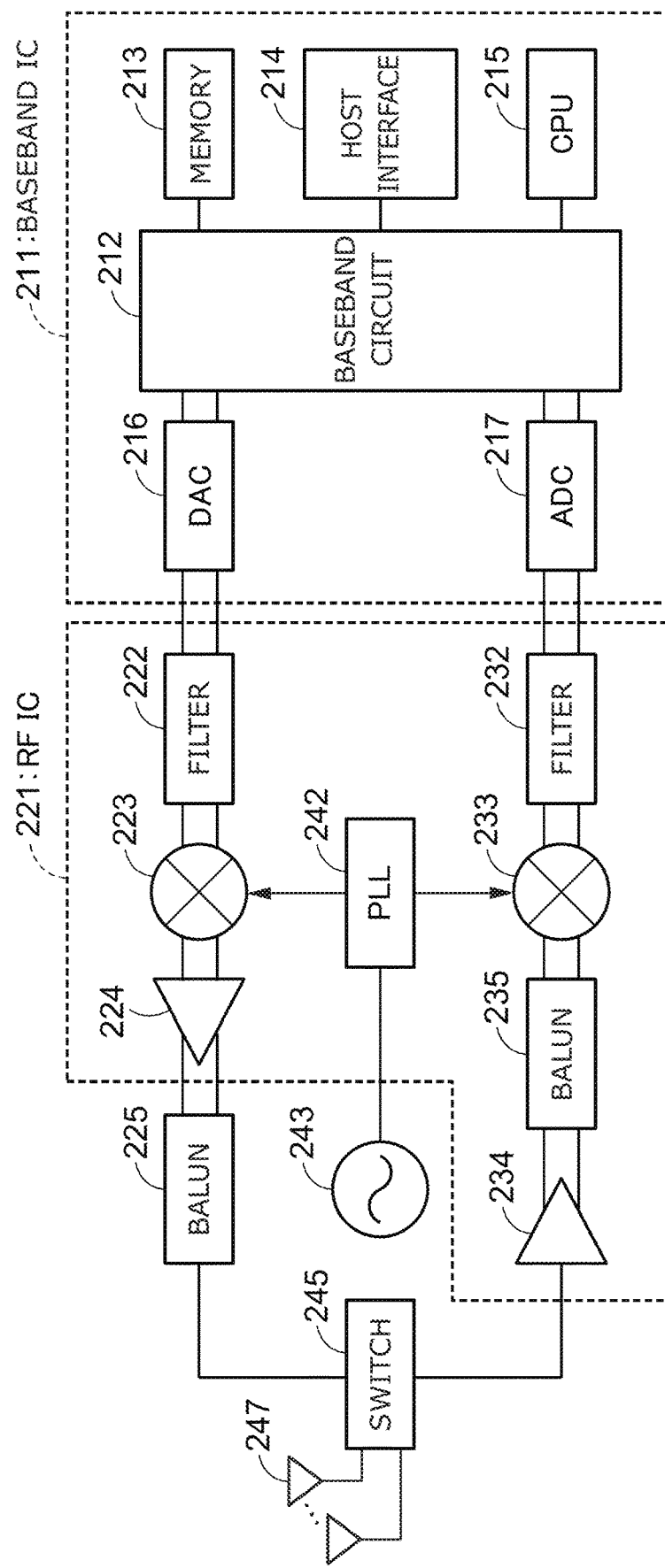
FIG. 29 is a diagram showing a hardware configuration example of a wireless communication device mounted on a base station or a terminal according to the sixth embodiment.

FIG. 29 shows an example of hardware configuration of a WLAN module. The configuration shown in the figure may be applied for each case in where the wireless communication device is mounted in non-AP terminal or in AP (Access Point) provided correspondingly to each function. That is, the configuration can be applied as specific examples of the wireless communication device in FIG. 1. In the configuration shown in figure, at least one antenna is included although a plurality of antennas are included. In this case, a plurality of sets of a transmission system (216 and 222 to 225), a reception system (217, 232 to 235), a PLL 242, a crystal oscillator (reference signal source) 243, and a switch 245 may be arranged according to the antennas, and each set may be connected to a control circuit 212. One or both of the PLL 242 and the crystal oscillator 243 correspond to an oscillator according to the present embodiment.

The wireless LAN module (wireless communication device) includes a baseband IC (Integrated Circuit) 211, an RF (Radio Frequency) IC 221, a balun 225, the switch 245, and the antenna 247.

The baseband IC 211 includes the baseband circuit (control circuit) 212, a memory 213, a host interface 214, a CPU 215, a DAC (Digital to Analog Converter) 216, and an ADC (Analog to Digital Converter) 217.

The baseband IC 211 and the RF IC 221 may be formed on the same substrate. The baseband IC 211 and the RF IC 221 may be formed by one chip. Both or one of the DAC 216 and the ADC 217 may be arranged on the RF IC 221 or may be arranged on another IC. Both or one of the memory 213 and the CPU 215 may be arranged on an IC other than the baseband IC.

The memory 213 stores data to be transferred to and from the host system. The memory 213 also stores one or both of information to be transmitted to the terminal or the base station and information transmitted from the terminal or the base station. The memory 213 may also store a program necessary for the execution of the CPU 215 and may be used as a work area for the CPU 215 to execute the program. The memory 213 may be a volatile memory, such as an SRAM or a DRAM, or may be a non-volatile memory, such as a NAND or an MRAM.

The host interface 214 is an interface for connection to the host system. The interface can be anything, such as UART, SPI, SDIO, USB, or PCI Express.

The CPU 215 is a processor that executes a program to control the baseband circuit 212. The baseband circuit 212 mainly executes a process of the MAC layer and a process of the physical layer. One or both of the baseband circuit 212 and the CPU 215 correspond to the communication control apparatus that controls communication, the controller that controls communication, or controlling circuitry that controls communication.

At least one of the baseband circuit 212 or the CPU 215 may include a clock generator that generates a clock and may manage internal time by the clock generated by the clock generator.

For the process of the physical layer, the baseband circuit 212 performs addition of the physical header, coding, encryption, modulation process (which may include MIMO modulation), and the like of the frame to be transmitted and generates, for example, two types of digital baseband signals (hereinafter, "digital I signal" and "digital Q signal").

The DAC 216 performs DA conversion of signals input from the baseband circuit 212. More specifically, the DAC 216 converts the digital I signal to an analog I signal and converts the digital Q signal to an analog Q signal. Note that a single system signal may be transmitted without performing quadrature modulation. When a plurality of antennas are included, and single system transmission or multi-system transmission signals equivalent to the number of antennas are to be distributed and transmitted, the number of provided DACs and the like may correspond to the number of antennas.

The RF IC 221 is, for example, one or both of an RF analog IC and a high frequency IC. The RF IC 221 includes a filter 222, a mixer 223, a preamplifier (PA) 224, the PLL (Phase Locked Loop) 242, a low noise amplifier (LNA) 234, a balun 235, a mixer 233, and a filter 232. Some of the elements may be arranged on the baseband IC 211 or another IC. The filters 222 and 232 may be bandpass filters or low pass filters.

The filter 222 extracts a signal of a desired band from each of the analog I signal and the analog Q signal input from the DAC 216. The PLL 242 uses an oscillation signal input from the crystal oscillator 243 and performs one or both of division and multiplication of the oscillation signal to thereby generate a signal at a certain frequency synchronized with the phase of the input signal. Note that the PLL 242 includes a VCO (Voltage Controlled Oscillator) and uses the VCO to perform feedback control based on the oscillation signal input from the crystal oscillator 243 to thereby obtain the signal at the certain frequency. The generated signal at the certain frequency is input to the mixer 223 and the mixer 233. The PLL 242 is equivalent to an example of an oscillator that generates a signal at a certain frequency.

The mixer 223 uses the signal at the certain frequency supplied from the PLL 242 to up-convert the analog I signal and the analog Q signal passed through the filter 222 into a radio frequency. The preamplifier (PA) amplifies the analog I signal and the analog Q signal at the radio frequency generated by the mixer 223, up to desired output power. The balun 225 is a converter for converting a balanced signal (differential signal) to an unbalanced signal (single-ended signal). Although the balanced signal is handled by the RF IC 221, the unbalanced signal is handled from the output of the RF IC 221 to the antenna 247. Therefore, the balun 225 performs the signal conversions.

The switch 245 is connected to the balun 225 on the transmission side during the transmission and is connected to the LNA 234 or the RF IC 221 on the reception side during the reception. The baseband IC 211 or the RF IC 221 may control the switch 245. There may be another circuit that controls the switch 245, and the circuit may control the switch 245.

The analog I signal and the analog Q signal at the radio frequency amplified by the preamplifier 224 are subjected to balanced-unbalanced conversion by the balun 225 and are then emitted as radio waves to the space from the antenna 247.

The antenna 247 may be a chip antenna, may be an antenna formed by wiring on a printed circuit board, or may be an antenna formed by using a linear conductive element.

The LNA 234 in the RF IC 221 amplifies a signal received from the antenna 247 through the switch 245 up to a level that allows demodulation, while maintaining the noise low. The balun 235 performs unbalanced-balanced conversion of the signal amplified by the low noise amplifier (LNA) 234. The mixer 233 uses the signal at the certain frequency input from the PLL 242 to down-convert, to a baseband, the reception signal converted to a balanced signal by the balun 235. More specifically, the mixer 233 includes a unit that generates carrier waves shifted by a phase of 90 degrees based on the signal at the certain frequency input from the PLL 242. The mixer 233 uses the carrier waves shifted by a phase of 90 degrees to perform quadrature demodulation of the reception signal converted by the balun 235 and generates an I (In-phase) signal with the same phase as the reception signal and a Q (Quad-phase) signal with the phase delayed by 90 degrees. The filter 232 extracts signals with desired frequency components from the I signal and the Q signal. Gains of the I signal and the Q signal extracted by the filter 232 are adjusted, and the I signal and the Q signal are output from the RF IC 221.

The ADC 217 in the baseband IC 211 performs AD conversion of the input signal from the RF IC 221. More specifically, the ADC 217 converts the I signal to a digital I signal and converts the Q signal to a digital Q signal. Note that a single system signal may be received without performing quadrature demodulation.

When a plurality of antennas are provided, the number of provided ADCs may correspond to the number of antennas. Based on the digital I signal and the digital Q signal, the baseband circuit 212 executes a process of the physical layer and the like, such as demodulation process, error correcting code process, and process of physical header, and obtains a frame. The baseband circuit 212 applies a process of the MAC layer to the frame. Note that the baseband circuit 212 may be configured to execute a process of TCP/IP when the TCP/IP is implemented.

Seventh Embodiment

FIG. 30A and FIG. 30B are perspective views of wireless terminal according to the present embodiment. The wireless terminal in FIG. 30A is a notebook PC 301 and the wireless communication device (or a wireless device) in FIG. 30B is a mobile terminal 321. Each of them corresponds to one form of a terminal (which may indicate a base station). The notebook PC 301 and the mobile terminal 321 are equipped with wireless communication devices 305 and 315, respectively. The wireless communication device provided in a terminal (which may indicate a base station) which has been described before can be used as the wireless communication devices 305 and 315. A wireless terminal carrying a wireless communication device is not limited to notebook PCs and mobile terminals. For example, it can be installed in a TV, a digital camera, a wearable device, a tablet, a smart phone, a gaming device, a network storage device, a monitor, a digital audio player, a web camera, a video camera, a projector, a navigation system, an external adapter, an internal adapter, a set top box, a gateway, a printer server, a mobile access point, a router, an enterprise/service provider access point, a portable device, a handheld device and so on.

Moreover, a wireless communication device installed in a terminal (which may indicate a base station) can also be provided in a memory card. FIG. 31 illustrates an example of a wireless communication device mounted on a memory card. A memory card 331 contains a wireless communication device 355 and a body case 332. The memory card 331 uses the wireless communication device 355 for wireless communication with external devices. Here, in FIG. 31, the description of other installed elements (for example, a memory, and so on) in the memory card 331 is omitted.

Eighth Embodiment

In the present embodiment, a bus, a processor unit and an external interface unit are provided in addition to the configuration of the wireless communication device according to any of the above embodiments. The processor unit and the external interface unit are connected with an external memory (a buffer) through the bus. A firmware operates the processor unit. Thus, by adopting a configuration in which the firmware is included in the wireless communication device, the functions of the wireless communication device can be easily changed by rewriting the firmware. The processing unit in which the firmware operates may be a processor that performs the process of the communication controlling device or the control unit according to the present embodiment, or may be another processor that performs a process relating to extending or altering the functions of the process of the communication controlling device or the control unit. The processing unit in which the firmware operates may be included in the access point or the wireless terminal according to the present embodiment. Alternatively, the processing unit may be included in the integrated circuit of the wireless communication device installed in the access point, or in the integrated circuit of the wireless communication device installed in the wireless terminal.

Ninth Embodiment

In the present embodiment, a clock generating unit is provided in addition to the configuration of the wireless communication device according to any of the above embodiments. The clock generating unit generates a clock and outputs the clock from an output terminal to the exterior of the wireless communication device. Thus, by outputting to the exterior the clock generated inside the wireless communication device and operating the host by the clock output to the exterior, it is possible to operate the host and the wireless communication device in a synchronized manner.

Tenth Embodiment

In the present embodiment, a power source unit, a power source controlling unit and a wireless power feeding unit are included in addition to the configuration of the wireless communication device according to any of the above embodiments. The power supply controlling unit is connected to the power source unit and to the wireless power feeding unit, and performs control to select a power source to be supplied to the wireless communication device. Thus, by adopting a configuration in which the power source is included in the wireless communication device, power consumption reduction operations that control the power source are possible.

Eleventh Embodiment

In the present embodiment, a SIM card is added to the configuration of the wireless communication device according to any of the above embodiments. For example, the SIM card is connected with MAC processor 10, MAC/PHY manager 60, or a controller in the wireless communication device. Thus, by adopting a configuration in which the SIM card is included in the wireless communication device, authentication processing can be easily performed.

Twelfth Embodiment

In the eighth embodiment, a video image compressing/decompressing unit is added to the configuration of the wireless communication device according to any of the above embodiments. The video image compressing/decompressing unit is connected to the bus. Thus, by adopting a configuration in which the video image compressing/decompressing unit is included in the wireless communication device, transmitting a compressed video image and decompressing a received compressed video image can be easily done.

Thirteenth Embodiment

In the present embodiment, an LED unit is added to the configuration of the wireless communication device according to any of the above embodiments. For example, the LED unit is connected to at least one of MAC processor 10, MAC/PHY manager 60, a transmission processing circuit, a reception processing circuit or a controller in the wireless communication device. Thus, by adopting a configuration in which the LED unit is included in the wireless communication device, notifying the operation state of the wireless communication device to the user can be easily done.

Fourteenth Embodiment

In the present embodiment, a vibrator unit is included in addition to the configuration of the wireless communication device wireless communication device according to any of the above embodiments. For example, the vibrator unit is connected to at least one of MAC processor 10, MAC/PHY manager 60, a transmission processing circuit, a reception processing circuit or a controller in the wireless communication device. Thus, by adopting a configuration in which the vibrator unit is included in the wireless communication device, notifying the operation state of the wireless communication device to the user can be easily done.

Fifteenth Embodiment

In the present embodiment, the configuration of the wireless communication device includes a display in addition to the configuration of the wireless communication device (the wireless communication device of the terminal (which may indicate the base station)) according to any one of the above embodiments. The display may be connected to the MAC processor in the wireless communication device via a bus (not shown). As seen from the above, the configuration including the display to display the operation state of the wireless communication device on the display allows the operation status of the wireless communication device to be easily notified to a user.

Sixteenth Embodiment

In the present embodiment, [1] the frame type in the wireless communication system, [2] a technique of disconnection between wireless communication devices, [3] an access scheme of a wireless LAN system and [4] a frame interval of a wireless LAN are described.

[1] Frame Type in Communication System

Generally, as mentioned above, frames treated on a wireless access protocol in a wireless communication system are roughly divided into three types of the data frame, the management frame and the control frame. These types are correctly shown in a header part which is commonly provided to frames. As a display method of the frame type, three types may be distinguished in one field or may be distinguished by a combination of two fields. In IEEE 802.11 standard, identification of a frame type is made based on two fields of Type and Subtype in the Frame Control field in the header part of the MAC frame. The Type field is one for generally classifying frames into a data frame, a management frame, or a control frame and the Subtype field is one for identifying more detailed type in each of the classified frame types such as a beacon frame belonging to the management frame.

The management frame is a frame used to manage a physical communication link with a different wireless communication device. For example, there are a frame used to perform communication setting with the different wireless communication device or a frame to release communication link (that is, to disconnect the connection), and a frame related to the power save operation in the wireless communication device.

The data frame is a frame to transmit data generated in the wireless communication device to the different wireless communication device after a physical communication link with the different wireless communication device is established. The data is generated in a higher layer of the present embodiment and generated by, for example, a user's operation.

The control frame is a frame used to perform control at the time of transmission and reception (exchange) of the data frame with the different wireless communication device. A response frame transmitted for the acknowledgment in a case where the wireless communication device receives the data frame or the management frame, belongs to the control frame. The response frame is, for example, an ACK frame or a BlockACK frame. The RTS frame and the CTS frame are also the control frame.

These three types of frames are subjected to processing based on the necessity in the physical layer and then transmitted as physical packets via an antenna. In IEEE 802.11 standard (including the extended standard such as IEEE Std 802.11ac-2013), an association process is defined as one procedure for connection establishment. The association request frame and the association response frame which are used in the procedure are a management frame. Since the association request frame and the association response frame is the management frame transmitted in a unicast scheme, the frames causes the wireless communication terminal in the receiving side to transmit an ACK frame being a response frame. The ACK frame is a control frame as described in the above.

[2] Technique of Disconnection Between Wireless Communication Devices

For disconnection of the connection (release), there are an explicit technique and an implicit technique. As the explicit technique, a frame to disconnect any one of the connected wireless communication devices is transmitted. This frame corresponds to Deauthentication frame defined in IEEE 802.11 standard and is classified into the management frame. Correctly, it is determined that the connection is disconnected at the timing of transmitting the frame to disconnect the connection in a wireless communication device on the side to transmit the frame and at the timing of receiving the frame to disconnect the connection in a wireless communication device on the side to receive the frame. Afterward, it returns to the initial state in a communication phase, for example, a state to search for a wireless communication device of the communicating partner. In a case that the wireless communication base station disconnects with a wireless communication terminal, for example, the base station deletes information on the wireless communication device from a connection management table if the base station holds the connection management table for managing wireless communication terminals which entries into the BSS of the base station-self. For example, in a case that the base station assigns an AID to each wireless communication terminal which entries into the BSS at the time when the base station permitted each wireless communication terminal to connect to the base station-self in the association process, the base station deletes the held information related to the AID of the wireless communication terminal disconnected with the base station and may release the AID to assign it to another wireless communication device which newly entries into the BSS.

On the other hand, as the implicit technique, it is determined that the connection state is disconnected in a case where frame transmission (transmission of a data frame and management frame or transmission of a response frame with respect to a frame transmitted by the subject device) is not detected from a wireless communication device of the connection partner which has established the connection for a certain period. Such a technique is provided because, in a state where it is determined that the connection is disconnected as mentioned above, a state is considered where the physical wireless link cannot be secured, for example, the communication distance to the wireless communication device of the connection destination is separated and the radio signals cannot be received or decoded. That is, it is because the reception of the frame to disconnect the connection cannot be expected.

As a specific example to determine the disconnection of connection in an implicit method, a timer is used. For example, at the time of transmitting a data frame that requests an acknowledgment response frame, a first timer (for example, a retransmission timer for a data frame) that limits the retransmission period of the frame is activated, and, if the acknowledgement response frame to the frame is not received until the expiration of the first timer (that is, until a desired retransmission period passes), retransmission is performed. When the acknowledgment response frame to the frame is received, the first timer is stopped.

On the other hand, when the acknowledgment response frame is not received and the first timer expires, for example, a management frame to confirm whether a wireless communication device of a connection partner is still present (in a communication range) (in other words, whether a wireless link is secured) is transmitted, and, at the same time, a second timer (for example, a retransmission timer for the management frame) to limit the retransmission period of the frame is activated. Similarly to the first timer, even in the second timer, retransmission is performed if an acknowledgment response frame to the frame is not received until the second timer expires, and it is determined that the connection is disconnected when the second timer expires.

Alternatively, a third timer is activated when a frame is received from a wireless communication device of the connection partner, the third timer is stopped every time the frame is newly received from the wireless communication device of the connection partner, and it is activated from the initial value again. When the third timer expires, similarly to the above, a management frame to confirm whether the wireless communication device of the connection party is still present (in a communication range) (in other words, whether a wireless link is secured) is transmitted, and, at the same time, a second timer (for example, a retransmission timer for the management frame) to limit the retransmission period of the frame is activated. Even in this case, retransmission is performed if an acknowledgment response frame to the frame is not received until the second timer expires, and it is determined that the connection is disconnected when the second timer expires. The latter management frame to confirm whether the wireless communication device of the connection partner is still present may differ from the management frame in the former case. Moreover, regarding the timer to limit the retransmission of the management frame in the latter case, although the same one as that in the former case is used as the second timer, a different timer may be used.

[3] Access Scheme of Wireless LAN System

For example, there is a wireless LAN system with an assumption of communication or competition with a plurality of wireless communication devices. CSMA/CA is set as the basis of an access scheme in IEEE802.11 (including an extension standard or the like) wireless LAN. In a scheme in which transmission by a certain wireless communication device is grasped and transmission is performed after a fixed time from the transmission end, simultaneous transmission is performed in the plurality of wireless communication devices that grasp the transmission by the wireless communication device, and, as a result, radio signals collide and frame transmission fails. By grasping the transmission by the certain wireless communication device and waiting for a random time from the transmission end, transmission by the plurality of wireless communication devices that grasp the transmission by the wireless communication device stochastically disperses. Therefore, if the number of wireless communication devices in which the earliest time in a random time is subtracted is one, frame transmission by the wireless communication device succeeds and it is possible to prevent frame collision. Since the acquisition of the transmission right based on the random value becomes impartial between the plurality of wireless communication devices, it can say that a scheme adopting Collision Avoidance is a suitable scheme to share a radio medium between the plurality of wireless communication devices.

[4] Frame Interval of Wireless LAN

The frame interval of IEEE802.11 wireless LAN is described. There are six types of frame intervals used in IEEE802.11 wireless LAN, such as distributed coordination function interframe space (DIFS), arbitration interframe space (AIFS), point coordination function interframe space (PIFS), short interframe space (SIFS), extended interframe space (EIFS) and reduced interframe space (RIFS).

The definition of the frame interval is defined as a continuous period that should confirm and open the carrier sensing idle before transmission in IEEE802.11 wireless LAN, and a strict period from a previous frame is not discussed. Therefore, the definition is followed in the explanation of IEEE802.11 wireless LAN system. In IEEE802.11 wireless LAN, a waiting time at the time of random access based on CSMA/CA is assumed to be the sum of a fixed time and a random time, and it can say that such a definition is made to clarify the fixed time.

DIFS and AIFS are frame intervals used when trying the frame exchange start in a contention period that competes with other wireless communication devices on the basis of CSMA/CA. DIFS is used in a case where priority according to the traffic type is not distinguished, AIFS is used in a case where priority by traffic identifier (TID) is provided.

Since operation is similar between DIFS and AIFS, an explanation below will mainly use AIFS. In IEEE802.11 wireless LAN, access control including the start of frame exchange in the MAC layer is performed. In addition, in a case where QoS (Quality of Service) is supported when data is transferred from a higher layer, the traffic type is notified together with the data, and the data is classified for the priority at the time of access on the basis of the traffic type. The class at the time of this access is referred to as "access category (AC)". Therefore, the value of AIFS is provided every access category.

PIFS denotes a frame interval to enable access which is more preferential than other competing wireless communication devices, and the period is shorter than the values of DIFS and AIFS. SIFS denotes a frame interval which can be used in a case where frame exchange continues in a burst manner at the time of transmission of a control frame of a response system or after the access right is acquired once. EIFS denotes a frame interval caused when frame reception fails (when the received frame is determined to be error).

RIFS denotes a frame interval which can be used in a case where a plurality of frames are consecutively transmitted to the same wireless communication device in a burst manner after the access right is acquired once, and a response frame from a wireless communication device of the transmission partner is not requested while RIFS is used.

Figure 32:
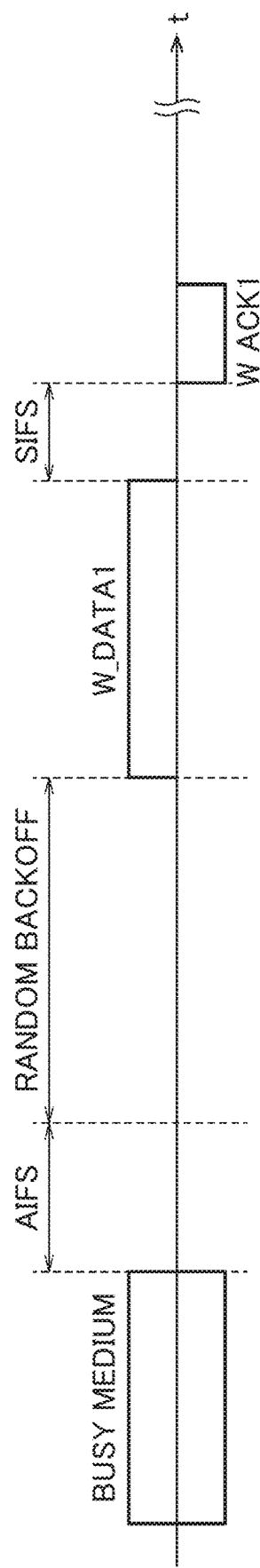
FIG. 32 is a diagram showing an example of frame exchange in a contention period.

Here, FIG. 32 illustrates one example of frame exchange in a competitive period based on the random access in IEEE802.11 wireless LAN.

When a transmission request of a data frame (W_DATA1) is generated in a certain wireless communication device, a case is assumed where it is recognized that a medium is busy (busy medium) as a result of carrier sensing. In this case, AIFS of a fixed time is set from the time point at which the carrier sensing becomes idle, and, when a random time (random backoff) is set afterward, data frame W_DATA1 is transmitted to the communicating partner.

The random time is acquired by multiplying a slot time by a pseudorandom integer led from uniform distribution between contention windows (CW) given by integers from 0. Here, what multiplies CW by the slot time is referred to as "CW time width". The initial value of CW is given by CWmin, and the value of CW is increased up to CWmax every retransmission. Similarly to AIFS, both CWmin and CWmax have values every access category. In a wireless communication device of transmission destination of W_DATA1, when reception of the data frame succeeds, a response frame (W_ACK1) is transmitted after SIFS from the reception end time point. If it is within a transmission burst time limit when W_ACK1 is received, the wireless communication device that transmits W_DATA1 can transmit the next frame (for example, W_DATA2) after SIFS.

Although AIFS, DIFS, PIFS and EIFS are functions between SIFS and the slot-time, SIFS and the slot time are defined every physical layer. Moreover, although parameters whose values being set according to each access category, such as AIFS, CWmin and CWmax, can be set independently by a communication group (which is a basic service set (BSS) in IEEE802.11 wireless LAN), the default values are defined.

For example, in the definition of 802.11ac, with an assumption that SIFS is 16 µs and the slot time is 9 µs, and thereby PIFS is 25 µs, DIFS is 34 µs, the default value of the frame interval of an access category of BACKGROUND (AC_BK) in AIFS is 79 µs, the default value of the frame interval of BEST EFFORT (AC_BE) is 43 µs, the default value of the frame interval between VIDEO(AC_VI) and VOICE(AC_VO) is 34 µs, and the default values of CWmin and CWmax are 31 and 1023 in AC_BK and AC_BE, 15 and 31 in AC_VI and 7 and 15 in AC_VO. Here, EIFS denotes the sum of SIFS, DIFS, and the time length of a response frame transmitted at the lowest mandatory physical rate. In the wireless communication device which can effectively takes EIFS, it may estimate an occupation time length of a PHY packet conveying a response frame directed to a PHY packet due to which the EIFS is caused and calculates a sum of SIFS, DIFS and the estimated time to take the EIFS.

The terms used in each embodiment should be interpreted broadly. For example, the term "processor" may encompass a general purpose processor, a central processing unit (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, or one or more microprocessors in conjunction with a DSP core.

As another example, the term "memory" may encompass any electronic component which can store electronic information. The "memory" may refer to various types of media such as a random access memory (RAM), a read-only memory (ROM), a programmable read-only memory (PROM), an erasable programmable read only memory (EPROM), an electrically erasable PROM (EEPROM), a non-volatile random access memory (NVRAM), a flash memory, and a magnetic or optical data storage, which are readable by a processor. It can be said that the memory electronically communicates with a processor if the processor read and/or write information for the memory. The memory may be arranged within a processor and also in this case, it can be said that the memory electronically communication with the processor.

Note that the frames described in the embodiments may indicate not only things called frames in, for example, the IEEE 802.11 standard, but also things called packets, such as Null Data Packets.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions.

The invention claimed is:

1. A wireless communication device, comprising:
 a receiver configured to:
  receive a first field and a plurality of second fields multiplexed and transmitted, the first field including information for identifying a plurality of wireless communication terminals, the plurality of second fields including frames in which a value indicating a period of time for refraining access into a wireless medium is set in a predetermined field;
  decode one of the plurality of second fields to extract the frame if (1) a first information for identifying the wireless communication device is not included in the first field, and (2) a parameter for reception is set to a first value in the wireless communication device; and
  decode none of the plurality of second fields if (1) the first information is not set in the first field, and (2) the parameter is set to a second value different from the first value; and
 controlling circuitry configured to refrain access into the wireless medium during a period of time indicated by the value in the predetermined field of the extracted frame,
 wherein the first field contains second information to decode each of the plurality of second fields.

2. The wireless communication device according to claim 1, wherein the receiver is configured to receive a physical packet including the first field and the plurality of second fields.

3. The wireless communication device according to claim 1, wherein one or more periods of time indicated by corresponding values in the predetermined field of the frames end at an identical time later than a period of time during which the frames are transmitted.

4. The wireless communication device according to claim 1, wherein the plurality of second fields is multiplexed by at least any one of multi-user frequency multiplexing or multi-user spatial multiplexing.

5. The wireless communication device according to claim 1, wherein
 the first field is a field common to a plurality of wireless communication terminals, and
 the plurality of second fields is individual fields for the wireless communication terminals.

6. The wireless communication device according to claim 1, wherein
 the plurality of second fields is transmitted in Orthogonal Frequency Division Multiple Access (OFDMA), and
 the second information contains at least one of
  information of an error correction code scheme, or information for identifying a plurality of resource blocks which have used to transmit the plurality of second fields.

7. The wireless communication device according to claim 6, wherein the information for identifying the plurality of resource blocks contains at least one information of: a number of resource blocks, sub-carrier intervals between the resource blocks, or identifiers of the respective resource blocks.

8. The wireless communication device according to claim 6, wherein the resource block includes one or more subcarriers.

9. The wireless communication device according to claim 1, wherein
the plurality of second fields is transmitted in multi-user Multiple Input Multiple Output (MIMO),
the second information contains at least one of
information of an error correction code scheme, or
information of a number of streams.

10. The wireless communication device according to claim 1, wherein
each of the plurality of second fields contains a third field and a fourth field, and
the receiver is configured to acquire third information from the third field contained in one of the plurality of second fields, and decode the fourth field contained in the one of the plurality of second fields, based on the third information, to extract the frame.

11. The wireless communication device according to claim 10, wherein
the third information contains information of a modulation and coding scheme of the frame,
the receiver is configured to identify the third field including information of the modulation and coding scheme conforming to the wireless communication device from among third fields of the plurality of second fields, and
the receiver is configured to decode the fourth field contained in the second field containing the identified third field based on the information contained in the identified third field, to extract the frame.

12. The wireless communication device according to claim 11, wherein
in a case with a plurality of the third fields being identified, the receiver is configured to identify the third field containing information of the modulation and coding scheme in which a coding rate or a transmission rate satisfies a predetermined condition, and
the receiver is configured to decode the fourth field contained in the second field containing the identified third field based on the information contained in the identified third field to extract the frame.

13. The wireless communication device according to claim 1, wherein
each of the plurality of second fields includes a third field and a fourth field, the third field containing a frame and the fourth field containing a value, the receiver is configured to extract the value from one of the fourth fields, instead of extracting the value from the frame of a corresponding third field, and
the controlling circuitry is configured to refrain access to the wireless medium during a period of time indicated by the extracted value.

14. The wireless communication device according to claim 1, wherein
the first field contains the value of each frame included in each of the plurality of second fields,
the receiver is configured to extract the value from the first field, and
the controlling circuitry is configured to refrain access to the wireless medium during the period of time indicated by the extracted value, instead of the value in the predetermined field of the frame.

15. The wireless communication device according to claim 1, wherein the controlling circuitry is configured to control communication in conformity with IEEE 802.11 standard.

16. The wireless communication device according to claim 1, wherein the receiver is configured to:
decode the second field specified by the first field if the first information for identifying the wireless communication device is included in the first field to extract the frame included therein, and
obtain data in a data field of the extracted frame whose receiving address is addressed to the wireless communication device.

17. The wireless communication device according to claim 1, wherein a receiving address of the extracted frame is different from an address of the wireless communication device.

18. A wireless communication method, comprising:
receiving a first field and a plurality of second fields multiplexed and transmitted, the first field including information for identifying a plurality of wireless communication terminals, the plurality of second fields including frames in which a value indicating a period of time for refraining access into a wireless medium is set in a predetermined field;
decoding any one of the plurality of second fields to extract the frame if (1) a first information for identifying the wireless communication device is not included in the first field, and (2) a parameter for reception is set to a first value in the wireless communication device;
decoding none of the plurality of second fields if (1) the first information is not set in the first field, and (2) the parameter is set to a second value different from the first value; and
refraining access into the wireless medium during a period of time indicated by the value in the predetermined field of the extracted frame,
wherein the first field contains second information to decode each of the plurality of second fields.

* * * * *